US011795255B2

United States Patent
Haehnle et al.

(10) Patent No.: US 11,795,255 B2
(45) Date of Patent: Oct. 24, 2023

(54) METHOD FOR PRODUCING PAPER OR CARDBOARD

(71) Applicant: SOLENIS TECHNOLOGIES, L.P., Wilmington, DE (US)

(72) Inventors: Hans-Joachim Haehnle, Ludwigshafen (DE); Anton Esser, Ludwigshafen (DE); Ralph Isermann, Ludwigshafen (DE)

(73) Assignee: Solenis Technologies, L.P., Wilmington, DE (US)

(*) Notice: Subject to any disclaimer, the term of this patent is extended or adjusted under 35 U.S.C. 154(b) by 224 days.

(21) Appl. No.: 17/276,242

(22) PCT Filed: Sep. 13, 2019

(86) PCT No.: PCT/EP2019/074471
§ 371 (c)(1),
(2) Date: Mar. 15, 2021

(87) PCT Pub. No.: WO2020/053379
PCT Pub. Date: Mar. 19, 2020

(65) Prior Publication Data
US 2022/0033555 A1   Feb. 3, 2022

(30) Foreign Application Priority Data

Sep. 14, 2018  (EP) .................................. 18194630

(51) Int. Cl.
*D21H 17/34* (2006.01)
*C08F 226/02* (2006.01)
*C08F 8/12* (2006.01)
*D21H 23/04* (2006.01)

(52) U.S. Cl.
CPC .............. *C08F 226/02* (2013.01); *C08F 8/12* (2013.01); *D21H 17/34* (2013.01); *D21H 23/04* (2013.01)

(58) Field of Classification Search
CPC ........ C08F 226/02; C08F 8/12; C09D 139/02; D21H 17/00; D21H 11/20
USPC ...................................................... 162/168.2
See application file for complete search history.

(56) References Cited

U.S. PATENT DOCUMENTS

| | | | |
|---|---|---|---|
| 4,774,285 A | 9/1988 | Pfohl et al. | |
| 4,898,915 A | 2/1990 | Harwood et al. | |
| 5,037,927 A | 8/1991 | Itagaki et al. | |
| 5,389,203 A | 2/1995 | Sawayama et al. | |
| 5,512,645 A | 4/1996 | Sawayama et al. | |
| 5,630,907 A | 5/1997 | Nilz et al. | |
| 8,382,948 B2 | 2/2013 | Haehnle et al. | |
| 8,926,797 B2 | 1/2015 | Jehn-Rendu et al. | |
| 9,774,038 B2 | 9/2017 | Okada et al. | |
| 9,879,380 B2 | 1/2018 | Borkar et al. | |
| 10,626,558 B2 | 4/2020 | Esser et al. | |
| 2002/0053413 A1 | 5/2002 | Zhang et al. | |
| 2017/0362776 A1 | 12/2017 | Haehnle et al. | |
| 2018/0209099 A1 | 7/2018 | Hamers et al. | |

FOREIGN PATENT DOCUMENTS

| | | |
|---|---|---|
| AU | 672464 B2 | 7/1994 |
| CA | 2034655 A1 | 7/1991 |
| CN | 102076910 A | 5/2011 |
| CN | 102459760 A | 5/2012 |
| CN | 104081566 A | 10/2014 |
| CN | 106661843 A | 5/2017 |
| CN | 107223171 A | 9/2017 |
| CN | 107923127 A | 4/2018 |
| DE | 4441940 A1 | 11/1993 |
| DE | 4328975 A1 | 3/1994 |
| DE | 4241117 A1 | 6/1994 |
| EP | 0216387 A1 | 4/1987 |
| EP | 0438744 A1 | 7/1991 |
| EP | 0528409 A1 | 2/1993 |
| EP | 2787564 A1 | 10/2014 |
| GB | 752290 | 7/1956 |
| JP | 2016186023 A | 10/2016 |
| JP | 2017039867 A | 2/2017 |
| JP | 2017039868 A | 2/2017 |
| JP | 2017061602 A | 3/2017 |
| RU | 2678672 C2 | 1/2019 |
| WO | 201601016 A1 | 1/2016 |

OTHER PUBLICATIONS

Robert K. Pinschmidt Jr. et al.; "N-Vinylformamide-Building Block for Novel Polymer Structures"; Journal of Macromolecular Science, Part A: Pure and Applied Chemistry; Dec. 31, 1997; vol. No. 34, Issue: No. 10.

(Continued)

*Primary Examiner* — Mark Halpern
(74) *Attorney, Agent, or Firm* — Lorenz & Kopf, LLP

(57) ABSTRACT

Methods for producing paper or cardboard are provided that comprise the steps (A) adding a final polymer A to a first aqueous fibrous material suspension, whereby a second aqueous fibrous material suspension containing final polymer A is created,
wherein the final polymer A is obtainable by
radical polymerisation of the monomers (i), (ii), (iii), (iv), and (v) as described herein in the amounts provided herein; and
hydrolysing the starting polymer V in order to obtain the final polymer A, (B) dewatering the second aqueous fibrous material suspension containing final polymer A on a water-permeable substrate to form a wet paper structure, (C) dewatering the wet paper structure, whereby the paper or the cardboard is formed.

20 Claims, 1 Drawing Sheet

(56) References Cited

OTHER PUBLICATIONS

ISA/US, International Search Report and Written Opinion issued in Int. Appl. No. PCT/US2019/074471 dated Dec. 3, 2019.
R. N. Majumdar et al., "Alternating copolymerization of methyl acrylate with donor monomers having a protected amine Group", Journal of Polymer Science, 1983, vol. 21, p. 1717-1727.
"A novel synthetic procedure for N-vinylformamide and free radical polymerization", S. Sawayama et al., Mitsubishi Kasei R&D Review, 1993, vol. 7, p. 55-61.
Amine functional polymers based on N-ethenylformamide, R. K. Pinschmidt et al., Progress in Organic Coatings, 1996, 27, p. 209-218.
R. K. Pinschmidt et al., "N-vinylformamide—building block for novel polymer structures", Pure Applied Chemistry, 1997, A34(10), p. 1885-1905.
C. Chang et al., "Determination of the sequence distribution and ionization constant of poly(acrylic acid-co-vinylamine) by C-13 NMR", Journal of Polymer Science, Polymer Symposium, 1986, 74, p. 17-30.
M. Mullier et al., "Polymers and group interaction. IV. Hofmann reaction on polyvinylamides", 5 Journal of Polymer Science, 1957, XXIII, p. 915-930.

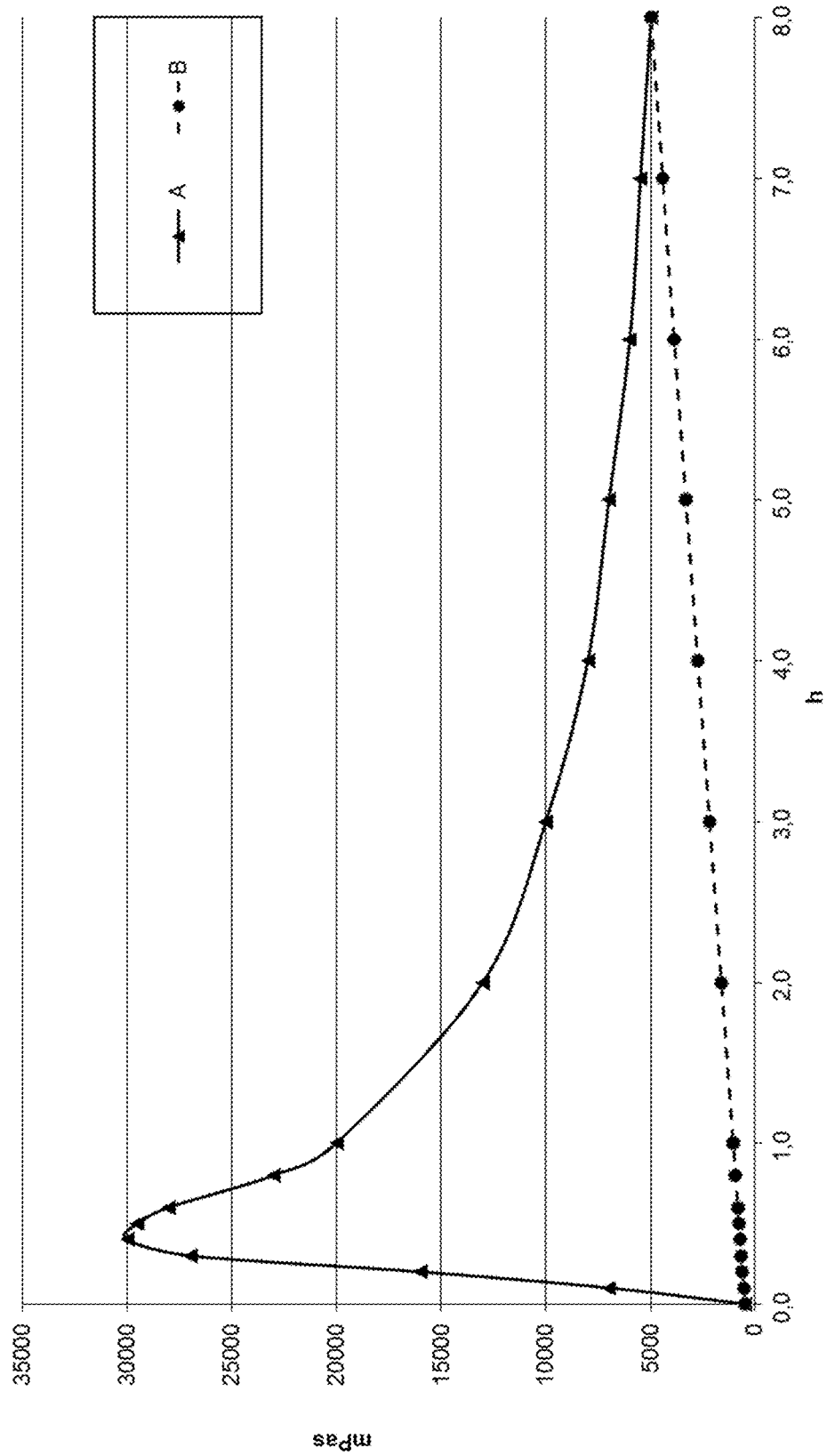

METHOD FOR PRODUCING PAPER OR CARDBOARD

CROSS-REFERENCE TO RELATED APPLICATIONS

This is a National Stage of International Application No. PCT/EP2019/074471, filed Sep. 13, 2019, which claims the benefit of European Patent Application No. 18194630.2, filed Sep. 14, 2018.

TECHNICAL FIELD

The invention relates to a method for producing paper or cardboard comprising the steps of adding a final polymer A to a first aqueous fibrous material suspension, dewatering the obtained second aqueous fibrous material suspension containing final polymer A on a water-permeable substrate to form a wet paper structure, and dewatering the wet paper structure further to form a paper or cardboard. The obtained paper or cardboard has a good dry strength. Further subjects of the invention are a paper or cardboard obtainable by this method and a final polymer A and a starting polymer V. The starting polymer V is the synthetic precursor of the final polymer A.

BACKGROUND

The current trends in the paper industry have in part a profoundly negative influence on the dry strength of a paper or cardboard. For example, the recycling rates of waste paper are increasing. This is associated with a deterioration in fibre quality. Shorter cellulose fibres, a reduced swelling behaviour, and fibre roughness are experienced. In principle, the use of inexpensive raw materials is attractive, even if in practice it is associated with shorter cellulose fibres. The reduction of the grammage of a paper or cardboard in order to save raw material is a recurring theme. The water circuits in the papermaking machines are being decommissioned progressively. Methods for producing paper or cardboard which ensure a good dry strength of the obtained paper or cardboard are therefore of interest.

DE 4328975 A discloses, as subject of the invention, polymers for paper production which contain a proportion of 2-amino-dihydropyrrole structural units equaling 20 to 90 mol %. In order to produce the polymers according to the examples, radical polymerisation of N-vinylformamide and acrylonitrile is firstly performed in order to provide a starting polymer. This starting polymer accumulates at the end of the polymerisations in the form of a suspension in water. After filtration the starting polymer is treated with concentrated hydrochloric acid, and heating to approximately 100° C. results in amidinization. The final polymer thus formed is precipitated with acetone and dried. For the produced final polymer "F", the starting polymer of which is obtained by way of the radical polymerisation of 50 mol % N-vinylformamide and 50 mol % acrylonitrile, a lactam content, specifically of 1 mol %, is stated as sole polymer:

inter alia, the final polymers are added to a fibrous material suspension. Papers are produced by means of a TAPPI-standard fourdrinier machine. The ash content of the paper produced using the final polymer "F" is determined. The paper strength of papers produced using other final polymers is also determined by measuring a burst factor. The produced final polymers "G", "K", "Q" and "R" have no, or only a small content of 2-amino-dihydropyrrole structural units and therefore do not correspond to the invention and yield poorer results in the practical examples.

EP 0528409 A discloses, as subject according to the invention, polymers that are consistent with those from the aforementioned document DE 4328975 A as flocculating agent. The final polymer "F" from DE 4328975 A can be found again in the "Examples" part as final polymer "P". The final polymers in the examples are added to sludge in order to improve the filtration capacity. Similarly to DE 4328975 A, the final polymers not according to the invention have no, or only a small content of 2-amino-dihydropyrrole structural units.

DE 4441940 A discloses, as subject according to the invention, polymers that comprise the five-membered lactams as structural units (=pyrrolidin-2-one structural units) in a proportion of 20 to 100 mol %. In the "Examples" part an increased thermostability is demonstrated for the final polymers there. The final polymers are recommended for use as modifiers for thermoplastic resin, polymeric additive petroleum tertiary recovery, lubricants, detergent dispersants, scale inhibitors, quenching oil polymers, drilling mud thickeners, pipe-transportable thickeners, binders and the like. In order to produce the polymers according to the examples, radical polymerisation of N-vinylformamide and acrylamide, and in one case of N-vinylformamide, acrylamide and acrylamide-2-methylpropane sulfonic acid, and in a further case of N-vinylformamide and methacrylamide is firstly performed, in each case to form a starting polymer. In the case of N-vinylformamide and acrylamide the starting polymer is precipitated with methanol, and in the two other cases the starting polymer is filtered off as a polymeric gel. The starting polymers thus obtained are treated with aqueous hydrochloric acid. The mixture is precipitated and then dried by adding acetone or methanol. The water solubility is estimated and the reduced viscosity is determined as applicable. For the produced final polymer "C", the starting polymer of which is obtained by way of the radical polymerisation of 50 mol % N-vinylformamide and 50 mol % acrylamide, the following composition is specified:

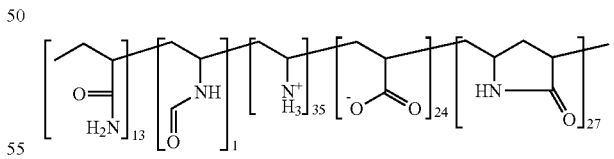

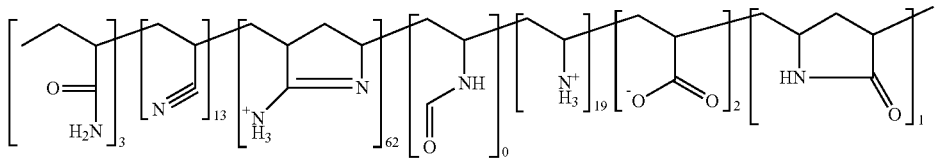

For the produced final polymer "M", the starting polymer of which is obtained by way of the radical polymerisation of 40 mol % N-vinylformamide, 40 mol % acrylamide and 20 mol % acrylamide-2-methylpropane sulfonic acid, the following composition is specified:

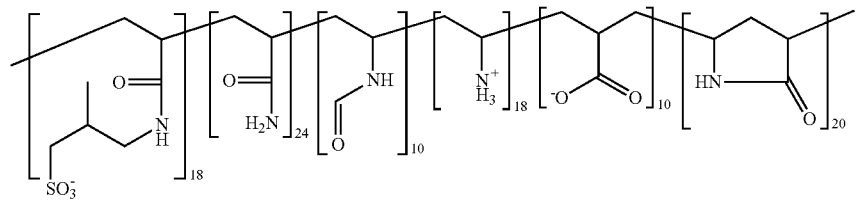

For the produced final polymer "N", the starting polymer of which is obtained by way of the radical polymerisation of N-vinylformamide and methylacrylamide, the following composition is specified:

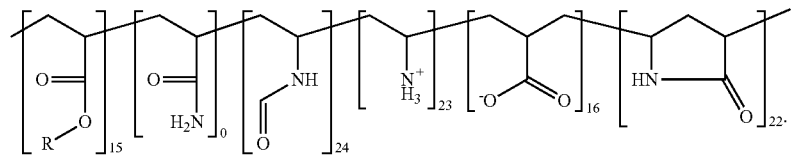

U.S. Pat. No. 4,898,915 discloses, as subject according to the invention, polymers that comprise structural units with an aromatic or aliphatic amino group and structural units with at least one nitrile, aldehyde, carboxylic acid or carboxylic acid ester substitution. In the examples the starting polymers are produced by way of a polymerisation of monomers with protected amino groups and acrylic acid esters in toluene, said polymerisation being catalysed by means of Lewis acid. The raw starting polymers are separated by being decanted and by adding methanol, are filtered in dissolved form in chloroform, and are precipitated with a renewed addition of methanol. In order to obtain final polymers, the starting polymers obtained in this way are treated with hydrazine in chloroform in order to release the primary amino groups. Specifically, in Example 3 methyl acrylate is polymerised with N-vinylphthalimide, catalysed by ethylaluminium sesquichloride. This starting polymer is dissolved in Example 6 in chloroform and is treated with hydrazine. Methoxy groups, amino groups and lactam units are described for the obtained final polymer. In Example 7 the final polymer obtained in Example 6 is treated with aqueous potassium hydroxide solution at 70° C., whereupon the provision of a polymer having alternating amino and carboxylic acid groups is described. The use of the final polymers as antistatic agents or as thickeners in petroleum recovery is recommended.

In "A novel synthetic procedure for N-vinylformamide and free radical polymerization", S. Sawayama et al., Mitsubishi Kasei R&D Review, 1993, Vol. 7, p. 55-61 the copolymerisation of N-vinylformamide with acrylamide and the copolymerisation of N-vinylformamide with styrene, in each case in different molar ratios, is described in chapter 3.5 and FIG. 4.

In "Alternating copolymerization of methyl acrylate with donor monomers having a protected amine Group", R. N. Majumdar et al., Journal of Polymer Science, 1983, Vol. 21, p. 1717-1727, Example 6 of the aforementioned document U.S. Pat. No. 4,898,915 is described, inter alia, and is headed as the hydrazinolysis of an alternating copolymer of methylacrylate and N-vinylphthalimide. FIG. 4 shows the $^{13}$C-NMR of a copolymer of methyl acrylate and N-vinylphthalimide and the $^{13}$C-NMR of an alternating copolymer of methyl acrylate and N-vinylphthalimide.

In "Amine functional polymers based on N-ethenylformamide", R. K. Pinschmidt et al., Progress in Organic Coatings, 1996, 27, p. 209-218, section 2.1. describes the polymerisation of 32 mol % N-vinylformamide, 38 mol % butyl acrylate and 30 mol % methyl methacrylate in a solvent, for example alcohol, ketone or alcohol/toluene, with the radical starter Vazo 52. The basic hydrolysis of (meth)acrylate/N-vinylformamide co- and terpolymers with potassium hydroxide in an alcohol-containing solvent is described as being quick in section 2.2. In the case of a starting polymer obtained from the polymerisation of acrylate:N-vinylformamide=1:1, a lactam-containing polymer which is known from the aforementioned document U.S. Pat. No. 4,898,915 precipitates. In section 3.4 and schema 3 the hydrolysis and lactam formation of copolymers of N-vinylformamide and (meth)acrylates is described. A high lactam content leads to insolubility in normal solvents.

In "N-vinylformamide—building block for novel polymer structures", R. K. Pinschmidt et al., Pure Applied Chemistry, 1997, A34(10), p. 1885-1905, the hydrolysis of copolymers of N-vinylformamide and (meth)acrylates or acrylonitrile under acidic conditions is described as being simple and as providing a high yield, inter alia. This is attributed to the absence of a strong charge repulsion between vinylamine units in these strongly alternating copolymers. Lactam forms very quickly in the event of neutralisation or basic hydrolysis. This is shown schematically in FIG. 9, and the lactam structure is referred to as being insoluble.

GB 752290 discloses, as subject according to the invention, polymers that comprise five-membered lactams as structural units (=pyrrolidin-2-one structural units). In order to produce the polymers according to the examples, acryloyl chloride is firstly subjected to radical polymerisation to form a starting polymer. This starting polymer is dissolved in dimethylformamide and is converted with sodium azide or hydroxylamine. After filtration and addition of acetone, the final polymer is precipitated, dissolved in water and precipitated with addition of hydrochloric acid. Inter alia, a final polymer with 70 mol % lactam structural units, 23 mol % acid groups, and 7 mol % amino groups, and a final polymer with 63 mol % lactam structural units, 24.5 mol % acid groups, and 12.5 mol % amino groups are described. The final polymers are recommended inter alia as film formers and for use in photographic layers.

In "Determination of the sequence distribution and ionization constant of poly(acrylic acid-covinylamine) by C-13 NMR", C. Chang et al., Journal of Polymer Science, Polymer Symposium, 1986, 74, p. 17-30, final polymers which are obtained from the Schmidt reaction of polyacrylic acid with hydrazoic acid and contain a primary amino group and carboxylic acid groups are examined by means of nuclear magnetic resonance. Lactam formation is described for the examined final polymers, in which 12% or 30% or 52% of the carboxylic acid groups were converted into amino groups.

In "Polymers and group interaction. IV. Hofmann reaction on polyvinylamides", M. Mullier et al., Journal of Polymer Science, 1957, XXIII, p. 915-930, Hofmann rearrangement products of polyacrylamide and polymethacrylamide are examined, inter alia. In the examples, polyacrylamides are converted with sodium hypochlorite as starting polymers, whereupon polymers with amino groups are produced as final polymers. A high proportion of five-membered lactam structural units are allocated to these final polymers. The following is found in Table 1 for the final polymer "Polymer I", which is obtained from the Hofmann reaction of polyacrylamide with 1 equivalent sodium hypochlorite:

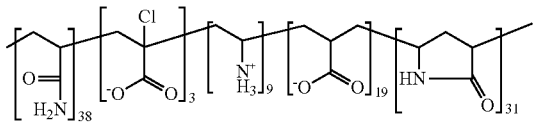

The following is found in Table 1 for the final polymer "Polymer II", which is obtained from the Hofmann reaction of polymethacrylamide with 1 equivalent sodium hypochlorite:

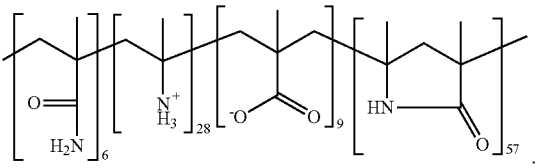

JP 2016-186023 A describes, in Example 1, the radical polymerisation of 43 mol % N-vinylformamide and 57 mol % methyl methacrylate into methylethylketone. Example 2 describes the radical polymerisation of 24 mol % N-vinylformamide and 76 mol % methyl methacrylate into methyl ethyl ketone. The obtained polymers are of interest for optical lenses, etc.

JP 2017-061602 A describes, in Example 3, the radical polymerisation of 32 mol % N-vinylformamide and 68 mol % methyl methacrylate into methylethylketone. The obtained polymer is of interest for optical components.

JP 2017-039867 A describes, in Example 4, the radical polymerisation of 20 mol % N-vinylformamide and 80 mol % methyl methacrylate into methylethylketone. Example 5 describes the radical polymerisation of 32 mol % N-vinyl-formamide and 68 mol % methyl methacrylate into methyl ethyl ketone. The obtained polymers are of interest for optical components.

JP 2017-039868 A describes, in Example 2, the radical polymerisation of 32 mol % N-vinylformamide and 68 mol % methyl methacrylate into methylethylketone. Example 3 describes the radical polymerisation of 48 mol % N-vinylformamide and 52 mol % methyl methacrylate into methyl ethyl ketone. Example 4 describes the radical polymerisation of 20 mol % N-vinylformamide and 80 mol % methyl methacrylate into methyl ethyl ketone. The obtained polymers are of interest for optical components.

There is a need for further methods for producing paper or cardboard, wherein the obtained paper or cardboard has a good dry strength. If additives are used in these methods, it is additionally advantageous if the production thereof can also be performed on an industrial scale as easily as possible.

BRIEF SUMMARY

A method for producing paper or cardboard is provided, containing the steps
(A) adding a final polymer A to a first aqueous fibrous material suspension, whereby a second aqueous fibrous material suspension containing final polymer A is created,
wherein the final polymer A is obtainable by
radical polymerisation of the monomers
(i) 30 to 90 mol % of a monomer of formula I

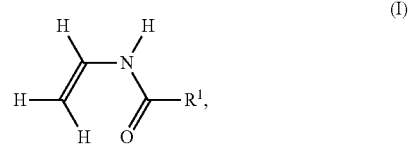

in which $R^1$=H or means $C_1$-$C_5$ alkyl,
(ii) 3 to 60 mol % of a $C_1$-$C_4$ alkyl ester of acrylic or of a $C_1$-$C_4$ alkyl ester of methacrylic acid,
(iii) 0 to 45 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 35 mol % of one or more ehtylenically unsaturated monomers which are different from a monomer (i), (ii), (iii), and (iv),
wherein the total amount of all monomers (i), (ii), (iii), (iv), and (v) is 100 mol %, in order to obtain a starting polymer V, and
hydrolysing the starting polymer V in order to obtain the final polymer A,
wherein the N-C(=OR)$R^1$ groups of formula (I) of the monomers (i) polymerised into the starting polymer V hydrolyse at least in part and in so doing form primary amino groups,
wherein the ester groups of the monomrers (ii) polymerised into starting polymer V are converted at least in part and at least part of the conversion is the formation of five-membered lactam structural units with the obtained primary amino groups or the formation of carboxylic acid groups or salt forms thereof, (B) dewatering the second aqueous fibrous material suspension containing final polymer A on a water-permeable substrate to form a wet paper structure,
(C) dewatering the wet paper structure, whereby the paper or the cardboard is formed.

BRIEF DESCRIPTION OF THE DRAWINGS

The present disclosure will hereinafter be described in conjuction with the following drawing figures, wherein like numerals denote like elements, and wherein:
FIG. 1 schematically shows, by way of the curve A, the temporal profile in hours of the viscosity in mPas in the event of alkaline hydrolysis of a first starting polymer obtained from 70 mol % N-vinylformamide and 30 mol % methylacrylate. Curve B shows schematically the termporal profile in hours of the viscosity in mPas in the event of alkaline hydrolysis of a second starting polymer obtained from 70 mol % N-vinylformamide, 20 mol % methylacrylate and 10 mol % sodium acrylate.

DETAILED DESCRIPTION

What has been found is a method for producing paper or cardboard containing the steps
(A) adding a final polymer A to a first aqueous fibrous material suspension, whereby a second aqueous fibrous material suspension containing final polymer A is created, wherein the final polymer A is obtainable by radical polymerisation of the monomers
(i) 30 to 90 mol % of a monomer of formula I

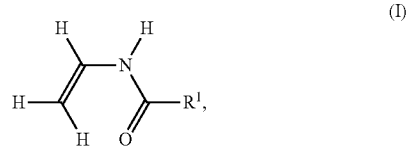

in which $R^1$=H or means $C_1$-$C_6$ alkyl,
(ii) 3 to 60 mol % of a $C_1$-$C_4$ alkyl ester of acrylic acid or of a $C_1$-$C_4$ alkyl ester of methacrylic acid,
(iii) 0 to 45 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 35 mol % of one or more ethylenically unsaturated monomers which are different from a monomer (i), (ii), (iii) and (iv),
wherein the total amount of all monomers (i), (ii), (iii), (iv) and (v) is 100 mol %, in order to obtain a starting polymer V, and
hydrolysing the starting polymer V in order to obtain the final polymer A,
wherein the N—C(=O)$R^1$ groups of formula (I) of the monomers (i) polymerised into the starting polymer V hydrolyse at least in part and in so doing form primary amino groups,
wherein the ester groups of the monomers (ii) polymerised into the starting polymer V are converted at least in part and at least part of the conversion is the formation of five-membered lactam structural units with the obtained primary amino groups or the formation of carboxylic acid groups or salt forms thereof, (B) dewatering the second aqueous fibrous material suspension containing final polymer A on a water-permeable substrate to form a wet paper structure,
(C) dewatering the wet paper structure, whereby the paper or the cardboard is formed.

In step (A) a first aqueous fibrous material suspension is understood to mean a composition containing (a-a) water and (a-b) fibrous material containing cellulose fibres. An alternative name for fibrous material suspension is pulp.

In order to obtain the first aqueous fibrous material suspension, mechanical and/or chemical methods can be used. For example, the grinding of an aqueous fibrous material suspension is a mechanical process for shortening fibres and, in the case of cellulose fibres, also for defibrilating the fibres. The dewatering capability of the aqueous fibrous suspension is determined by the attained fineness. One method for measuring the fineness of a fibrous material suspension is determination of the dewatering kinetics by the Schopper-Riegler test in Schopper degree (° SR).

Natural and/or recovered fibres can be used as fibrous material. All fibres made of wood or annual plants used conventionally in the paper industry can be used. Suitable annual plants for producing fibrous materials are, for example, rice, wheat, sugar cane and Kenaf. Wood material, for example from softwoods or hardwoods, include wood pulp, thermomechanical pulp (TMP), chemi-thermomechanical pulp (CTMP), pressure groundwood pulp, semi-chemical pulp, high yield pulp, and refiner mechanical pulp (RMP), for example. Rough-ground wood material typically has a fineness of 40-60° SR in relation to normal-ground wood material 60-75° SR and fine-ground wood material with 70-80° SR. Pulps, for example from softwoods or hardwoods, include chemically digested sulfate, sulfite or soda pulp. Pulp may also be bleached or unbleached. Unbleached pulp, which is also referred to as unbleached kraft pulp, is preferred. Unground pulp typically has 13-17° SR in relation to low-ground or average-ground pulp with 20-40° SR and high-ground pulp with 50-60° SR. Recovered fibres can originate for example from waste paper. The waste paper optionally can be subjected also to a Deinking process beforehand. Mixed waste paper can typically have approximately 40° SR in relation to waste paper from a Deinking process with approximately 60° SR. Recovered fibres from waste paper can be used alone or mixed with other, in particular natural, fibres.

A method in which the first aqueous fibrous material suspension has a dewatering kinetics according to the Schopper-Riegler test between 13 and 70° SR, very preferably between 20 and 60° SR, and particularly preferably between 30 and 50° SR is preferred.

The first aqueous fibrous material suspension can be obtained for example by the recycling of existing paper or cardboard, for example by mechanically treating waste paper in a pulper together with water until the aqueous fibrous material suspension has the desired consistency.

Another example of the combination of two fibre sources is the mixing of a primary fibrous material suspension with returned waste of a coated paper which is produced with use of the primary fibrous material suspension.

The first aqueous fibrous material suspension can contain not only water (a-a) and fibrous material (a-b), but also further constituents, which are added deliberately to the fibrous material suspension as applicable or are provided by use of waste paper or existing paper as applicable.

A dry content is understood herein to mean the ratio of the mass of a sample after drying to the mass of the sample before drying, expressed in percentage by weight values.

The dry content is preferably determined by drying at 105° C. to constant mass. To this end, the drying is achieved at 105° C. (±2° C.) in a drying cabinet to constant mass. Constant mass is achieved herein when, at dry contents of 1 to 100%, the rounded first decimal place of the percentage value no longer changes and, at dry contents of 0 to less than 1%, the rounded second decimal place of the percentage value no longer changes. The drying is performed at ambient pressure, optionally 101.32 KPa, without correcting any deviation resulting from weather and sea level. In the "Examples" part, information for practical execution can be found under the dry content determination.

Reference is made herein to a thick matter at a dry content of more than 1.5 to 6% by weight in relation to the first aqueous fibrous material suspension (corresponds approximately to a fibrous material concentration of more than 15 to 60 g/L if almost exclusively fibrous material is present), preferably from 2.0 to 4.0% by weight. By way of distinction herein, a dry content of from 0.1 to 1.5% by weight in relation to the aqueous fibrous material suspension (corresponds approximately to a fibrous material concentration of from 1 to 15 g/L if almost exclusively fibrous material is present), in particular 0.3 to 1.4% by weight, is usually referred to as thin matter. The dry content or the dry weight of an aqueous fibrous material suspension comprises all constituents which are not volatile or preferably are not volatile during the dry content determination by drying at 105° C. to constant mass.

The dry content of the first aqueous fibrous material suspension preferably lies between 0.1 and 6% by weight, very preferably between 0.12 and 5% by weight, particularly preferably between 0.15 and 4% by weight, very particularly preferably between more than 1.5 and 4.0% by weight, and especially preferably between 2.0 and 4.0% by weight.

A method in which in step (A) the first aqueous fibrous material suspension has a dry content between 0.1 and 6% by weight is preferred.

The final polymer A in step (A) is added to a first fibrous material suspension, the dry content of which is greater than 1.5 and up to 6.0% by weight. The formed second fibrous material suspension containing final polymer A is very preferably then diluted to a dry content of from 0.1 and up to 1.5% by weight. The final polymer A in step (A) is preferably added to a first fibrous material suspension, the dry content of which is between 0.1 and up to 1.5% by weight.

A method in which in step (A) the final polymer A is added to the first aqueous fibrous material suspension, which has a dry content of more than 1.5 to 6% by weight at the time of the addition, is preferred.

Following the addition of the final polymer A to the first aqueous fibrous material suspension, a period of time of preferably 0.5 seconds to 2 hours, very preferably 1.0 seconds to 15 minutes, and particularly preferably 2 to 20 seconds is allowed to lapse with the dewatering in step (B). A reaction time of the final polymer A is thus ensured.

The amount of added final polymer A is preferably 0.01 to 3.0% by weight in relation to the dry content of the first aqueous fibrous material suspension. The amount of final polymer A is calculated here as polymer content. The polymer content specifies the content of final polymer A without counterions in the aqueous solution in % by weight, i.e. counterions are not taken into consideration. The polymer content is thus the sum of the proportions by weight of all structural units of the final polymer A in g which are contained in 100 g of an aqueous dispersion or solution of the final polymer A. In the "Examples" part, information for practical execution can be found under the polymer content. Very preferred is an amount of from 0.02 to 1.0% by weight, particularly preferably 0.06 to 0.8% by weight, very particularly preferably 0.09 to 0.6% by weight, especially preferably 0.12 to 0.5% by weight, very especially preferably 0.15 to 0.5% by weight, and expressly preferably 0.2 to 0.4% by weight.

A method in which in step (A) the final polymer is added in an amount of from 0.2 to 0.5% by weight to the first fibrous material suspension, wherein the dry content of the first fibrous material suspension is greater than 1.5 and up to 6.0% by weight, is preferred. The formed second fibrous material suspension containing final polymer A is very preferably then diluted to a dry content between 0.1 and up to 1.5% by weight.

The synthetic precursor of the final polymer A is the starting polymer V, which is obtainable by radical polymerisation of the monomers (i), (ii), optionally (iii), optionally (iv) and optionally (v).

Solution, precipitation, inverse suspension or emulsion polymerisation are available for the polymerisation of the monomers (i), (ii), optionally (iii), optionally (iv) and optionally (v) to form the starting polymer V. Solution polymerisation in aqueous media is preferred. Suitable aqueous media are water and mixtures of water and at least one water-miscible solvent, for example an alcohol. Examples of an alcohol are methanol, ethanol, n-propanol, ethylene glycol or propylene glycol. The polymerisation is performed radically, for example by use of radical polymerisation initiators, for example peroxides, hydroperoxides, what are known as redox catalysts, or by use of azo compounds that break down into radicals. Examples of peroxides are alkali or ammonium peroxidisulfates, diacetylperoxide, dibenzoylperoxide, succinylperoxide, di-tert.-butylperoxide, tert.-butyl perbenzoate, tert.-butyl perpivalate, tert.-butyl peroxy-2-ethylhexanoate, tert.-butyl permaleinate, cumene hydroperoxide, diisopropyl peroxydicarbamate, bis-(o-toluoyl)-peroxide, didecanoylperoxide, dioctanoylperoxide, dilauroylperoxide, tert.-butylperisobutyrate, tertbutylperacetate or di-tert-amylperoxide. An example of hydroperoxide is tert-butyl hydroperoxide. Examples of azo compounds that break down into radicals are azo-bis-isobutyronitrile, 2,2'-azobis(2-methylpropionamidine) dihydrochloride or 2-2'-azo-bis-(2-methyl-butyronitrile). Examples of what are known as redox catalysts are ascorbic acid/iron(II)sulfate/sodium peroxodisulfate, tert-butylhydroperoxide/sodium disulfite, tert.-butylhydroperoxide/sodium hydroxymethane sulfinate or $H_2O_2/Cu^1$.

The polymerisation is performed for example in water or a water-containing mixture as solvent in a temperature range of from 30 to 150° C., preferably 40 to 110° C., wherein the process can be performed at ambient pressure, reduced pressure or increased pressure. A polymerisation initiator soluble in water, for example, 2,2'-azobis(2-methylpropionamidine) dihydrochloride, is selected for the solution polymerisation. The radical polymerisation of the monomers is performed preferably in water or a water-containing solvent mixture. Water or a water-containing solvent mixture containing at least 50% by weight water in relation to the total amount of solvent mixture is very preferred. Water or a water-containing solvent mixture containing at least 80% by weight water, especially preferably at least 90% by weight, and very especially preferably at least 95% by weight water is particularly preferred. The polymerisation is preferably performed in water or a water-containing solvent mixture, the pH value of which is above pH=6, very preferably between pH 6.1 and pH 9, and particularly preferably between pH 6.2 and pH 6.8. It is possible to set a corresponding pH for example by adding an acid and/or base, possibly with buffer function.

A method in which the radical polymerisation of the monomers is performed in water or a water-containing solvent mixture is preferred.

During the polymerisation of the monomers (i), (ii), optionally (iii), optionally (iv) and optionally (v) to form the starting polymer V, polymerisation regulators can be added to the reaction. It is typical for 0.001 to 5 mol % to be used, in relation to the total amount of all monomers (i), (ii), (iii), (iv) and (v). Polymerisation regulators are known in the literature, for example sulfuric compounds, sodium hypophosphite, formic acid or tribromochloromethane. Individual examples of sulfuric compounds are mercaptoethanol, 2-ethylhexyl-thioglycolate, thioglycolic acid and dodecyl mercaptan.

The starting polymer V preferably has a weight-average molecular weight $M_w$ between 75,000 and 5,000,000 Dalton. The starting polymer V very preferably has a weight-average molecular weight $M_w$ between 100,000 and 4,500,000 Dalton, particularly preferably between 180,000 and 2,500,000 Dalton, especially preferably between 210,000 and 1,500,000 Dalton, and very especially preferably between 250,000 and 1,000,000 Dalton. The weight-average molecular weight can be determined by static light scattering, for example at a pH value of 7.0 in a $NaNO_3$ solution.

Examples of monomers (i) of formula I are N-vinylformamide ($R^1$=H), N-vinylacetamide ($R^1$=$C_1$ alkyl), N-vinylpropionamide ($R^1$=$C_2$ alkyl) and N-vinylbutyramide ($R^1$=$C_3$ alkyl). The $C_3$-$C_6$ alkyls can be linear or branched. An example of $C_1$-$C_6$ alkyl is methyl, ethyl, n-propyl, 1-methylethyl, n-butyl, 2-methylpropyl, 3-methylpropyl, 1,1-dimethylethyl, n-pentyl, 2-methylbutyl, 3-methylbutyl, 2,2-dimethylpropyl or n-hexyl. $R^1$ is preferably H or $C_1$-$C_4$ alkyl, very preferably H or $C_1$-$C_2$ alkyl, particularly preferably H or $C_1$ alkyl and very particularly preferably H, i.e. the monomer (i) is N-vinylformamide. A monomer of formula I in the singular also includes a mixture of different monomers of formula I as monomer (i). Preferably, the numerical proportion of the monomer with $R^1$=H in the total number of all monomers (i) of formula I is 85 to 100%, very preferably 90 to 100%, particularly preferably 95 to 100%, and very particularly preferably 99 to 100%.

A method in which the monomer (i) is N-vinylformamide, d.h. $R^1$=H in formula I, is preferred.

The total amount of all monomers (i) is preferably 50 to 89 mol % in relation to all monomers polymerised in order to obtain the starting polymer V, i.e. all monomers (i), (ii), optionally (iii), optionally (iv) and optionally (v), very preferably 58 to 83 mol %, particularly preferably 60 to 83 mol %, and very particularly preferably 65 to 80 mol %. The condition remains that the sum of all monomers (i), (ii), (iii), (iv) and (v) gives 100 mol %.

Examples of monomers (ii) are methyl acrylate, ethyl acrylate, n-propyl acrylate, i-propyl acrylate, n-butyl acrylate, sec-butyl acrylate, tert-butyl acrylate, methyl methacrylate, ethyl methacrylate, n-propyl methacrylate, i-propyl methacrylate, n-butyl methacrylate, sec-butyl methacrylate and tert-butyl methacrylate. Here, a monomer (ii) in the singular also includes a mixture of different monomers (ii) as monomer (ii). $C_1$-$C_4$ alkyl esters of acrylic acid and $C_1$ alkyl esters of methacrylic acid are preferred, $C_1$-$C_3$ alkyl esters of acrylic acid and $C_1$ alkyl esters of methacrylic acid are very preferred, $C_1$-$C_3$ alkyl esters of acrylic acid are particularly preferred, $C_1$-$C_2$ alkyl esters of acrylic acid are very particularly preferred, and $C_2$ alkyl esters of acrylic acid (=ethyl acrylate) are especially preferred. Preferably, the numerical proportion of the $C_2$ alkyl ester of acrylic acid in the total number of all monomers (ii) is 30 to 100%, very preferably 50 to 100%, particularly preferably 80 to 100%, and very particularly preferably 95 to 100%. In the case of a $C_1$-$C_4$ alkyl ester of methacrylic acid a $C_1$-$C_4$ alkyl ester of acrylic acid is preferably also present, very preferably at least numerically one $C_1$-$C_4$ alkyl ester of methacrylic acid to numerically one $C_1$-$C_4$ alkyl ester of methacrylic acid.

A method in which the monomer (ii) is a $C_1$-$C_3$ alkyl ester of acrylic acid or $C_1$ alkyl ester of methacrylic acid is preferred.

A method in which the monomer (ii) is a $C_1$-$C_2$ alkyl ester of acrylic acid is preferred.

A method in which the monomer (ii) is ethyl acrylate is preferred.

The total amount of all monomers (ii) is preferably 5 to 45 mol % in relation to all monomers polymerised in order to obtain the starting polymer V, i.e. all monomers (i), (ii), optionally (iii), optionally (iv) and optionally (v), very preferably 8 to 39 mol %, particularly preferably 8 to 30 mol %, very particularly preferably 8 to 25 mol %, and especially preferably 8 to 21 mol %. The condition remains that the sum of all monomers (i), (ii), (iii), (iv) and (v) gives 100 mol %.

Herein an ethylenically unsaturated monomer is a monomer that contains at least one $C_2$ unit of which the two carbon atoms are connected by a carbon-carbon double bond. This is ethylene in the case of hydrogen atoms as single substituents. A vinyl derivative is present in the case of substitution with 3 hydrogen atoms. In the case of the substitution with two hydrogen atoms, an E/Z isomer or an ethene-1,1-diyl derivative is present. Herein, monoethylenically unsaturated monomer means that precisely one $C_2$ unit is provided in the monomer.

In the case of a cationically charged group of a specified molecule or a molecule class, salt form means that a corresponding anion ensures the charge neutrality. Such anions are, for example, chloride, bromide, hydrogen sulfate, sulfate, hydrogen phosphate, methylsulfate, acetate or formate. Chloride, formate or hydrogen sulfate is preferred; chloride or formate is particularly preferred. In the case of an anionically charged group of a specified compound or compound class, salt form means that a corresponding cation ensures the charge neutrality. Such cations are, for example, cations of alkali metals, alkaline earth metals, ammonia, alkyl amines or alkanolamines. Preferred are $Li^+$, $Na^+$, $K^+$, $Rb^+$, $Cs^+$, $Mg^{2+}$, $Ca^{2+}$, $Sr^{2+}$, $Ba^{2+}$ or $NH_4^+$. Very preferred are $Li^+$, $Na^+$, $K^+$, $Mg^{2+}$, $Ca^{2+}$ or $NH_4^+$, particularly preferred are $Na^+$, $K^+$, $Ca^{2+}$ or $NH_4^+$, very particularly preferred are $Na^+$, $K^+$ or $NH_4^+$, especially preferred are $Na^+$ or $K^+$ and very especially preferred are $Na^+$.

The monomer (iii) also comprises a mixture of individual monomers falling under the monomer (iii).

Examples of a monomer (iii) which is a monoethylenically unsaturated carboxylic acid or salt form thereof are monoethylenically unsaturated $C_3$ to $C_8$ mono- or dicarboxylic acids or salt forms thereof. Examples are acrylic acid, sodium acrylate, methacrylic acid, sodium methacrylate, dimethacrylic acid, ethacrylic acid, maleic acid, fumaric acid, itaconic acid, mesaconic acid, citraconic acid, methylene malonic acid, allyl acetic acid, vinyl acetic acid or crotonic acid.

Examples of a monomer (iii) which is a monoethylenically unsaturated sulfonic acid or salt form thereof are vinylsulfonic acid, acrylamido-2-methyl-propanesulfonic acid, methacrylamido-2-methylpropanesulfonic acid, allyl sulfonic acid, methallyl sulfonic acid, sulfoethyl acrylate, sulfoethyl methacrylate, sulfopropyl acrylate, sulfopropyl methacrylate, 2-hydroxy-3-methacryloxypropyl sulfonic acid or styrenesulfonic acid.

Examples of a monomer (iii) which is a monoethylenically unsaturated phosphonic acid or salt form thereof are vinylphosphonic acid vinylphosphonic acid monomethyl ester, allyl phosphonic acid, allyl phosphonic acid monomethylester, acrylamido methyl propyl phosphonic acid or acrylamido methylene phosphonic acid.

The monomer (iii) is preferably a monoethylenically unsaturated carboxylic acid or a monoethylenically unsaturated sulfonic acid, or salt forms thereof. The monomer (iii) is preferably a monoethylenically unsaturated $C_3$ to $C_8$ mono- or dicarboxylic acid, a monoethylenically unsaturated sulfonic acid or vinyl phosphonic acid or salt forms thereof. The monomer (iii) is very preferably a monoethylenically unsaturated $C_3$ to $C_8$ mono- or dicarboxylic acid, vinylsulfonic acid, acrylamido-2-methyl-propanesulfonic acid, methacrylamido-2-methyl-propanesulfonic acid or vinyl phosphonic acid, or salt forms thereof. A monoethylenically unsaturated $C_3$ to $C_8$ mono- or dicarboxylic acid or salt forms thereof. Acrylic acid, methacrylic acid, vinylsulfonic acid or acrylamido-2-methyl-propanesulfonic acid or salt forms thereof is/are particularly preferred.

Acrylic acid or methacrylic acid or salt forms thereof is/are especially preferred. Acrylic acid, sodium acrylate, methacrylic acid or sodium methacrylate are very especially preferred. Preferably, the numerical proportion of the acrylic acid and of the methacrylic acid or salt forms thereof in the total number of all monomers (iii) is 30 to 100%, very preferably 50 to 100%, particularly preferably 80 to 100%, and very particularly preferably 95 to 100%.

A method in which the monomer (iii) is a monoethylenically unsaturated carboxylic acid or a monoethylenically unsaturated sulfonic acid or salt forms thereof is preferred.

A method in which the monomer (iii) is acrylic acid, methacrylic acid, vinylsulfonic acid or 2-acrylamido-2-methylpropanesulfonic acid or salt forms thereof is preferred.

The total amount of all monomers (iii) is preferably 0 to 40 mol % in relation to all monomers polymerised in order to obtain the starting polymer V, i.e. all monomers (i), (ii), optionally (iii), optionally (iv) and optionally (v), very preferably 0 to 30 mol %, particularly preferably 0 to 25 mol %, especially preferably 1 to 25 mol %, very especially preferably 2 to 23 mol %, expressly preferably 3 to 21 mol % and very expressly preferably 5 to 18 mol %. The condition remains that the sum of all monomers (i), (ii), (iii), (iv) and (v) gives 100 mol %.

It has surprisingly been found that certain starting polymers V have an advantage for industrial production with regard to the alkaline hydrolysis to form the final polymer A. If a starting polymer V contains a monomer (iii), in the case of alkaline hydrolysis to form the final polymer A there is thus an avoidance or at least a mitigation of a viscosity peak occurring during the alkaline hydrolysis. The occurrence, the mitigation or avoidance of the viscosity peak is described in FIG. 1 and in Table A-4-1 of the "Examples" part. The observation of a reduced or even inverted vortex at the agitator shaft during the hydrolysis tests in the "Examples" part serves as an indicator for the occurrence of a viscosity peak and quantitative grading thereof. The gradings constituted by none, minimal, low and moderate in the "Examples" part herein are considered to be an intermediate viscosity increase which are still acceptable and manageable in the event of industrial production (scale-up). The gradings constituted by none, minimal and low are preferred, whilst none and minimal are very preferred. Accordingly, a starting polymer V which has a content of monomer (iii) is preferred for use in a method.

A method in which the monomer (iii) is used in an amount of from 1 to 25 mol % is preferred.

The total amount of all monomers (iv) is preferably 0 to 7 mol % in relation to all monomers polymerised in order to obtain the starting polymer V, i.e. all monomers (i), (ii), optionally (iii), optionally (iv) and optionally (v), very preferably 0 to 5 mol %, particularly preferably 0 to 3 mol %, very particularly preferably 0.5 to 2 mol %, and especially preferably 1 to 1.5 mol %. The condition remains that the sum of all monomers (i), (ii), (iii), (iv) and (v) gives 100 mol %.

The monomer (v) also comprises a mixture of individual monomers falling under the monomer (v).

Examples of monomers (v) are
(v-1) a monoethylenically unsaturated monomer, which at pH=7 carries no charge,
(v-2) a diethylenically unsaturated monomer, which at pH=7 does not carry a charge and the two ethylenically double bonds of which are conjugated,
(v-3) a monoethylenically unsaturated monomer, which carries at least one primary, secondary or tertiary amino group and which at pH=7 carries a positive charge, or salt form thereof,
(v-4) a twice allyl-substituted amine, the nitrogen atom of which is not quaternised,
(v-5) a monoethylenically unsaturated monomer, which carries at least one permanent positive charge,
(v-6) a monomer which comprises at least two ethylenically unsaturated double bonds, which are not conjugated, and which is different from a twice allyl-substituted amine.

In the case of monomers (v) that carry a charge, the salt form thereof is also meant and included accordingly. A permanently positive charge is always present as a positive charge independently of the pH value.

Examples of a monomer (v-1) are monoesters of α,β-ethylenically unsaturated monocarboxylic acids with $C_5$-$C_{18}$ alkanols, monoesters of α,β-ethylenically unsaturated monocarboxylic acids with $C_2$-$C_{18}$ alkanediols, diesters of α,β-ethylenically unsaturated dicarboxylic acids with $C_1$-$C_{18}$ alkanols or $C_2$-$C_{18}$ alkanediols, primary amides of α,β-ethylenically unsaturated monocarboxylic acids, N alkylamides of α,β-ethylenically unsaturated monocarboxylic acids, N,N-dialkylamides of α,β-ethylenically unsaturated monocarboxylic acids, dinitriles of α,β-ethylenically unsaturated dicarboxylic acids, esters of vinyl alcohol with $C_1$-$C_{18}$ monocarboxylic acids, esters of allyl alcohol with $C_1$-$C_{30}$ monocarboxylic acids, N-vinyl lactams, nitrogen-free heterocycles with a α,β-ethylenically unsaturated double bond, vinyl aromatics, vinyl halides, vinylidene halides or $C_2$-$C_8$ mono olefins.

Monoesters of α,β-ethylenically unsaturated monocarboxylic acids with $C_5$-$C_{18}$ alkanols are, for example, n-hexyl acrylate, n-hexyl methacrylate, n-octyl acrylate, n-octyl methacrylate, 1,1,3,3-tetramethylbutyl acrylate, 1,1,3,3-tetramethylbutyl methacrylate or 2-ethylhexyl acrylate.

Monoesters of α,β-ethylenically unsaturated monocarboxylic acids with $C_2$-$C_{18}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate or 6-hydroxyhexyl methacrylate.

Primary amides of α,β-ethylenically unsaturated monocarboxylic acids are, for example, acrylic acid amide or methacrylic acid amide.

N alkyl-amides of α,β-ethylenically unsaturated monocarboxylic acids are, for example, N-methyl acrylamide, N-methyl methacrylamide, N-isopropyl acrylamide, N-isopropyl methacrylamide, N-ethyl acrylamide, N-ethyl methacrylamide, N-(n-propyl) acrylamide, N-(n-propyl) methacrylamide, N-(n-butyl) acrylamide, N-(n-butyl) methacrylamide, N-(tert.-butyl) acrylamide, N-(tert.-butyl) methacrylamide, N-(n-octyl) acrylamide, N-(n-octyl) methacrylamide, N-(1,1,3,3-tetramethylbutyl) acrylamide, N-(1,1,3,3-tetramethylbutyl) methacrylamide, N-(2-ethylhexyl) acrylamide or N-(2-ethylhexyl) methacrylamide.

N,N-dialkylamides of α,β-ethylenically unsaturated monocarboxylic acids are, for example, N,N-dimethyl acrylamide or N,N-dimethyl methacrylamide.

Esters of vinyl alcohol with $C_1$-$C_{30}$ monocarboxylic acid are, for example, vinyl formate, vinyl acetate or vinyl propionate.

N-vinyl lactams are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.

Vinyl aromatics are, for example, styrene or methylstyrene. Vinyl halides are, for example, vinyl chloride or vinyl fluoride. Vinylidene halides are, for example, vinylidene chloride or vinylidene fluoride. $C_2$-$C_8$ monoolefins are, for example, ethylene, propylene, isobutylene, 1-butene, 1-hexene or 1-octene.

A preferred monomer (v-1) is 2-hydroxyethyl acrylate, 2-hydroxyethyl methacrylate, 2-hydroxyethyl ethacrylate, 2-hydroxypropyl acrylate, 2-hydroxypropyl methacrylate, vinylpyrrolidone or vinyl acetate.

Examples of a monomer (v-2) are $C_4$-$C_{10}$ olefins with precisely two double bonds which are conjugated, for example butadiene or isoprene.

Examples of a monomer (v-3) are esters of α,β-ethylenically unsaturated monocarboxylic acids with amino alcohols, mono- and diesters of α,β-ethylenically unsaturated dicarboxylic acids with amino alcohols, amides of α,β-ethylenically unsaturated monocarboxylic acids with dialkylated diamines, N-vinyl imidazole or vinyl pyridine.

In the esters of α,β-ethylenically unsaturated monocarboxylic acids with amino alcohols, the acid component is preferably acrylic acid or methacrylic acid. The amino alcohols, preferably $C_2$-$C_{12}$ amino alcohols, can be $C_1$-$C_8$-mono- or $C_1$-$C_8$-dialkylated on the amine nitrogen. Examples are dialkylaminoethyl acrylates, dialkylaminoethyl methacrylates, dialkylaminopropyl acrylates or dialkylaminopropyl methacrylates. Individual examples are N-methylamino ethyl acrylate, N-methylamino ethyl methacrylate, N,N-dimethylamino ethyl acrylate, N,N-dimethylamino ethyl methacrylate, N,N-diethylamino ethyl acrylate, N,N-diethylamino ethyl methacrylate, N,N-dimethylamino propyl acrylate, N,N-dimethylamino propyl methacrylate, N,N-diethylamino propyl acrylate, N,N-diethylamino propyl methacrylate, N,N-dimethylamino cyclohexyl acrylate or N,N-dimethylamino cyclohexyl methacrylate.

In the mono- and diesters of α,β-ethylenically unsaturated dicarboxylic acids with amino alcohols, the acid component is preferably fumaric acid, maleic acid, monobutyl maleate, itaconic acid or crotonic acid. The amino alcohols, preferably $C_2$-$C_{12}$ amino alcohols, can be $C_1$-$C_8$-mono- or $C_1$-$C_8$-dialkylated on the amine nitrogen.

Amides of α,β-ethylenically unsaturated monocarboxylic acids with dialkylated diamines are, for example, dialkylaminoethylacrylamides, dialkylaminoethylmethacrylamides, dialkylaminopropylacrylamides or dialkylaminopropylacrylamides. Individual examples are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)-ethyl]acrylamide or N-[2-(diethylamino)ethyl]methacrylamide.

Examples of a monomer (v-4) are diallylamine or methyl diallylamine.

Examples of a monomer (v-5) are diallylamines which are quaternised on the nitrogen atom, a salt form of an N alkyl-N'-vinyl imidazolium, a salt form of an N-alkylated vinyl pyridinium, a salt form of an acrylamido alkyl trialkyl ammonium or a salt form of a methacrylamido alkyl trialkyl ammonium. A diallylamine which is quaternised on the nitrogen atom is, for example, diallyldimethylammonium chloride, diallyldiethylammonium chloride, diallyldipropylammonium chloride or diallyldibutylammonium chloride. A salt form of an N alkyl-N'-vinylimidazolium is, for example, 1-methyl-3-vinyl-imidazol-1-ium chloride, 1-methyl-3-vinyl-imidazol-1-ium methylsulfate or 1-ethyl-3-vinyl-imidazol-1-ium chloride. A salt form of an N-alkylated vinyl pyridinium is, for example, 1-methyl-4-vinyl-pyridin-1-ium chloride, 1-methyl-3-vinyl-pyridin-1-ium chloride, 1-methyl-2-vinyl-pyridin-1-ium chloride or 1-ethyl-4-vinyl-pyridin-1-ium chloride. A salt form of an acrylamido alkyl trialkyl ammonium is, for example, acrylamido ethyl trimethyl ammonium chloride (trimethyl-[2-(prop-2-enoylamino)ethyl]ammonium chloride), acrylamido ethyl diethyl methyl ammonium chloride (diethyl-methyl-[3-(prop-2-enoylamino)ethyl]ammonium chloride), acrylamido propyl trimethyl ammonium chloride (trimethyl-[3-(prop-2-enoylamino)propyl]ammonium chloride) or acrylamido propyl diethyl methyl ammonium chloride (diethyl-methyl-[3-(prop-2-enoylamino)propyl]ammonium chloride). A salt form of a methacrylamido alkyl trialkyl ammonium is, for example, methacrylamido ethyl trimethyl ammonium chloride (trimethyl-[2-(2-methylprop-2-enoylamino)ethyl]ammonium chloride), methacrylamido ethyl diethyl methyl ammonium chloride (diethyl-methyl-[3-(2-methylprop-2-enoylamino)ethyl]ammonium chloride), methacrylamido propyl trimethyl ammonium chloride (trimethyl-[3-(2-methylprop-2-enoylamino)propyl]ammonium chloride) or methacrylamido propyl diethyl methyl ammonium chloride (diethyl-methyl-[3-(2-methylprop-2-enoylamino)propyl]ammonium chloride).

An example of a monomer (v-6) is tetraallyl ammonium chloride, triallyl amine, methylene bisacrylamide, glycol diacrylate, glycol dimethacrylate, glycerine triacrylate, pentaerythritol triallyl ether, N,N-divinyleethylene urea, polyalkylene glycols or polyols esterified at least twice with acrylic acid and/or methacrylic acid, such as pentaerythritol, sorbitol and glucose.

A monomer (v) which is not an ester of acrylic acid of methacrylic acid is preferred. A monomer (v) which is not an ester of an ethylenically unsaturated carboxylic acid is very preferred.

The numerical proportion of the monomers (v-1) is preferably 50 to 100% of the total number of all monomers (v). 80 to 100% are particularly preferred; 95 to 100% are very particularly preferred. The following monomers (v-1) are especially preferred for the aforementioned proportions in the total number of all monomers (v): 2-hydroxyethyl acrylate, 2-hydroxyethyl methacrylate, 2-hydroxyethyl ethacrylate, 2-hydroxypropyl acrylate, 2-hydroxypropyl methacrylate, vinylpyrrolidone or vinyl acetate.

The numerical proportion of the monomers (v-3, (v-4) and (v-5) is preferably 50 to 100% of the total number of all monomers (v). 80 to 100% are particularly preferred; 95 to 100% are very particularly preferred.

The numerical proportion of the monomers (v-3, (v-4) and (v-5) is preferably 50 to 100% of the total number of all monomers (v). 80 to 100% are particularly preferred; 95 to 100% are very particularly preferred.

The total amount of all monomers (v) is preferably 0 to 25 mol % in relation to all monomers polymerised in order to obtain the starting polymer V, i.e. all monomers (i), (ii), optionally (iii), optionally (iv) and optionally (v), very preferably 0 to 24 mol %, particularly preferably 0 to 19 mol %, especially preferably 0.01 to 15 mol %, very especially preferably 0.1 to 8 mol %, expressly preferably 0.2 to 4 mol % and very expressly preferably 0.4 to 2 mol %. The condition remains that the sum of all monomers (i), (ii), (iii), (iv) and (v) gives 100 mol %.

In the case of acrylamide as a representative of a monomer (v-1), the amount for acrylamide is preferably 0 to 6 mol %, wherein the specified mole percentage relates to the total number of all monomers (i), (ii), (iii), (iv) and (v) and the total number of all monomers is 100 mol %. The amount of acrylamide is very preferably 0 to 5 mol %, particularly preferably 0 to 3 mol %, very particularly preferably 0 to 2 mol %, especially preferably 0 to 1 mol %, and expressly preferably acrylamide is not present at all.

A method in which the monomers (v) comprise an amount of from 0 to 6 mol % acrylamide, the mole percentage relates to the total number of all monomers (i), (ii), (iii), (iv) and (v), and the total number of all monomers is 100 mol %.

A monomer (v-6) acts as crosslinker. If a crosslinker is used, the used amount is preferably 0.001 to 1 mol %, in relation to the total number of all monomers (i), (ii), (iii), (iv) and (v) and the total number of all monomers is 100 mol %, very preferably 0.01 to 0.5 mol %, and particularly preferably 0.015 to 0.1 mol %. Preferably, no monomer (v-6) is used for the radical polymerisation.

The starting polymer V is preferably present in the form of an aqueous dispersion or solution. The water content of the aqueous dispersion or solution is very preferably 75 to 95% by weight, and the content of starting polymer V is 5 to 25% by weight, wherein the content of starting polymer V is determined as solid content. The determination of the solid content is described in the experimental part. The aqueous dispersion preferably has a pH value of above 6, very preferably between pH 6.1 and pH 9, and particularly preferably between pH 6.2 and pH 6.8. It is possible to set a corresponding pH for example by adding an acid and/or base, possibly with buffer function.

A method in which the monomers
(i) 50 to 89 mol % of a monomer of formula I
(ii) 5 to 45 mol % of a $C_1$-$C_4$ alkyl ester of acrylic acid or of a $C_1$-$C_4$ alkyl ester of methacrylic acid,
(iii) 0 to 30 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
are used for the radical polymerisation is preferred.

A method in which the monomers
(i) 58 to 83 mol % of a monomer of formula I
(ii) 8 to 39 mol % of a $C_1$-$C_4$ alkyl ester of acrylic acid or of a $C_1$-$C_4$ alkyl ester of methacrylic acid,
(iii) 0 to 25 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
are used for the radical polymerisation is preferred.

A method in which the monomers
(i) 60 to 83 mol % N-vinylformamide,
(ii) 8 to 25 mol % ethyl acrylate,
(iii) 3 to 21 mol % acrylic acid or methacrylic acid or salt forms thereof,
(iv) 0 to 9 mol % acrylonitrile or methacrylonitrile,
(v) 0 to 24 mol % of one or more ethylenically unsaturated monomers which are different from a monomer (i), (ii), (iii) and (iv),
are used for the radical polymerisation is preferred.

A method in which the monomers
(i) 60 to 83 mol % N-vinylformamide,
(ii) 8 to 21 mol % ethyl acrylate,
(iii) 3 to 21 mol % acrylic acid or methacrylic acid or salt forms thereof,
(iv) 0 to 9 mol % acrylonitrile or methacrylonitrile,
(v) 0 to 24 mol % of one or more ethylenically unsaturated monomers which are different from a monomer (i), (ii), (iii) and (iv),
are used for the radical polymerisation is preferred.

The final polymer A is obtained by partial or complete hydrolysis of the starting polymer V. As is known, for example in EP 0438744 A1, page 8/lines 26 to 34, the amide group of the units of the monomers (i) polymerised into the starting polymer, i.e. the N—C(=O)R$^1$ group in formula (I), can hydrolyse at least in part to form primary amino groups. With cleavage of a carboxylic acid, for example formic acid or formate in the case of R$^1$=H, a primary amino group is created. If not all amide groups are hydrolysed, it is known, by condensation of the primary amino group with an adjacent amide group, to form a cyclic, six-membered amidine in the final polymer A, possibly in accordance with the following reaction schema.

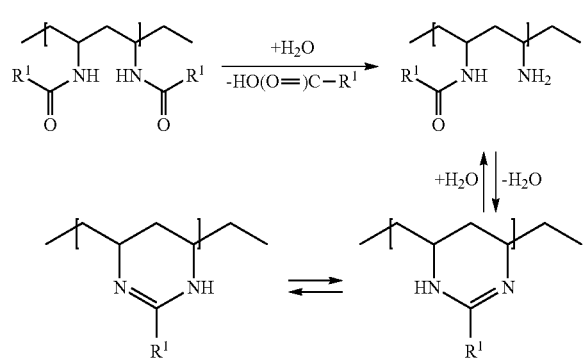

In the case of the polymerisation of ethylene derivatives substituted with cyanogen directly on the ethylene function, for example a monomer (iv), the starting polymer V additionally contains cyanogen groups. The primary amino group created by hydrolysis in the final polymer A can react with one of the cyanogen groups, as is known, to form a cyclic 5-membered amidine. In this regard the hydrolysis leads to an amide group, in this case to a five-membered amidine group on the final polymer A in accordance with the following reaction schema. In the reaction schema here the ethylene derivative substituted with cyanogen is in this case acrylonitrile that has been polymerised in.

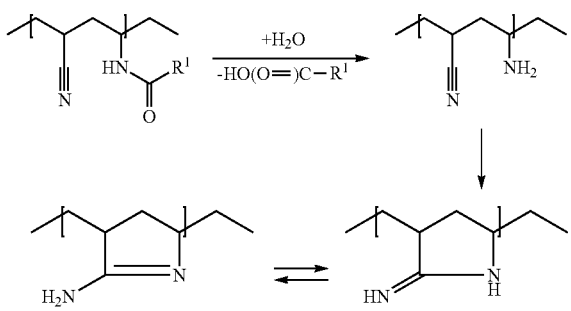

In both described cases the hydrolysis of an amide group that originates from a monomer of formula I leads to a primary amino group or an amidine group. A primary amino group or an amidine group is positive charged at pH=7 and corresponds to a cationic charge in the final polymer A.

The conditions for hydrolysis of the amide groups in the final polymer A which stem from monomers of formula I can also lead to the hydrolysis of other groups in the starting polymer V that are sensitive to hydrolysis under these conditions. It is thus known, for example in EP 0216387 A2, column 6/lines 7 to 43, or in WO 2016/001016 A1, page 17/lines 1 to 8, to hydrolyse acetate groups in the starting polymer V which stem from vinyl acetate as monomer (v-1) that has been polymerised in. Accordingly, a secondary hydroxy group as described hereinafter is created in the final polymer A.

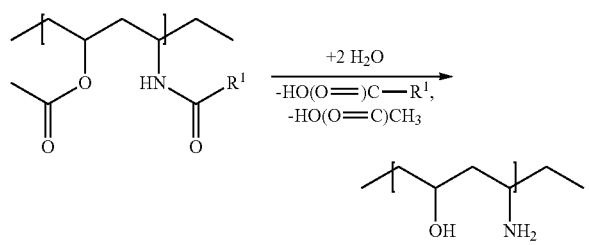

Monomers (ii) mean that ester groups are present in the starting polymer V. Under the acidic or basic conditions for hydrolysis of the amide groups in the final polymer A that stem from monomers of formula I, an at least partial conversion of the ester groups is observed. One conversion is the formation of a five-membered lactam structural unit with an obtained amino group. Another conversion is the formation of a carboxylic acid group. The subsequent reaction schema shows some of the reaction paths.

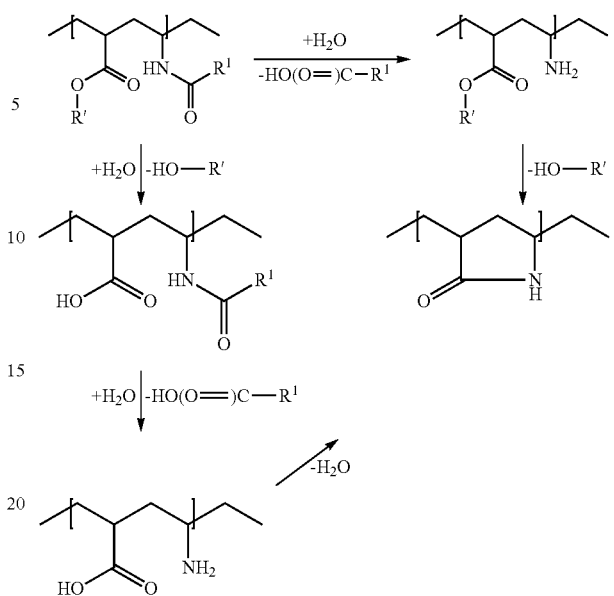

The number of units of monomers of formula (I) that are polymerised into the starting polymer V and that are hydrolysed in the final polymer A can be determined experimentally by quantitative detection of the carboxylic acids $HOC(=O)R^1$ cleaved off from the groups $N-C(=O)R^1$. In the case of $R^1=H$ the released amount of formic acid or formate can be determined, for example enzymatically, with the aid of a test set from Boehringer Mannheim. The number of hydrolysed $N-C(=O)R^1$ groups from the polymerised-in units of formula I in relation to all polymerised-in units of formula I multiplied by 100 mol % gives the degree of hydrolysis (=HA). At least 50 to 100 mol % of the monomers (i) polymerised into the starting polymer V in relation to the number of all monomers (i) polymerised into the starting polymer V are preferably hydrolysed. Very preferably at least 65 to 100% are hydrolysed, particularly 70 to 100%, very particularly 72 to 100%, especially preferably 85 to 99.9%, very especially preferably 94 to 99.5%, and expressly preferably 94 to 99%.

A method in which at least 50 to 100% of the monomers (i) polymerised into the starting polymer V in relation to the number of all monomers (i) polymerised into the starting polymer V are hydrolysed is preferred.

A method in which at least 70 and at most 99.5% of the polymerised-in monomers (i) in relation to the number of all monomers (i) polymerised into the starting polymer V are hydrolysed is preferred.

The number of units of the monomers (ii) that are polymerised into the starting polymer V and that are converted in the final polymer A can be determined experimentally by quantitative detection of the alcohols cleaved off from the ester groups. Gas chromatography or high-pressure liquid chromatography is suitable for the quantitative detection of the cleaved-off alcohol. The number of converted ester groups from the polymerised-in monomers (ii) in relation to all polymerised-in monomers (ii) multiplied by 100 mol % gives the degree of conversion (=HE). At least 50 to 100% of the monomers (ii) polymerised into the starting polymer V in relation to the number of all monomers (ii) polymerised into the starting polymer V are preferably converted. Very preferably at least 70 to 100% are converted, particularly 86 to 100%, very particularly 90 to 100%, especially preferably 95 to 99.9%, very especially preferably 98 to 99.5%, and expressly preferably 100%.

A method in which at least 50 to 100% of the monomers (ii) polymerised into the starting polymer V in relation to the number of all monomers (ii) polymerised into the starting polymer V are converted is preferred.

A method in which at least 90 and at most 99.5% of the polymerised-in monomers (ii) in relation to the number of all monomers (ii) polymerised into the starting polymer V are converted is preferred.

A method in which at least 70 to 100% of the monomers (i) polymerised into the starting polymer V in relation to the number of all monomers (i) polymerised into the starting polymer V are hydrolysed and at least 90 to 100% of the monomers (ii) polymerised into the starting polymer V in relation to the number of all monomers (ii) polymerised into the starting polymer V are converted is preferred.

The starting polymer V is preferably subject to alkaline, acid or enzymatic hydrolysis, very preferably alkaline or acid hydrolysis, and particularly preferably alkaline hydrolysis. In the case of acid hydrolysis the amino groups in the final polymer A are present in salt form. The attained degree of hydrolysis (=HA) and the attained degree of conversion (=HE) are dependent on the acid or base, the used amount of acid or base, the applied temperature, and the reaction duration. The hydrolysis is preferably performed at temperatures of from 20 to 170° C., very preferably in the range of from 50 to 140° C. The hydrolysis can be performed at normal pressure, at reduced pressure, or at elevated pressure, i.e. in the range of from 100 mbar to 16 bar. Hydrolysis at normal pressure is preferred. Metal hydroxides of the first and second main group of the Periodic Table of Elements are suitable for alkaline hydrolysis, for example lithium hydroxide, sodium hydroxide, potassium hydroxide, magnesium hydroxide or calcium hydroxide, and ammonia and derivatives of ammonia, for example triethylamine, monoethanolamine, diethanolamine, triethanolamine or morpholine. Preferred are metal hydroxides of the first and second main group of the Periodic Table of Elements, very preferred are sodium hydroxide, potassium hydroxide, magnesium hydroxide or calcium hydroxide, particularly preferred are sodium hydroxide or potassium hydroxide, and very particularly preferred is sodium hydroxide. Mineral acids such as hydrogen halides, sulfuric acid, nitric acid and phosporic acid as well as organic acids such as formic acid, acetic acid, propionic acid, benzosulfonic acid, alkylsulfonic acid and phosphonic acids are suitable for the acid hydrolysis. Hydrochloric acid and sulfuric acid are preferred. In relation to the sum of the molar fractions of N-vinylamides and (meth)acrylic acid esters in the starting polymer V, 0.2-2.0 equivalents of acid or base are preferably used. Very preferred are 0.5 to 1.5 equivalents, and particularly preferably 0.7-1.2 equivalents. A base or acid is preferably added to the starting polymer V numerically in an amount corresponding to between 30 and 150 mol % of the number of monomers (i) polymerised in the starting polymer V. The amount is very preferably between 90 and 150 mol %, particularly preferably between 100 and 140 mol %, and very particularly preferably between 110 and 130 mol %. A base or acid is preferably added in an amount of from 30 to 130 mol % in relation to all monomers (i), (ii), (iii), (iv) and (v). The hydrolysis is performed preferably in an aqueous solution, very preferably in an aqueous solution with a water content between 40 and 95% by weight in relation to the total weight of the aqueous solution, particularly preferably between 60 and 94% by weight, and very particularly preferably between 75 and 93% by weight.

A method in which the starting polymer V is subjected to alkaline hydrolysis to form the final polymer A is preferred.

As described before, starting polymers V with a content of monomer (iii) have an advantageous property in the case of alkaline hydrolysis.

A method in which for the starting polymer V 1 to 25 mol % of the monomer (iii) is used for radical polymerisation and the starting polymer V is subjected to alkaline hydrolysis to form the final polymer A is preferred. The final polymer A preferably contains five-membered lactam structural units. The structural units of the final polymer A are on the one hand all monomers (i), (ii), optionally (iii), optionally (iv) and optionally (v) polymerised into the starting polymer V. Furthermore, they are also structural units that are produced potentially by the hydrolysis. These include the aforementioned six-membered amidines, the aforementioned five-members amidines, the aforementioned ethylene units with secondary hydroxy groups, the aforementioned five-membered lactams, and the aforementioned esters of acrylic acid or methacrylic acid hydrolysed to give carboxylic acid. Two polymerised-in monomers of the starting polymer V are used up for some of these structural units. Thus, the total number of all structural units of the final polymer A is that of the total amount of all monomer (i), (ii), (iii), (iv) and (v) which are polymerised to form the starting polymer V, minus a correction number for those structural units that are formed from two polymerised-in monomers. By way of example, this is presented hereinafter on the basis of formula (II)

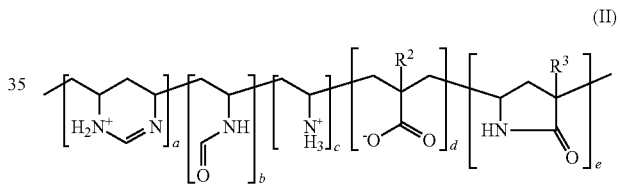

(II)

wherein $R^2$=H or is $C_1$ alkyl and $R^3$=H or is $C_1$ alkyl, a, b, c, d and e is the mole percentage proportion (=mol %) of the structural unit, f is the mole percentage fraction (=mol %) of at least one polymerised-in further structural unit (not shown in formula (II)), and the sum of a, b, c, d, e and f is 100 mol %.

A final polymer A of formula (II) is preferred. Very preferred is a final polymer A of formula (II), wherein in formula (II) a is 0.1 to 20 mol %, b is 0 to 10 mol %, c is 25 to 85 mol %, d is 1 to 50 mol %, e is 1 to 50 mol %, and f is 0 to 40 mol %, and wherein the sum of all structural units a, b, c, d, e and f is 100 mol %. Particularly preferably in formula (II) a is 0.1 to 20 mol %, b is 0 to 20 mol %, c is 25 to 85 mol %, d is 1 to 50 mol %, and e is 1 to 50 mol %, wherein the sum of all structural units a, b, c, d and e is 100 mol %. Very preferably in formula (II) $R^2$=$R^3$=H, a is 0.1 to 20 mol %, b is 0 to 20 mol %, c is 25 to 85 mol %, d is 1 to 50 mol %, e is 1 to 50 mol %, and any other different structural units f are 0 to 40 mol %, wherein the sum of all structural units a, b, c, d, e and f is 100 mol %. Particularly preferably in formula (II) $R^2$=$R^3$=H, a is 0.1 to 20 mol %, b is 0 to 20 mol %, c is 25 to 85 mol %, d is 1 to 50 mol %, and e is 1 to 50 mol %, wherein the sum of all structural units a, b, c, d and e is 100 mol %.

The content of lactam structural units is very preferably 10 to 60 mol %, wherein the percentage relates to the total number of all structural units of the final polymer A. The content is particularly preferably 15 to 50 mol %, very particularly preferably 17 to 35 mol %. The aforementioned contents are especially preferably valid for a final polymer A in an aqueous environment at a pH value of from 3.5 to 9 and expressly at a pH value of 3.5.

Preferred is a method in which the ester groups of the monomers (ii) polymerised into the start polymer V are converted at least in part and at least part of the conversion is the formation of five-membered lactam structural units with the obtained primary amino groups.

The final polymer A preferably has a weight-average molecular weight M, between 8,000 and 8,000,000 Dalton. The final polymer A very preferably has a weight-average molecular weight M, between 16,000 and 4,000,000 Dalton, particularly preferably between 80,000 and 3,600,000 Dalton, very particularly preferably between 150,000 and 2,000,000 Dalton, and especially preferably between 170,000 and 1,200,000 Dalton. The weight-average molecular weight can be determined by static light scattering.

The final polymer A is preferably cationic, very preferably amphoteric-cationic. The final polymer A is cationic when the total number of all positive charges in the final polymer A is greater than the total number of all negative charges in the final polymer A at the present pH value, preferably at a pH value of 7. To this end, the corresponding charge-carrying structural units are considered with their charge at a formal pH value of 7. The final polymer A is amphoteric-cationic when the total number of all positive charges in the final polymer A is greater than the total number of all negative charges in the final polymer A and at the same time negative charges are present in the final polymer A at the present pH value, preferably at a pH value of 7. This is also true under consideration of the charge-carrying structural units at a formal pH value of 7. The number of monomers (i) polymerised in the starting polymer V and their degree of hydrolysis in the final polymer A are the most important possibility for generating positive charges in the final polymer A. To this end, it is possible that monomers (v) introduce a positive charge into the starting polymer V and that this positive charge is still present in the final polymer A also after hydrolysis to give the final polymer A.

The final polymer A preferably has a positive charge density. The charge density is very preferably determined by polyelectrolyte titration with potassium polyvinyl sulfonate. The charge density is very preferably determined at a pH value of 3.5 in an aqueous environment. The charge density is particularly preferably determined by polyelectrolyte titration with potassium polyvinyl sulfonate at a pH value of 3.5 in an aqueous environment. The positive charge density is preferably between 2 and 16 mmol/g, wherein 1 g relates to polymer content in the final polymer A. 4 to 14 mmol/g, particularly preferably 5 to 12 mmol/g, is very preferred.

The final polymer A is preferably present in the form of an aqueous dispersion or solution. The water content of the aqueous dispersion or solution is very preferably 75 to 95% by weight, and the content of final polymer A is 5 to 25% by weight, wherein the content of final polymer A is determined as polymer content. The aqueous dispersion or solution preferably has a pH value of above 5, very preferably between pH 6 and pH 9, particularly preferably between pH 6 and pH 8, and very particularly preferably between pH 6.1 and 6.8. It is possible to set a corresponding pH for example by adding an acid and/or base. The positive charge density of the final polymer A, which is present as an aqueous dispersion or solution, is preferably between 20 and 120 mmol/100 g, wherein 100 g relates to aqueous dispersion or solution of the final polymer A. 30 to 100 mmol/100 g, particularly preferably 35 to 90 mmol/100 g, is very preferred.

Very preferred is a method in which the final polymer A is obtainable by
radical polymerisation of the monomers
(i) 58 to 83 mol % of a monomer of formula I

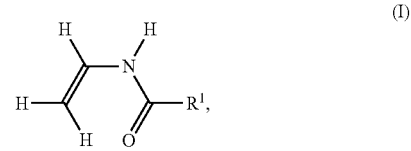

in which $R^1$=H or means $C_1$-$C_6$ alkyl,
(ii) 8 to 39 mol % of a $C_1$-$C_4$ alkyl ester of acrylic acid or of a $C_1$-$C_4$ alkyl ester of methacrylic acid,
(iii) 0 to 25 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
wherein the total amount of all monomers (i), (ii), (iii), (iv) and (v) is 100 mol %, in order to obtain a starting polymer V, and
hydrolysing the starting polymer V in order to obtain the final polymer A, wherein the N—C(=O)$R^1$ groups of formula (I) of the monomers (i) polymerised into the starting polymer V hydrolyse at least in part and in so doing form primary amino groups,
wherein the ester groups of the monomers (ii) polymerised into the starting polymer V are converted at least in part and at least part of the conversion is the formation of five-membered lactam structural units with the obtained primary amino groups or the formation of carboxylic acid groups or salt forms thereof, The final polymer A is preferably added to the first aqueous fibrous material suspension as an aqueous dispersion or solution of the final polymer A with a pH value of more than 5, very preferably between pH 6 and 9, particularly preferably between pH 6 and 8, and very particularly preferably between pH 6.1 and 6.8.

A method in which in step (A) the final polymer A is added as an aqueous dispersion or aqueous solution with a pH value of from 5 to 9 to the first aqueous fibrous material suspension is preferred.

The second aqueous fibrous material suspension containing final polymer A contains
(a-a) water
(a-b) fibrous material
(a-c) final polymer A.

A possible further constituent of the second aqueous fibrous material suspension is (a-d) an organic polymer which is different from a fibrous material and final polymer A. The organic polymer (a-d) may be neutral, cationic or anionic.

A neutral organic polymer (a-d) may be uncharged-neutral because it does not contain any polymer units with a functional group carrying out least one charge at a pH value of 7. Examples of a neutral organic polymer (a-d) which does not contain any polymer units with a functional group carrying a charge at a pH value of 7 are polyacrylamide, poly(acrylamide-co-acrylonitrile), poly(vinylalcohol) or poly(vinylalcohol-co-vinylacetate).

A natural organic polymer (a-d) may also be amphoteric-neutral because it contains polymer units with a functional group carrying a negative charge at least at a pH value of 7, and also polymer units with a functional group carrying a positive charge at least at a pH value of 7, wherein furthermore the number of all negative charges and the number of all positive charges of the functional groups cancel one another out.

A cationic organic polymer (a-d) can be pure-cationic, i.e. it contains polymer units with a functional group carrying a positive charge at least at a pH value of 7, however it does not contain any polymer units with a functional group carrying a negative charge at least at a pH value of 7.

Examples of a pure-cationic organic polymer (a-d) are poly(allylamine), poly(diallylamine), poly(diallyldimethyl ammonium chloride), poly(acrylamide-co-diallyldimethyl-ammonium chloride) or poly(acrylamide-co-2-(N,N,N-trimethylammonium)ethylacrylate chloride).

A cationic organic polymer (a-d) can also be amphoteric-cationic, i.e. it contains polymer units with a functional group carrying a positive charge at least at a pH value of 7, and polymer units with a functional group carrying a negative charge at least at a pH value of 7, and the number of all positive charges is greater than the number of all negative charges of the functional groups.

A cationic organic polymer (a-d) can be pure-anionic, i.e. it contains polymer units with a functional group carrying a negative charge at least at a pH value of 7, however it does not contain any polymer units with a functional group carrying a positive charge at least at a pH value of 7.

Examples of a pure-anionic organic polymer (a-d) are poly(acrylic acid), poly(styrene-co-n-butylacrylate-co-acrylic acid) or poly(acrylamide-co-acrylonitrile-co-acrylic acid).

An anionic organic polymer (a-d) can also be amphoteric-anionic, i.e. it contains polymer units with a functional group carrying a negative charge at least at a pH value of 7, and polymer units with a functional group carrying a positive charge at least at a pH value of 7, and the number of all negative charges is greater than the number of all positive charges of the functional groups.

The organic polymer (a-d) can additionally also be distinguished on the basis of whether it is linear, branched or crosslinked. A crosslinking can be performed for example by adding a crosslinker already during the polymerisation of the starting monomers or by adding a crosslinker once the polymerisation is complete, in particular also just before the addition of the organic polymer (a-d) to the second aqueous fibrous material suspension. For example, polyacrylamide can be crosslinked by adding the crosslinker methylenebisacrylamide to acrylamide already during the polymerisation or only after the polymerisation with a crosslinker such as glyoxal. Both crosslinking types also are combinable as appropriate. Particular mention must be made here of a crosslinked organic polymer, which has a high crosslinking degree typically already during the monomer polymerisation. It is present in the second aqueous fibrous material suspension containing final polymer A in the form of particles, in particular in the form of what are known as organic microparticles.

The organic polymer (a-d) may additionally also be distinguished on the basis of whether it is natural, modified-natural, or synthetic. A natural organic polymer is usually obtained from nature, wherein appropriate isolation steps are applied as appropriate, although no targeted chemical-synthetic modification is performed. An example of a natural organic polymer (a-d) is unmodified starch. Cellulose is not an example of a natural organic polymer (a-d)—it is a fibrous material (a-b) herein. A modified-natural organic polymer is modified by a chemical-synthetic method step. An example of a modified-natural organic polymer (a-d) is cationic starch. A synthetic organic polymer (a-d) is obtained chemically-synthetically from individual monomers. An example of a synthetic organic polymer (a-d) is polyacrylamide.

A method in which in step (A) an organic polymer (a-d) is added to the first fibrous material suspension or the second fibrous material suspension containing final polymer A is preferred. An organic polymer (a-d) which is a modified-natural organic polymer is very preferably added. The organic polymer (a-d) is particularly preferably cationic starch. Cationic starch is very particularly preferably the only organic polymer (a-d) that is added in step (A) to the first fibrous material suspension in addition to final polymer A or the second fibrous material suspension containing final polymer A.

A possible further constituent of an aqueous fibrous material suspension containing final polymer A is (a-e) a filler. A filler (a-e) is an inorganic particle, in particular an inorganic pigment, All pigments based on metal oxides, silicates and/or carbonates used conventionally in the paper industry, in particular pigments from the group consisting of calcium carbonate, which can be used in the form of ground lime, chalk, marble (GCC) or precipitated calcium carbonate (PCC), talc, kaolin, bentonite, satin white, calcium sulfate, barium sulfate and titanium dioxide, can be used as inorganic pigments. An inorganic particle is also a colloidal solution of polysilicic acid in which the silicic acid particles typically have a particle size between 5 and 150 nm.

A filler (a-e) herein also comprises two or more different fillers. Accordingly, filler (a-e) divides as possible further constituent of an aqueous fibrous material suspension into a first filler (a-e-1), a second filler (a-e-2), etc.

Inorganic pigments with a mean particle size (volume mean) ≤510 µm, preferably of from 0.3 to 5 µm, in particular of from 0.5 to 2 µm are preferably used. The mean particle size (volume mean) of the inorganic pigments and of the particles of the powder composition is determined within the scope of this step generally by the method of quasi-elastic light scattering (DIN-ISO 13320-1), for example using a Mastersizer 2000 from Malvern Instruments Ltd.

A method in which in step (A) a filler (a-e) is added to the first fibrous material suspension or the second fibrous material suspension containing final polymer A is preferred.

The total amount of filler (a-e) is preferably 0 to 40% by weight in relation to the formed paper or cardboard and on the basis of a dry content of 100% by weight of the filler (a-e) and a dry content of the paper or cardboard of 100% by weight. The total amount of filler (a-e) is very preferably 5 to 30% by weight, particularly preferably 15 to 25% by weight, and very particularly preferably 15 to 20% by weight.

The formed paper or cardboard preferably contains a total amount of filler (a-e) of from 5 to 30% by weight. Papers of this kind are wood-free papers, for example. The formed paper or cardboard preferably contains a total amount of filler (a-e) of from 5 to 20% by weight. Papers of this kind are used above all as packaging papers. The formed paper or cardboard preferably contains a total amount of filler (a-e) of from 5 to 15% by weight. Papers of this kind are used above all for newspaper printing. The formed paper or cardboard preferably contains a total amount of filler (a-e) of from 25 to 40% by weight. Papers of this kind are SC (super calandered) papers, for example.

In step (A) the final polymer A is added to the first aqueous fibrous material suspension preferably before a filler (a-e) is added. The final polymer A is very preferably added before a filler (a-e) and before an organic polymer (a-d), with the exception of cationic starch. The final polymer A is particularly preferably added to the first aqueous fibrous material suspension before a filler (a-e), before an organic polymer (a-d) with the exception of cationic starch, and before another paper auxiliary (a-f).

In step (A) any added filler (a-e) is added preferably to the second fibrous material suspension containing final polymer A, which has a dry content of from 0.1 to 1.5% by weight. This addition corresponds to what is known as a thick matter addition. The second fibrous material suspension containing final polymer A is already present with this dry content or is diluted beforehand starting from a dry content of from more than 0.15 up to 6.0% by weight to a dry content of from 0.1 to 1.5% by weight.

In step (A) any added filler (a-e) is added preferably to the second fibrous material suspension containing final polymer A, wherein a first part of the total amount of the filler (a-e) to be added is added to the fibrous material suspension containing final polymer A which has a dry content of from more than 0.15 to 6.0% by weight, and a second part of the total amount of the filler (a-e) to be added is added to the fibrous material suspension containing final polymer (A) once this has been diluted to a dry content of from 0.1 to 1.5% by weight. The first part and the second part form the total amount of filler (a-e) to be added. The weight ratio of the first part to the second part is between 5 and 0.2.

A possible further constituent of an aqueous fibrous material suspension containing final polymer A is another paper auxiliary (a-f). Another paper auxiliary (a-f) is different from the aforementioned components (a-b), the final polymer A as (a-c), (a-d) and (a-e). Another paper auxiliary (a-f) is, for example, an internal sizing agent, a water-soluble salt of a trivalent metal cation, an antifoamer, a non-polymeric wet strength agent, a biocide, an optical brightener, or a paper dye. Examples of a sizing agent are alkyl ketene dimers (AKD), alkenyl succinic acid acid anhydrides (ASA) and resin size. Examples of a water-soluble salt of a trivalent metal cation are aluminium (III) salts, in particular $AlCl_3$ such as $AlCl_3.6H_2O$, $Al_2(SO_4)_3$ such as $Al_2(SO_4)_3.18H_2O$, or $KAl(SO_4)_2.12H_2O$. The other paper auxiliaries (a-f(may preferably be added in the usual amounts.

Another paper auxiliary (a-f) is preferably added to the second fibrous material suspension containing final polymer A which has a dry content of from 0.1 to 1.5% by weight. This addition corresponds to what is known as a thick matter addition. The second fibrous material suspension containing final polymer A is already present with this dry content or is diluted beforehand starting from a dry content of from more than 0.15 up to 6.0% by weight to a dry content of from 0.1 to 1.5% by weight.

Another paper auxiliary (a-f) herein also comprises two or more different other paper auxiliaries. Accordingly, the other paper auxiliary (a-f) as potential further constituent of a second aqueous fibrous material suspension containing final polymer A divides into a first other paper auxiliary (a-f-1), a second other paper auxiliary (a-f-2), etc.

Often, in the case of paper production, more than one organic polymer (a-d) and more than one filler (a-e) which is inorganic are added to an aqueous fibrous material suspension. In the case of an organic polymer (a-d) this is used for example to influence technical properties of the paper production method itself or technical properties of the produced paper. Retention agents, dewatering agents, wet strength agents or other dry strength agents are thus used.

Examples of retention agents are cationic, amphoteric or anionic organic polymers (a-d). Examples are an anionic polyacrylamide, a cationic polyacrylamide, a cationic starch, a cationic polyethylene imine, or a cationic polyvinyl amine. In addition, inorganic fillers (a-e) which function as what are known as anionic microparticles can also be added as retention agents. In particular, these include colloidal silicic acid or bentonite. Combinations of the aforementioned examples are possible. In particular, a dual system which consists of a cationic polymer with an anionic microparticle or of an anionic polymer with a cationic microparticle is a potential combination. A synthetic organic polymer (a-d) or a dual system is preferred as retention agent. In the case of a dual system as retention agent a cationic first organic polymer (a-d-1) for example is present in combination with an anionic inorganic microparticle, for example a suitable bentonite, as first filler (a-e-1).

Examples of another dry strength agent are a synthetic organic polymer (a-d), for example polyvinyl amine, polyethylene imine, polyacrylamide or glyoxylated polyacrylamide, a natural organic polymer (a-d) such as unmodified starch, or a modified-natural organic polymer (a-d) such as a cationically modified starch or an oxidatively or enzymatically degraded starch. Another dry strength agent is preferably added to the first aqueous fibrous material suspension or the second aqueous fibrous material suspension containing final polymer A, which both have a dry content of from more than 1.5 to 6.0% by weight. Addition is possible to the first aqueous fibrous material suspension or the second aqueous fibrous material suspension containing final polymer A, each having a dry content of from 0.1 to 1.5% by weight.

In step (B) the second aqueous fibrous material suspension containing final polymer A is applied to the water-permeable substrate. The water-permeable substrate has an upper side and an underside and fine openings, which allow water to pass through but substantially prevent fibrous constituents from passing through. The second fibrous material suspension containing final polymer A is applied uniformly to the water-permeable substrate. The upper side of the water-permeable substrate is a surface that is substantially flat at the time of application, i.e. flat apart from the fine openings or other material-induced unevennesses and any certain radius bend. This makes it possible to produce a uniformly thin, maximally homogeneous wet fibrous material web or a wet paper structure or a wet paper sheet. Following application of the second aqueous fibrous material suspension containing final polymer A, parts of the water (a-a) run through the fine openings, whereupon a sheet forms on the upper side, thus producing the wet paper structure. A wet paper structure produced in this way of flat, i.e. it has a very small height in relation to the length and width. The fibrous material of the second fibrous material suspension containing final polymer A and possible other components that are to be present in the paper or cardboard ultimately produced, for example a filler (a-e), are retained here ideally wholly or at least substantially in the wet paper structure that forms. Possible further components of the second aqueous fibrous material suspension containing final polymer A, which are added to assist the retention of the other components, to assist the dewatering or to assist a uniform sheet formation, for example an organic polymer (a-d), take effect during this process. Usually, these possible further components of the fibrous material suspension also remain wholly or at least substantially in the produced fibrous material web. The proportion of the wet paper structure, which determines the dry content of the wet paper structure, contains the retained constituents of fibrous material, possible other components that are to be present in the paper ultimately produced, and the possible further components. Depending on its retaining behaviour, these constituents for example of the specified fibrous material are organic polymers, fillers and other paper auxiliaries. The wet paper structure is strong enough at the end of step (B) to be able to be removed from the water-permeable substrate.

The water-permeable substrate in step (B) is preferably a sieve. The sieve, which has a sieve upper side and a sieve underside, has sieve meshes as fine openings. The sieve for example contains a metal or plastics fabric. In the case of a papermaking machine the sieve is very preferably an endless sieve. Once the formed wet paper structure has been separated from an endless sieve, the endless sieve runs back to the material feed, where new second fibrous material suspension containing final polymer A is applied to the endlessly circulating sieve. The sieve is very preferably an endless sieve which runs around a number of cylinders.

The dry content of the wet paper structure which is formed in step (B) is preferably 15 to 25% by weight, very preferably 18.7 to 24% by weight, particularly preferably 18.8 to 23% by weight, very particularly preferably 18.9 to 22% by weight, especially preferably 19.0 to 21% by weight, and very especially preferably 19.0 to 20.7% by weight.

A method in which in step (B) the wet paper structure has a dry content between 18.5 and 25% by weight is preferred.

A method in which in step (A) the final polymer A is added to the first aqueous fibrous material suspension, which has a dry content of more than 1.5 up to 6% by weight at the time of the addition, and in which in step (B) the wet paper structure has a dry content between 18.5 and 25% by weight is preferred.

In step (C) the wet paper structure obtained in step (B) is dewatered to form a paper or cardboard. The dewatering in step (C) comprises the following steps
(C-1) dewatering the wet paper structure by pressing, whereby a moist paper sheet is formed,
(C-2) dewatering the moist paper sheet by supplying heat, whereby the paper or the cardboard is formed.

The pressing of the wet paper structure in step (C-1) leads to a further dewatering and corresponding increase of the dry content. When dewatering by pressing, mechanical pressure is exerted into the wet paper structure. The removal of water by mechanical pressure is more energy-saving than a drying by supplying heat. By laying the wet paper structure on a water-absorbent sheet or belt, for example a felt-like fabric, the dewatering is supported by way of the absorption of the compressed water. A cylinder is suitable for exerting pressure onto the layer composite. In particular, a suitable solution is to guide the layer composite through two cylinders, possibly whilst lying on the water-absorbent belt. The surface of the cylinder is made for example of steel, granite or hard rubber. The surface of a cylinder can be coated with a water-absorbent material. The water-absorbent materials have a high level of absorbency, porosity, moisture and elasticity. A moist paper sheet is formed at the end of the step (C-1). The moist paper sheet is strong enough at the end of the step (C-1) to be supplied to the next step (C-2) without a mechanical support. The moist paper sheet preferably has a dry content between 35 and 65% by weight, very preferably between 37 and 60% by weight, very particularly preferably between 38 and 55% by weight, especially preferably between 40 and 50% by weight.

In step (C-2) a further dewatering of the moist paper sheet from step (C-1) is performed, whereby the paper or the cardboard is formed. Heat is supplied to the moist paper sheet for example by heated plates, on which the moist paper is laid, by heated cylinders, over which the mist paper sheet is guided, by IR emitters, by warm air which is guided over the moist paper sheet, or by a combination of two, three or all of these measures.

The obtained paper or cardboard has the greatest strength in comparison to a wet paper structure or the moist paper sheet. It is presumed that from a dry content of 80% by weight the hydroxyl groups of cellulose fibres are connected reinforcedly via hydrogen bridge bonds, which supplements the previous mechanical felting of the fibres. One measure of the strength of the obtained paper or cardboard is the internal strength, for example.

The dry content of the obtained paper or cardboard is preferably at least 88% by weight. The dry content of the paper or cardboard is very preferably between 89 and 100% by weight, particularly preferably between 90 and 98% by weight, and very particularly preferably between 91 and 96% by weight.

Depending on the mass per unit area, which is also referred to as areal density or grammage, the name of the flat shaped article created from the second fibrous material suspension containing final polymer A changes. A dried shaped article with a mass per unit area of from 7 g/m² to 225 g/m² is referred to herein as paper, and one with a mass per unit area of from 225 g/m² is referred to as cardboard. The grammage of the paper or cardboard is preferably 20 to 400 g/m², very preferably 40 to 280 g/m², particularly preferably 60 to 200 g/m², very particularly preferably 80 to 160 g/m², especially preferably 90 to 140 g/m² and very especially preferably 100 to 130 g/m².

The formed paper or cardboard is preferably a packaging paper, very preferably a corrugated paper.

The preferences described for the method for producing paper or cardboard also apply for the other subjects of the invention.

A further subject of the invention is a paper or cardboard obtainable by a method containing the steps
(A) adding a final polymer A to a first aqueous fibrous material suspension, whereby a second aqueous fibrous material suspension containing final polymer A is created, wherein the final polymer A is obtainable by radical polymerisation of the monomers
(i) 30 to 90 mol % of a monomer of formula I

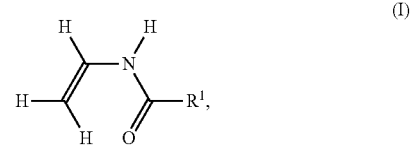

in which R¹=H or means $C_1$-$C_6$ alkyl,
(ii) 3 to 60 mol % of a $C_1$-$C_4$ alkyl ester of acrylic acid or of a $C_1$-$C_4$ alkyl ester of methacrylic acid,
(iii) 0 to 45 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 35 mol % of one or more ethylenically unsaturated monomers which are different from a monomer (i), (ii), (iii) and (iv), wherein the total amount of all monomers (i), (ii), (iii), (iv) and (v) is 100 mol %, in order to obtain a starting polymer V, and hydrolysing the starting polymer V in order to obtain the final polymer A, wherein the N—C(=O)R$^1$ groups of formula (I) of the monomers (i) polymerised into the starting polymer V hydrolyse at least in part and in so doing form primary amino groups, wherein the ester groups of the monomers (ii) polymerised into the starting polymer V are converted at least in part and at least part of the conversion is the formation of five-membered lactam structural units with the obtained primary amino groups or the formation of carboxylic acid groups or salt forms thereof, (B) dewatering the second aqueous fibrous material suspension containing final polymer A on a water-permeable substrate to form a wet paper structure, (C) dewatering the wet paper structure, whereby the paper or the cardboard is formed.

The paper or cardboard preferably has an internal strength of from 165 to 400 J/m$^2$, very preferably of from 190 to 350 J/m$^2$, particularly preferably of from 200 to 300 J/m$^2$, and very particularly of from 220 to 280 J/m$^2$, wherein the internal strength corresponds to that of TAPPI standard T833 pm-94.

A further subject of the invention is a final polymer A, obtainable by radical polymerisation of the monomers (i) 58 to 83 mol % of a monomer of formula I

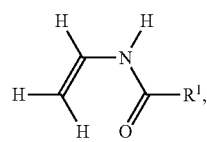

in which R$^1$=H or means C$_1$-C$_6$ alkyl,
(ii) 8 to 39 mol % of a C$_1$-C$_4$ alkyl ester of acrylic acid or of a C$_1$-C$_4$ alkyl ester of methacrylic acid,
(iii) 0 to 25 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
wherein the total amount of all monomers (i), (ii), (iii), (iv) and (v) is 100 mol %, in order to obtain a starting polymer V, and hydrolysing the starting polymer V in order to obtain the final polymer A, wherein the N—C(=O)R$^1$ groups of formula (I) of the monomers (i) polymerised into the starting polymer V hydrolyse at least in part and in so doing form primary amino groups, wherein the ester groups of the monomers (ii) polymerised into the starting polymer V are converted at least in part and at least part of the conversion is the formation of five-membered lactam structural units with the obtained primary amino groups or the formation of carboxylic acid groups or salt forms thereof, A final polymer A in which the monomers
(i) 60 to 83 mol % N-vinylformamide,
(ii) 8 to 21 mol % ethyl acrylate,
(iii) 2 to 21 mol % acrylic acid or methacrylic acid or salt forms thereof,
(iv) 0 to 9 mol % acrylonitrile or methacrylonitrile,
(v) 0 to 24 mol % of one or more ethylenically unsaturated monomers which are different from a monomer (i), (ii), (iii) and (iv),
are used for the starting polymer for the radical polymerisation is preferred.

A further subject of the invention is a starting polymer V obtainable by radical polymerisation of the monomers
(i) 58 to 83 mol % of a monomer of formula I

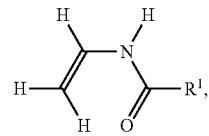

in which R$^1$=H or means C$_1$-C$_6$ alkyl,
(ii) 8 to 39 mol % of a C$_1$-C$_4$ alkyl ester of acrylic acid or of a C$_1$-C$_4$ alkyl ester of methacrylic acid,
(iii) 0 to 25 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
wherein the total amount of all monomers (i), (ii), (iii), (iv) and (v) is 100 mol %.

A starting polymer V in which the monomers
(i) 60 to 83 mol % N-vinylformamide,
(ii) 8 to 21 mol % ethyl acrylate,
(iii) 2 to 21 mol % acrylic acid or methacrylic acid or salt forms thereof,
(iv) 0 to 9 mol % acrylonitrile or methacrylonitrile,
(v) 0 to 24 mol % of one or more ethylenically unsaturated monomers which are different from a monomer (i), (ii), (iii) and (iv),
are used for the radical polymerisation is preferred.

EXAMPLES

The percentages in the examples are percentages by weight, unless otherwise stated.
A) Additives
A-1) Methods for Characterising the Polymers
The solid content of a polymer solution is determined by distributing 0.5 to 1.5 g of the polymer solution in a sheet metal dish of 4 cm diameter and then drying it in a recirculating air cabinet at 140° C. for two hours (=2 h). The ratio of the mass of the sample after drying under the above conditions to the initial weighed sample mass multiplied by 100 gives the solid content of the polymer solution in % by weight.

The degree of hydrolysis of the N-vinylformamide units (=HA) is the proportion in mol % of the hydrolysed N-vinylformamide units in relation to the N-vinylformamide units originally provided in the polymer. The degree of hydrolysis is determined by enzymatic analysis of the formic acid or formate released during the hydrolysis (test set from Boehringer Mannheim).

The degree of conversion of the (meth)acrylate units (=UE) is the proportion in mol % of the converted (meth) acrylate units in relation to the (meth)acrylate units originally provided. The term "conversion" is understood herein to mean the cleavage of the ester unit, for example by hydrolysis, to form a (meth)acrylate unit or corresponding salt form thereof by way of reaction with an adjacent amino group, with lactam being formed as a result. The degree of conversion can be determined by analysing the alcohol released during the conversion. The latter is achieved for example with the aid of HPLC or gas chromatography depending on the released alcohol.

The polymer content specifies the content of polymer without counterions in the aqueous solution in % by weight, i.e. counterions are not taken into consideration. The polymer content is the sum of the weight proportions of all structural units of the polymer in g that are present in 100 g of the aqueous solution. It is determined mathematically. To this end, potentially charge-carrying structural units in the charged form are factored in, i.e. for example amino groups in the protonated form and acid groups in the deprotonated form. Counterions of the charged structural units, such as a sodium cation, chloride, phosphate, formate, acetate, etc., are not taken into consideration. The calculation can be performed in such a way that, for a batch, starting from the usage amounts of monomers, and under consideration of the degree of hydrolysis (HA) and the degree of conversion (UE) as applicable, the molar amounts of the structural units of the polymer present at the end of the reaction are ascertained and these are converted into weight proportions with the aid of the molar masses of the structural units. The sum of the weight proportions gives the total amount of the polymer in this batch. The polymer content is given from the ratio of the total amount of polymer to the total mass of the batch.

The K values are measured according to H. Fikentscher, Cellulosechemie ("Cellulose Chemistry"), volume 13, 48-64 and 71-74 under the conditions specified there. The details between parentheses indicate the concentration of the polymer solution and the solvent.

Charge densities are determined by polyelectrolyte titration with potassium vinylsulfonate at a pH value of 3.5 (see D. Horn, Progress in Colloid & Polymer Science, 65 (1978), pages 251-264).

Only fully demineralised water is used in the production of the polymers, unless stated otherwise.

Monomer Abbreviations:
EA: ethyl acrylate
MA: methyl acrylate
VFA: N-vinylformamide
Na acrylate: sodium salt of acrylic acid
Na methacrylate: sodium salt of methacrylic acid
Na AMPS: sodium salt of 2-acrylamido-2-methylpropane-sulfonic acid
Na-vinyl sulfonate: sodium salt of vinylsulfonic acid
DADMAC: diallyl dimethyl ammonium chloride
APTAC: (3-acrylamidopropyl)trimethyl ammonium chloride
AM: acrylamide During the hydrolysis processes, in order to assess whether a viscosity peak is provided intermediately, the swirl produced by the vortex at the paddle stirrer (glass stirrer with a rounded Teflon blade with a diameter of 7.0 cm and a height of 2.5 cm) was monitored assessed as follows:

| Viscosity peak | Swirl change |
|---|---|
| none | swirl reduces by less than 10% |
| minimal | swirl reduces by more than 10%, but less than 50% |
| low | swirl reduces by more than 50% up to complete disappearance of the swirl |
| moderate | swirl is inverted; the product arches upwards less than 1 cm |
| strong | swirl is inverted; the product arches upwards more than 1 cm, but less than 3 cm |
| very strong | swirl is inverted; the product arches upwards more than 3 cm and less than 6 cm (i.e. as far as the bearing sleeve) |
| extreme | vortex is inverted; the product arches as far as the bearing sleeve; the stirrer speed must be reduced to ¼ in order to prevent the product from infiltrating the bearing sleeve |
| very extreme | stirrer must be stopped |

Composition of final polymers of formula III according to calculation:

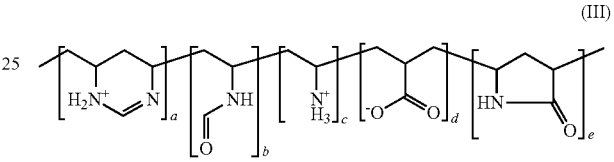

with a, b, c, d and e as mole percentage fraction (=mol %) of the structural unit and the sum of a, b, c, d and e being 100 mol %.

(1.)

$a$=amidinium/(amidinium+VFA+vinyl ammonium+acrylate anion+lactam)*100

$b$=VFA/(amidinium+VFA+vinyl ammonium+acrylate anion+lactam)*100

$c$=vinyl ammonium/(amidinium+VFA+vinyl ammonium+acrylate anion+lactam)*100

$d$=acrylate anion/(amidinium+VFA+vinyl ammonium+acrylate anion+lactam)*100

$e$=lactam/(amidinium+VFA+vinyl ammonium+acrylate anion+lactam)*100

(2.)

VFA [mmol/100 g]: Concentration of the VFA structural units, as is present in the final product acrylate anion [mmol/100 g]: Concentration of the acrylate anion structural units, as is present in the final product vinyl ammonium [mmol/100 g]: Concentration of the vinyl ammonium structural units, as is present in the final product amidinium [mmol/100 g]: Concentration of the amidinium structural units, as is present in the final product lactam [mmol/100 g]: Concentration of the lactam structural units, as is present in the final product Final product herein refers to the polymer solution that is obtained on the basis of the hydrolysis provision.

(3.)

With a degree of conversion HE of 100 mol %, the following are provided:

amidinium=(VFA⁰-FA)*FAD/(FFA+FAD)

VFA=(VFA⁰-FA)*FFA/(FFA+FAD)

vinyl ammonium=FA−lactam−amidinium acrylate anion=Na−AS⁰+MA⁰+EA⁰−FA+LD lactam=FA−LD (4.)

FA [mmol/100 g]: formate content in the final product
LD [mmol/100 g]: charge density in the final product (alternatively: [meq/100 g])
FFA: area of integration of the $^{13}$C-NMR signal of the carbon of the carbonyl group of the VFA structural unit in a polymer between 164 and 168 ppm
FAD: area of integration of the $^{13}$C-NMR signal of the imine carbon of the amidinium structural unit in a polymer at 152 ppm
VFA⁰ [mmol/100 g]: concentration of VFA units which would be present in the final product if no further reaction of the polymerised monomers were to take place—is calculated from start of polymerisation
Na-AS⁰ [mmol/100 g]: concentration of Na acrylate units which would be present in the final product if no further reaction of the polymerised monomers were to take place—is calculated from start of polymerisation
MA⁰, EA⁰ [mmol/100 g]: concentration of methyl- or ethylacrylate units which would be present in the final product if no further reaction of the polymerised monomers were to take place—is calculated from start of polymerisation A-2) Production of the Starting Polymers by Polymerisation Starting Polymer VE1: Copolymer (VFA/MA=70 mol %/30 mol %)

150.4 g VFA (99%) were provided as feed 1.
77.3 g MA were provided as feed 2.
1.13 g 2,2'-azobis(2-methylpropionamidine) dihydrochloride were dissolved in 112.1 g water at room temperature (=RT) as feed 3.
0.67 g 2,2'-azobis(2-methylpropionamidine) dihydrochloride were dissolved in 67.2 g water at RT as feed 4.
187.3 g water were provided as feed 5.
782.6 g water and 2.8 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm (=revolutions per minute) approximately 3.9 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 300 mbar by means of a water jet pump so that the reactor contents started to boil. Under these conditions 187.3 g water were distilled off. The vacuum was then broken with air, feed 5 was added, and the reaction mixture was cooled to RT.

A light-yellow, viscous solution with a solid content of 18.8% was obtained. The K value of the copolymer was 84 (0.5% by weight in water).

Startinq Polymer VE2: Copolymer (VFA/MA=70 mol %/30 mol %)

150.4 g VFA (99%) were provided as feed 1.
77.3 g MA were provided as feed 2.
1.13 g 2,2'-azobis(2-methylpropionamidine) dihydrochloride were dissolved in 112.1 g water at RT as feed 3.
0.67 g 2,2'-azobis(2-methylpropionamidine) dihydrochloride were dissolved in 67.2 g water at RT as feed 4.
176.6 g water were provided as feed 5.
782.6 g water and 2.5 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 3.9 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 69° C. the 3 feeds 1 to 3 were started at the same time. Feed 1 was fed in 3 h, feed 2 in 3.5 h, and feed 3 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 320 mbar by means of a water jet pump so that the reactor contents started to boil. Under these conditions 176.6 g water were distilled off. The vacuum was then broken with air, feed 5 was added, and the reaction mixture was cooled to RT.

A yellow, viscous solution with a solid content of 19.1% was obtained. The K value of the copolymer was 84 (0.5% by weight in water).

Startinq Polymer VE3: Terpolymer (VFA/MA/Na Acrylate=70 mol %/29 mol %/1 mol %)

A mixture of 9.3 g aqueous 32% by weight Na acrylate solution, set to pH 6.4, 158.2 g VFA (99%) and 210.0 g water was provided as feed 1.
78.6 g MA were provided as feed 2.
1.19 g 2,2'-azobis(2-methylpropionamidine) dihydrochloride were dissolved in 117.5 g water at RT as feed 3.
0.71 g 2,2'-azobis(2-methylpropionamidine) dihydrochloride were dissolved in 70.5 g water at RT as feed 4.
172.7 g water were provided as feed 5.
547.4 g water and 2.5 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 69° C. the 3 feeds 1 to 3 were started at the same time. Feed 1 was fed in 3 h, feed 2 in 3.5 h, and feed 3 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 320 mbar by means of a water jet pump so that the reactor contents started to boil. Under these conditions 172.7 g water were distilled off. The vacuum was then broken with air, feed 5 was added, and the reaction mixture was cooled to RT.

A yellow, viscous solution with a solid content of 19.6% was obtained. The K value of the terpolymer was 90 (0.5% by weight in a 5% by weight aqueous NaCl solution).

Starting Polymer VE4: Terpolymer (VFA/MA/Na Acrylate=70 mol %/28 mol %/2 mol %)

A mixture of 18.5 g aqueous 32% by weight Na acrylate solution, set to pH 6.4, 158.0 g VFA (99%) and 200.0 g water was provided as feed 1.

75.8 g MA were provided as feed 2.

1.18 g 2,2'-azobis(2-methylpropionamidine) dihydrochloride were dissolved in 117.1 g water at RT as feed 3.

0.71 g 2,2'-azobis(2-methylpropionamidine) dihydrochloride were dissolved in 70.3 g water at RT as feed 4.

184.0 g water were provided as feed 5.

551.7 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 300 mbar by means of a water jet pump so that the reactor contents started to boil. Under these conditions 184.0 g water were distilled off. The vacuum was then broken with air, feed 5 was added, and the reaction mixture was cooled to RT.

A yellow, viscous solution with a solid content of 19.4% was obtained. The K value of the terpolymer was 90 (0.5% by weight in a 5% by weight aqueous NaCl solution).

Starting Polymer VE5: Terpolymer (VFA/MA/Na Acrylate=70 mol %/25 mol %/5 mol %)

A mixture of 46.1 g aqueous 32% by weight Na acrylate solution, set to pH 6.5, 157.5 g VFA (99%) and 200.0 g water was provided as feed 1.

67.4 g MA were provided as feed 2.

1.17 g 2,2'-azobis(2-methylpropionamidine) dihydrochloride were dissolved in 116.1 g water at RT as feed 3.

0.70 g 2,2'-azobis(2-methylpropionamidine) dihydrochloride were dissolved in 69.7 g water at RT as feed 4.

196.6 g water were provided as feed 5.

534.7 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.2 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 300 mbar by means of a water jet pump so that the reactor contents started to boil. Under these conditions 196.6 g water were distilled off. The vacuum was then broken with air, feed 5 was added, and the reaction mixture was cooled to RT.

A yellow, viscous solution with a solid content of 19.4% was obtained. The K value of the terpolymer was 93 (0.5% by weight in a 5% by weight aqueous NaCl solution).

Startinq Polymer VE6: Terpolymer (VFA/MA/Na Acrylate=70 mol %/25 mol %/5 mol %)

A mixture of 43.0 g aqueous 32% by weight Na acrylate solution, set to pH 6.5, 147.0 g VFA (99%) and 200.0 g water was provided as feed 1.

62.9 g MA were provided as feed 2.

0.33 g 2,2'-azobis(2-methylpropionamidine) dihydrochloride were dissolved in 32.5 g water at RT as feed 3.

1.42 g 2,2'-azobis(2-methylpropionamidine) dihydrochloride were dissolved in 140.9 g water at RT as feed 4.

164.8 g water were provided as feed 5.

565.7 g water and 2.4 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 3.9 g of a 25% by weight sodium hydroxide solution were added, giving a pH of 6.5. The receiver was then heated for 30 min to 60° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 60° C. the 3 feeds 1 to 3 were started at the same time. Feed 1 was fed in 3 h, feed 2 in 3.5 h, and feed 3 in 4 h. At the end of feed 3, the batch was held for a further hour at 60° C. Feed 4 was then added in 5 min and the reaction mixture was held for a further 1.5 h at 60° C., The reflux condenser was then replaced by a descending condenser, and the internal pressure was slowly reduced to approximately 280 mbar by means of a water jet pump so that the reactor contents started to boil. Under these conditions 164.8 g water were distilled off. The vacuum was then broken with air, feed 5 was added, and the reaction mixture was cooled to RT.

A yellow, viscous solution with a solid content of 13.9% was obtained. The K value of the terpolymer was 138 (0.1% by weight in a 5% by weight aqueous NaCl solution).

Starting Polymer VE7: Terpolymer (VFA/MA/Na Acrylate=70 mol %/20 mol %/10 mol %)

A mixture of 91.6 g aqueous 32% by weight Na acrylate solution, set to pH 6.5, 156.7 g VFA (99%) and 200.0 g water was provided as feed 1.

53.9 g MA were provided as feed 2.

1.15 g 2,2'-azobis(2-methylpropionamidine) dihydrochloride were dissolved in 114.3 g water at RT as feed 3.

0.69 g 2,2'-azobis(2-methylpropionamidine) dihydrochloride were dissolved in 68.6 g water at RT as feed 4.

184.4 g water were provided as feed 5.

506.5 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.2 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 320 mbar by means of a water jet pump so that the reactor contents started to boil. Under these conditions 184.4 g water were distilled off. The vacuum was then broken with air, feed 5 was added, and the reaction mixture was cooled to RT.

A yellow, viscous solution with a solid content of 19.7% was obtained. The K value of the terpolymer was 94 (0.5% by weight in a 5% by weight aqueous NaCl solution).

Starting Polymer VE8: Terpolymer (VFA/MA/Na Acrylate=70 mol %/15 mol %/15 mol %)

A mixture of 136.7 g aqueous 32% by weight Na acrylate solution, set to pH 6.5, 155.9 g VFA (99%) and 200.0 g water was provided as feed 1.

40.0 g MA were provided as feed 2.

1.14 g 2,2'-azobis(2-methylpropionamidine) dihydrochloride were dissolved in 112.6 g water at RT as feed 3.

0.68 g 2,2'-azobis(2-methylpropionamidine) dihydrochloride were dissolved in 67.5 g water at RT as feed 4.

227.5 g water were provided as feed 5.

478.7 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.2 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 320 mbar by means of a water jet pump so that the reactor contents started to boil. Under these conditions 227.5 g water were distilled off. The vacuum was then broken with air, feed 5 was added, and the reaction mixture was cooled to RT.

A yellow, viscous solution with a solid content of 19.9% was obtained. The K value of the terpolymer was 99 (0.5% by weight in a 5% by weight aqueous NaCl solution).

Starting Polymer VE9: Terpolymer (VFA/MA/Na Acrylate=70 mol %/10 mol %/20 mol %)

A mixture of 181.4 g aqueous 32% by weight Na acrylate solution, set to pH 6.5, 155.0 g VFA (99%) and 200.0 g water was provided as feed 1.

26.6 g MA were provided as feed 2.

1.12 g 2,2'-azobis(2-methylpropionamidine) dihydrochloride were dissolved in 110.8 g water at RT as feed 3.

0.67 g 2,2'-azobis(2-methylpropionamidine) dihydrochloride were dissolved in 66.5 g water at RT as feed 4.

200.5 g water were provided as feed 5.

451.1 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 320 mbar by means of a water jet pump so that the reactor contents started to boil. Under these conditions 200.5 g water were distilled off. The vacuum was then broken with air, feed 5 was added, and the reaction mixture was cooled to RT.

A yellow, viscous solution with a solid content of 20.2% was obtained. The K value of the terpolymer was 102 (0.5% by weight in a 5% by weight aqueous NaCl solution).

Starting Polymer VE10: Terpolymer (VFA/MA/Na Acrylate=70 mol %/25 mol %/5 mol %)

A mixture of 55.9 g aqueous 30% by weight Na methacrylate solution, set to pH 6.5, 156.1 g VFA (99%) and 200.0 g water was provided as feed 1.

66.8 g MA were provided as feed 2.

1.17 g 2,2'-azobis(2-methylpropionamidine) dihydrochloride were dissolved in 116.1 g water at RT as feed 3.

0.70 g 2,2'-azobis(2-methylpropionamidine) dihydrochloride were dissolved in 69.7 g water at RT as feed 4.

185.7 g water were provided as feed 5.

526.7 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 68° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 68° C. the 3 feeds 1 to 3 were started at the same time. Feed 1 was fed in 3 h, feed 2 in 3.5 h, and feed 3 in 4 h. At the end of feed 3, the batch was held for a further hour at 68° C. Feed 4 was then added in 5 min and the reaction mixture was held for a further 1.5 h at 68° C., The reflux condenser was then replaced by a descending condenser, and the internal pressure was slowly reduced to approximately 320 mbar by means of a water jet pump so that the reactor contents started to boil. Under these conditions 185.7 g water were distilled off. The vacuum was then broken with air, feed 5 was added, and the reaction mixture was cooled to RT.

A yellow, viscous solution with a solid content of 19.2% was obtained. The K value of the terpolymer was 94 (0.5% by weight in a 5% by weight aqueous NaCl solution).

Starting Polymer VE11: Terpolymer (VFA/MA/Na AMPS=70 mol %/25 mol %/5 mol %)

A mixture of 66 g aqueous 50% by weight Na AMPS solution, set to pH 6.5, 144.6 g VFA (99%) and 210.0 g water was provided as feed 1.

61.9 g MA were provided as feed 2.

1.17 g 2,2'-azobis(2-methylpropionamidine) dihydrochloride were dissolved in 116.1 g water at RT as feed 3.

0.71 g 2,2'-azobis(2-methylpropionamidine) dihydrochloride were dissolved in 69.8 g water at RT as feed 4.

186.7 g water were provided as feed 5.

532.8 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 69° C. the 3 feeds 1 to 3 were started at the same time. Feed 1 was fed in 3 h, feed 2 in 3.5 h, and feed 3 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 300 mbar by means of a water jet pump so that the reactor contents started to boil. Under these conditions 186.7 g water were distilled off. The vacuum was then broken with air, feed 5 was added, and the reaction mixture was cooled to RT.

A yellow, viscous solution with a solid content of 20.0% was obtained. The K value of the terpolymer was 89 (0.5% by weight in a 5% by weight aqueous NaCl solution).

Startinq Polymer VE12: Terpolymer (VFA/MA/Na Vinyl Sulfonate=70 mol %/25 mol %/5 mol %)

A mixture of 79.6 g aqueous 25% by weight Na vinyl sulfonate solution, set to pH 6.5, 153.9 g VFA (99%) and 200.0 g water was provided as feed 1.

65.9 g MA were provided as feed 2.

1.17 g 2,2'-azobis(2-methylpropionamidine) dihydrochloride were dissolved in 116.2 g water at RT as feed 3.

0.70 g 2,2'-azobis(2-methylpropionamidine) dihydrochloride were dissolved in 69.7 g water at RT as feed 4.

164.5 g water were provided as feed 5.

506.1 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 65° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 65° C. the 3 feeds 1 to 3 were started at the same time. Feed 1 was fed in 3 h, feed 2 in 3.5 h, and feed 3 in 4 h. At the end of feed 3, the batch was held for a further hour at 65° C. Feed 4 was then added in 5 min and the reaction mixture was held for a further 1.5 h at 65° C., The reflux condenser was then replaced by a descending condenser, and the internal pressure was slowly reduced to approximately 300 mbar by means of a water jet pump so that the reactor contents started to boil. Under these conditions 164.5 g water were distilled off. The vacuum was then broken with air, feed 5 was added, and the reaction mixture was cooled to RT.

A yellow, viscous solution with a solid content of 20.7% was obtained. The K value of the terpolymer was 87 (0.5% by weight in a 5% by weight aqueous NaCl solution).

Starting Polymer VE13: Terpolymer (VFA/MA/DADMAC=65 mol %/30 mol %/5 mol %)

A mixture of 138.7 g VFA (99%) and 200.0 g water was provided as feed 1.

76.8 g MA were provided as feed 2.

1.16 g 2,2'-azobis(2-methylpropionamidine) dihydrochloride were dissolved in 115.2 g water at RT as feed 3.

0.70 g 2,2'-azobis(2-methylpropionamidine) dihydrochloride were dissolved in 69.2 g water at RT as feed 4.

174.4 g water were provided as feed 5.

554.6 g water and 37.0 g of an aqueous 65% by weight DADMAC solution and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.3 g of a 25% by weight sodium hydroxide solution were added, giving a pH of 6.5. The receiver was then heated for 30 min to 67° C. and at the same time nitrogen (20 L/h) was introduced in order to displace the oxygen in the apparatus. The nitrogen feed was then stopped, and for the further course of the polymerisation nitrogen continued to be conducted only via the reflux condenser so as to prevent diffusion of oxygen. At a constant internal temperature of 67° C. the 3 feeds 1 to 3 were started at the same time. Feed 1 was fed in 3 h, feed 2 in 3.5 h, and feed 3 in 4 h. At the end of feed 3, the batch was held for a further hour at 67° C. Feed 4 was then added in 5 min and the reaction mixture was held for a further 1.5 h at 67° C., The reflux condenser was then replaced by a descending condenser, and the internal pressure was slowly reduced to approximately 330 mbar by means of a water jet pump so that the reactor contents started to boil. Under these conditions 174.4 g water were distilled off. The vacuum was then broken with air, feed 5 was added, and the reaction mixture was cooled to RT.

A yellow, viscous solution with a solid content of 19.8% was obtained. The K value of the terpolymer was 82 (0.5% by weight in water).

Startinq Polymer VE14: Terpolymer (VFA/MA/AP-TAC=65 mol %/30 mol %/5 mol %)

134.9 g VFA (99%) were provided as feed 1.

74.7 g MA were provided as feed 2.

A mixture of 39.8 g of a 75% by weight aqueous solution of APTAC and 200 g water was provided as feed 3.

1.17 g 2,2'-azobis(2-methylpropionamidine) dihydrochloride were dissolved in 115.3 g water at RT as feed 4.

0.70 g 2,2'-azobis(2-methylpropionamidine) dihydrochloride were dissolved in 69.2 g water at RT as feed 5.

170.9 g water were provided as feed 6.

557.5 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.3 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 69° C. the 4 feeds 1 to 4 were started at the same time. Feed 1 was fed in 3 h, feed 2 in 3.5 h, and feed 4 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 330 mbar by means of a water jet pump so that the reactor contents started to boil. Under these conditions 170.9 g water were distilled off. The vacuum was then broken with air, feed 5 was added, and the reaction mixture was cooled to RT.

A yellow, viscous solution with a solid content of 19.6% was obtained. The K value of the terpolymer was 87 (0.5% by weight in water).

Starting Polymer VE15: Terpolymer (VFA/MA/Na Acrylate=70 mol %/15 mol %/15 mol %)

A mixture of 133.1 g aqueous 32% by weight Na acrylate solution, set to pH 6.5, 151.7 g VFA (99%) and 200.0 g water was provided as feed 1.

45.3 g EA were provided as feed 2.

1.14 g 2,2'-azobis(2-methylpropionamidine) dihydrochloride were dissolved in 112.7 g water at RT as feed 3.

0.68 g 2,2'-azobis(2-methylpropionamidine) dihydrochloride were dissolved in 67.6 g water at RT as feed 4.

537.8 g water were provided as feed 5.

481.0 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 72° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 72° C. the 3 feeds 1 to 3 were started at the same time. Feed 1 was fed in 3 h, feed 2 in 3.5 h, and feed 3 in 4 h. At the end of feed 3, the batch was held for a further hour at 72° C. Feed 4 was then added in 5 min and the reaction mixture was held for a further 1.5 h at 72° C., The reflux condenser was then replaced by a descending condenser, and the internal pressure was slowly reduced to approximately 340 mbar by means of a water jet pump so that the reactor contents started to boil. Under these conditions 137.8 g water were distilled off. The vacuum was then broken with air, feed 5 was added, and the reaction mixture was cooled to RT.

A slightly cloudy, yellow, viscous solution with a solid content of 15.1% was obtained. The K value of the terpolymer was (0.5% by weight in a 5% by weight aqueous NaCl solution).

Starting Polymer VE16: Terpolymer (VFA/EA/Na Acrylate=70 mol %/20 mol %/10 mol %)

A mixture of 55.3 g aqueous 32% by weight Na acrylate solution, set to pH 6.5, 94.5 g VFA (99%) and 200.0 g water was provided as feed 1.

37.6 g EA were provided as feed 2.

0.72 g 2,2'-azobis(2-methylpropionamidine) dihydrochloride were dissolved in 71.6 g water at RT as feed 3.

0.43 g 2,2'-azobis(2-methylpropionamidine) dihydrochloride were dissolved in 43.0 g water at RT as feed 4.

612.8 g water and 1.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 2.4 g of a 25% by weight sodium hydroxide solution were added, giving a pH of 6.5. The receiver was then heated for 30 min to 65° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 65° C., 10% of feed 1 was firstly added within 3 minutes and briefly mixed in. The remainder of feed 1 (90%) and feeds 2 and 3 were then started simultaneously. The rest of feed 1 was fed in 3 h, feed 2 in 3.5 h, and feed 3 in 4 h. At the end of feed 3, the batch was held for a further hour at 65° C. Feed 4 was then added in 5 min and the reaction temperature was increased to 70° C. The batch was held at 70° C. for 1.5 h. The reflux condenser was then replaced by a descending condenser, and the internal pressure was slowly reduced to approximately 340 mbar by means of a water jet pump so that the reactor contents started to boil. Under these conditions 114.1 g water were distilled off. The vacuum was then broken with air and the reaction mixture cooled to RT.

A slightly cloudy, yellow, viscous solution with a solid content of 15.2% was obtained. The K value of the terpolymer was 99 (0.5% by weight in a 5% by weight aqueous NaCl solution).

Starting Polymer VE17: Terpolymer (VFA/EA/Na Acrylate=70 mol %/20 mol %/10 mol %)

A mixture of 55.3 g aqueous 32% by weight Na acrylate solution, set to pH 6.5, 94.5 g VFA (99%) and 200.0 g water was provided as feed 1.

37.6 g EA were provided as feed 2.

0.72 g 2,2'-azobis(2-methylpropionamidine) dihydrochloride were dissolved in 71.6 g water at RT as feed 3.

0.43 g 2,2'-azobis(2-methylpropionamidine) dihydrochloride were dissolved in 43.0 g water at RT as feed 4.

612.8 g water and 1.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 2.4 g of a 25% by weight sodium hydroxide solution were added, giving a pH of 6.5. The receiver was then heated for 30 min to 64° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 64° C., 10% of feed 1 was firstly added within 3 minutes and briefly mixed in. The remainder of feed 1 (90%) and feeds 2 and 3 were then started simultaneously. The rest of feed 1 was fed in 3 h, feed 2 in 3.5 h, and feed 3 in 4 h. At the end of feed 3, the batch was held for a further hour at 64° C. Feed 4 was then added in 5 min and the reaction temperature was increased to 70° C. The batch was held at 70° C. for 1.5 h. The reflux condenser was then replaced by a descending condenser, and the internal pressure was slowly reduced to approximately 340 mbar by means of a water jet pump so that the reactor contents started to boil. Under these conditions 138.7 g water were distilled off. The vacuum was then broken with air and the reaction mixture cooled to RT.

A slightly cloudy, yellow, viscous solution with a solid content of 15.6% was obtained. The K value of the terpolymer was 103 (0.5% by weight in a 5% by weight aqueous NaCl solution).

Starting Polymer VE18: Terpolymer (VFA/EA/Na Acrylate=70 mol %/20 mol %/10 mol %)

A mixture of 55.3 g aqueous 32% by weight Na acrylate solution, set to pH 6.5, 94.5 g VFA (99%) and 200.0 g water was provided as feed 1.

37.6 g EA were provided as feed 2.

0.72 g 2,2'-azobis(2-methylpropionamidine) dihydrochloride were dissolved in 71.6 g water at RT as feed 3.

0.43 g 2,2'-azobis(2-methylpropionamidine) dihydrochloride were dissolved in 43.0 g water at RT as feed 4.

612.8 g water and 1.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 2.6 g of a 25% by weight sodium hydroxide solution were added, giving a pH of 6.5. The receiver was then heated for 30 min to 65° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 65° C., 10% of feed 1 was firstly added within 3 minutes and briefly mixed in. The remainder of feed 1 (90%) and feeds 2 and 3 were then started simultaneously. The rest of feed 1 was fed in 3 h, feed 2 in 3.5 h, and feed 3 in 4 h. At the end of feed 3, the batch was held for a further hour at 65° C. Feed 4 was then added in 5 min and the reaction temperature was increased to 70° C. The batch was held at 70° C. for 1.5 h. The reflux condenser was then replaced by a descending condenser, and the internal pressure was slowly reduced to approximately 340 mbar by means of a water jet pump so that the reactor contents started to boil. Under these conditions 126.7 g water were distilled off. The vacuum was then broken with air and the reaction mixture cooled to RT.

A slightly cloudy, yellow, viscous solution with a solid content of 15.4% was obtained. The K value of the terpolymer was 101 (0.5% by weight in a 5% by weight aqueous NaCl solution).

Starting Polymer VE19: Copolymer (VFA/MA=70 mol %/30 mol %)

150.4 g VFA (99%) were provided as feed 1.

77.3 g MA were provided as feed 2.

1.13 g 2,2'-azobis(2-methylpropionamidine) dihydrochloride were dissolved in 112.1 g water at RT as feed 3.

0.67 g 2,2'-azobis(2-methylpropionamidine) dihydrochloride were dissolved in 67.2 g water at RT as feed 4.

168.4 g water were provided as feed 5.

784.9 g water and 2.8 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 3.9 g of a 25% by weight sodium hydroxide solution were added, giving a pH of 6.5. The receiver was then heated for 30 min to 70° C. and at the same time nitrogen (20 L/h) was introduced in order to displace the oxygen in the apparatus. The nitrogen feed was then stopped, and for the further course of the polymerisation nitrogen continued to be conducted only via the reflux condenser so as to prevent diffusion of oxygen. At a constant internal temperature of 70° C. the 3 feeds 1 to 3 were started at the same time. Feed 1 was fed in 3 h, feed 2 in 3.5 h, and feed 3 in 4 h. At the end of feed 3, the batch was held for a further hour at 70° C. Feed 4 was then added in 5 min and the reaction mixture was held for a further 1.5 h at 70° C., The reflux condenser was then replaced by a descending condenser, and the internal pressure was slowly reduced to approximately 320 mbar by means of a water jet pump so that the reactor contents started to boil. Under these conditions 168.4 g water were distilled off. The vacuum was then broken with air, feed 5 was added, and the reaction mixture was cooled to RT.

A yellow, viscous solution with a solid content of 18.6% was obtained. The K value of the copolymer was 82 (0.5% by weight in water).

Starting Polymer VE20: Copolymer (VFA/MA=60 mol %/40 mol %)

126.4 g VFA (99%) were provided as feed 1.

101.0 g MA were provided as feed 2.

1.13 g 2,2'-azobis(2-methylpropionamidine) dihydrochloride were dissolved in 112.0 g water at RT as feed 3.

0.68 g 2,2'-azobis(2-methylpropionamidine) dihydrochloride were dissolved in 67.2 g water at RT as feed 4.

188.5 g water were provided as feed 5.

785.2 g water and 2.5 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 3.9 g of a 25% by weight sodium hydroxide solution were added, giving a pH of 6.5. The receiver was then heated for 30 min to 67° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 67° C. the 3 feeds 1 to 3 were started at the same time. Feed 1 was fed in 3 h, feed 2 in 3.5 h, and feed 3 in 4 h. At the end of feed 3, the batch was held for a further hour at 67° C. Feed 4 was then added in 5 min and the reaction mixture was held for a further 1.5 h at 67° C., The reflux condenser was then replaced by a descending condenser, and the internal pressure was slowly reduced to approximately 300 mbar by means of a water jet pump so that the reactor contents started to boil. Under these conditions 188.5 g water were distilled off. The vacuum was then broken with air, feed 5 was added, and the reaction mixture was cooled to RT.

A yellow, viscous solution with a solid content of 18.7% was obtained. The K value of the copolymer was 84 (0.5% by weight in water).

Starting Polymer VE21: Copolymer (VFA/MA=80 mol %/20 mol %)

175.4 g VFA (99%) were provided as feed 1.

52.6 g MA were provided as feed 2.

1.13 g 2,2'-azobis(2-methylpropionamidine) dihydrochloride were dissolved in 112.0 g water at RT as feed 3.

0.68 g 2,2'-azobis(2-methylpropionamidine) dihydrochloride were dissolved in 67.2 g water at RT as feed 4.

163.6 g water were provided as feed 5.

784.7 g water and 2.5 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 3.9 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and for the further course of the polymerisation nitrogen continued to be conducted only via the reflux condenser so as to prevent diffusion of oxygen. At a constant internal temperature of 69° C. the 3 feeds 1 to 3 were started at the same time. Feed 1 was fed in 3 h, feed 2 in 3.5 h, and feed 3 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 310 mbar by means of a water jet pump so that the reactor contents started to boil. Under these conditions 163.6 g water were distilled off. The vacuum was then broken with air, feed 5 was added, and the reaction mixture was cooled to RT.

A yellow, viscous solution with a solid content of 19.0% was obtained. The K value of the copolymer was 84 (0.5% by weight in water).

Starting Polymer VE22: Terpolymer (VFA/MA/Na Acrylate=70 mol %/25 mol %/5 mol %)

A mixture of 46.1 g aqueous 32% by weight Na acrylate solution, set to pH 6.5, 157.5 g VFA (99%) and 200.0 g water was provided as feed 1.

67.4 g MA were provided as feed 2.

1.17 g 2,2'-azobis(2-methylpropionamidine) dihydrochloride were dissolved in 116.1 g water at RT as feed 3.

0.70 g 2,2'-azobis(2-methylpropionamidine) dihydrochloride were dissolved in 69.7 g water at RT as feed 4.

552.6 g water were provided as feed 5.

534.7 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.2 g of a 25% by weight sodium hydroxide solution were added, giving a pH of 6.5. The receiver was then heated for 30 min to 74° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 74° C. the 3 feeds 1 to 3 were started at the same time. Feed 1 was fed in 3 h, feed 2 in 3.5 h, and feed 3 in 4 h. At the end of feed 3, the batch was held for a further hour at 74° C. Feed 4 was then added in 5 min and the reaction mixture was held for a further 1.5 h at 74° C., The reflux condenser was then replaced by a descending condenser, and the internal pressure was slowly reduced to approximately 300 mbar by means of a water jet pump so that the reactor contents started to boil. Under these conditions 152.6 g water were distilled off. The vacuum was then broken with air, feed 5 was added, and the reaction mixture was cooled to RT.

A yellow, slightly viscous solution with a solid content of 14.5% was obtained. The K value of the terpolymer was 81 (0.5% by weight in a 5% by weight aqueous NaCl solution).

Starting Polymer VE23: Terpolymer (VFA/EA/Na Acrylate=70 mol %/25 mol %/5 mol %)

A mixture of 44.0 g aqueous 32% by weight Na acrylate solution, set to pH 6.5, 150.6 g VFA (99%) and 200.0 g water was provided as feed 1.

186.9 g EA were provided as feed 2.

1.17 g 2,2'-azobis(2-methylpropionamidine) dihydrochloride were dissolved in 116.1 g water at RT as feed 3.

0.70 g 2,2'-azobis(2-methylpropionamidine) dihydrochloride were dissolved in 69.7 g water at RT as feed 4.

536.0 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 67° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 67° C., 10% of feed 1 was firstly added within 3 minutes and briefly mixed in. The remainder of feed 1 (90%) and feeds 2 and 3 were then started simultaneously. The rest of feed 1 was fed in 3 h, feed 2 in 3.5 h, and feed 3 in 4 h. At the end of feed 3, the batch was held for a further hour at 67° C. Feed 4 was then added in 5 min. The batch was held at 67° C. for 1.5 h. The reflux condenser was then replaced by a descending condenser, and the internal pressure was slowly reduced to approximately 320 mbar by means of a water jet pump so that the reactor contents started to boil. Under these conditions 186.9 g water were distilled off. The vacuum was then broken with air and the reaction mixture cooled to RT.

A slightly cloudy, yellow, viscous solution with a solid content of 19.9% was obtained. The K value of the terpolymer was 90 (0.5% by weight in a 5% by weight aqueous NaCl solution).

Starting Polymer VE24: Terpolymer (VFA/EA/Na Acrylate=70 mol %/20 mol %/10 mol %)

A mixture of 88.4 g aqueous 32% by weight Na acrylate solution, set to pH 6.5, 151.1 g VFA (99%) and 200.0 g water was provided as feed 1.

60.2 g EA were provided as feed 2.

1.16 g 2,2'-azobis(2-methylpropionamidine) dihydrochloride were dissolved in 114.4 g water at RT as feed 3.

0.69 g 2,2'-azobis(2-methylpropionamidine) dihydrochloride were dissolved in 68.6 g water at RT as feed 4.

158.4 g water were provided as feed 5.

508.6 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 67° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 67° C. the feeds 1, 2 and 3 were started at the same time. Feed 1 was fed in 3 h, feed 2 in 3.5 h, and feed 3 in 4 h. At the end of feed 3, the batch was held for a further hour at 67° C. Feed 4 was then added in 5 min and the reaction mixture was held for a further 1.5 h at 67° C., The reflux condenser was then replaced by a descending condenser, and the internal pressure was slowly reduced to approximately 300 mbar by means of a water jet pump so that the reactor contents started to boil. Under these conditions 158.4 g water were distilled off. The vacuum was then broken with air and the reaction mixture cooled to RT.

A cloudy, yellow, viscous solution with a solid content of 20.1% was obtained. The K value of the terpolymer was 99 (0.5% by weight in a 5% by weight aqueous NaCl solution).

Starting Polymer VE25: Terpolymer (VFA/EA/Na Acrylate=70 mol %/10 mol %/20 mol %)

A mixture of 178.2 g aqueous 32% by weight Na acrylate solution, set to pH 6.5, 152.3 g VFA (99%) and 200.0 g water was provided as feed 1.

30.3 g EA were provided as feed 2.

1.12 g 2,2'-azobis(2-methylpropionamidine) dihydrochloride were dissolved in 111.0 g water at RT as feed 3.

0.67 g 2,2'-azobis(2-methylpropionamidine) dihydrochloride were dissolved in 66.5 g water at RT as feed 4.

185.7 g water were provided as feed 5.

453.2 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 68° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 68° C. the feeds 1, 2 and 3 were started at the same time. Feed 1 was fed in 3 h, feed 2 in 3.5 h, and feed 3 in 4 h. At the end of feed 3, the batch was held for a further hour at 68° C. Feed 4 was then added in 5 min and the reaction mixture was held for a further 1.5 h at 68° C., The reflux condenser was then replaced by a descending condenser, and the internal pressure was slowly reduced to approximately 310 mbar by means of a water jet pump so that the reactor contents started to boil. Under these conditions 185.74 g water were distilled off. The vacuum was then broken with air and the reaction mixture cooled to RT.

A cloudy, yellow, viscous solution with a solid content of 20.3% was obtained. The K value of the terpolymer was 101 (0.5% by weight in a 5% by weight aqueous NaCl solution).

Startinq Polymer VE26: Terpolymer (VFA/EA/Na Acrylate=70 mol %/20 mol %/10 mol %)

A mixture of 55.3 g aqueous 32% by weight Na acrylate solution, set to pH 6.5, 94.5 g VFA (99%) and 200.0 g water was provided as feed 1.

37.6 g EA were provided as feed 2.

0.72 g 2,2'-azobis(2-methylpropionamidine) dihydrochloride were dissolved in 71.6 g water at RT as feed 3.

0.43 g 2,2'-azobis(2-methylpropionamidine) dihydrochloride were dissolved in 43.0 g water at RT as feed 4.

612.8 g water and 1.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 2.4 g of a 25% by weight sodium hydroxide solution were added, giving a pH of 6.5. The receiver was then heated for 30 min to 65° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 65° C., 10% of feed 1 was firstly added within 3 minutes and briefly mixed in. The remainder of feed 1 (90%) and feeds 2 and 3 were then started simultaneously. The rest of feed 1 was fed in 3 h, feed 2 in 3.5 h, and feed 3 in 4 h. At the end of feed 3, the batch was held for a further hour at 65° C. Feed 4 was then added in 5 min and the reaction temperature was increased to 70° C. The batch was held at 70° C. for 1.5 h. The reflux condenser was then replaced by a descending condenser, and the internal pressure was slowly reduced to approximately 300 mbar by means of a water jet pump so that the reactor contents started to boil. Under these conditions 120.5 g water were distilled off. The vacuum was then broken with air and the reaction mixture cooled to RT.

A slightly cloudy, yellow, viscous solution with a solid content of 15.1% was obtained. The K value of the terpolymer was 102 (0.5% by weight in a 5% by weight aqueous NaCl solution).

Starting Polymer VE27: Terpolymer (VFA/MA/AM=70 mol %/25 mol %/5 mol %)

A mixture of 22.6 g aqueous 50% by weight AM solution, 159.9 g VFA (99%) and 210.0 g water was provided as feed.

68.5 g MA were provided as feed 2.

1.19 g 2,2'-azobis(2-methylpropionamidine) dihydrochloride were dissolved in 117.9 g water at RT as feed 3.

0.71 g 2,2'-azobis(2-methylpropionamidine) dihydrochloride were dissolved in 70.7 g water at RT as feed 4.

189.6 g water were provided as feed 5.

541.8 g water and 2.6 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 4.1 g of a 25% by weight sodium hydroxide solution were added, giving a pH of 6.5. The receiver was then heated for 30 min to 69° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 69° C. the 3 feeds 1 to 3 were started at the same time. Feed 1 was fed in 3 h, feed 2 in 3.5 h, and feed 3 in 4 h. At the end of feed 3, the batch was held for a further hour at 69° C. Feed 4 was then added in 5 min and the reaction mixture was held for a further 1.5 h at 69° C., The reflux condenser was then replaced by a descending condenser, and the internal pressure was slowly reduced to approximately 310 mbar by means of a water jet pump so that the reactor contents started to boil. Under these conditions 189.6 g water were distilled off. The vacuum was then broken with air, feed 5 was added, and the reaction mixture was cooled to RT.

A yellow, viscous solution with a solid content of 21.9% was obtained. The K value of the terpolymer was 89 (0.5% by weight in water).

Starting Polymer VV1: Copolymer (VFA/Na Acrylate=70 mol %/30 mol %)

A mixture of 316.7 g aqueous 32% by weight Na acrylate solution, 180.5 g VFA (99%) and 141.0 g water was provided as feed 1.

1.79 g 2,2'-azobis(2-methylpropionamidine) dihydrochloride were dissolved in 176.9 g water at RT as feed 2.

573.4 g water and 3.0 g 75% by weight phosphoric acid were introduced into a 2 L glass apparatus with anchor stirrer, reflux condenser, inner thermometer and nitrogen feed tube. The reactor was situated in a water bath with heating-cooling unit, which controlled the internal temperature automatically. At a speed of 100 rpm approximately 5.2 g of a 25% by weight sodium hydroxide solution were added, giving a pH of 6.5. The receiver was then heated for 30 min to 80° C. and at the same time nitrogen (20 L/h) was introduced in order to displace the oxygen in the apparatus. The nitrogen feed was then stopped, and nitrogen continued to be conducted only via the reflux condenser so as to prevent diffusion of oxygen. At a constant internal temperature of 80° C. the feeds 1 and 2 were started at the same time. Feed 1 was fed in 1.5 h, and feed 2 in 2.5 h. At the end of feed 2, the batch was held for a further hour at 80° C. The reflux condenser was then replaced by a descending condenser, and the internal pressure was slowly reduced to approximately 460 mbar by means of a water jet pump so that the reactor contents started to boil. Under these conditions 178.7 g water were distilled off. The vacuum was then broken with air and the reaction mixture cooled to RT.

A yellowish, viscous solution with a solid content of 24.1% was obtained. The K value of the copolymer was 88 (0.5% by weight in a 5% aqueous NaCl solution).

A-3) Production of the Final Polymers by Hydrolysis of the Starting Polymers

Final Polymer AE1: Acid-Hydrolysed Starting Polymer VE1 (VFA/MA=70 mol %/30 mol %)

150.1 g of the polymer solution obtained with the starting polymer VE1 were mixed in a 500 mL four-neck flask with stirring paddle, internal thermometer, dropping funnel and reflux condenser at a stirrer speed of 80 rpm with 1.3 g of a 40% by weight aqueous sodium bisulfite solution and then heated to 80° C. 30.0 g of a 37% by weight hydrochloric acid (120 mol % on VFA) were then added. The mixture was held for 5 h at 80° C. The obtained product was cooled to RT and set to pH 6.0 by the addition of 64.8 g of a 25% by weight sodium hydroxide solution. A slightly cloudy, yellowish and viscous polymer solution with a polymer content of 8.3% was obtained. The degree of hydrolysis HA was 98 mol % and the degree of conversion HE was 100 mol %.

Final Polymer AE2: Alkaline-Hydrolysed Starting Polymer VE2 (VFA/MA=70 mol %/30 mol %)

170.5 g of the polymer solution obtained with the starting polymer VE2 were mixed in a 500 mL four-neck flask with stirring paddle, internal thermometer, dropping funnel and reflux condenser at a stirrer speed of 80 rpm with 1.5 g of a 40% by weight aqueous sodium bisulfite solution and then heated to 80° C. 56.3 g of a 25% by weight aqueous sodium hydroxide solution (120 mol % on VFA) were then added. The mixture was held for 5 h at 80° C. The obtained product was cooled to RT and was set to pH 6.0 by adding 20.1 g of a 37% by weight hydrochloric acid and 1.3 g water.

A slightly cloudy, yellowish and viscous polymer solution with a polymer content of 7.9% was obtained. The degree of hydrolysis HA was 96 mol % and the degree of conversion HE was 100 mol %.

Final Polymer AE3: Alkaline-Hydrolysed Starting Polymer VE3 (VFA/MA/Na Acrylate=70 mol %/29 mol %/1 mol %)

173.4 g of the polymer solution obtained with the starting polymer VE3 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 55.0 g water and then heated to 80° C. 59.3 g of a 25% by weight aqueous sodium hydroxide solution (120 mol % on VFA) were then added. The mixture was held for 5 h at 80° C. The obtained product was cooled to RT and was set to pH 6.0 by adding 21.7 g of a 37% by weight hydrochloric acid and 9.4 g water.

A slightly cloudy, yellowish and viscous polymer solution with a polymer content of 7.7% was obtained. The degree of hydrolysis HA was 99 mol % and the degree of conversion HE was 100 mol %.

Final Polymer AE4: Alkaline-Hydrolysed Terpolymer VE4 (VFA/MA/Na Acrylate=70 mol %/28 mol %/2 mol %)

174.1 g of the polymer solution obtained with the starting polymer VE4 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 54.0 g water and then heated to 80° C. 58.8 g of a 25% by weight aqueous sodium hydroxide solution (120 mol % on VFA) were then added. The mixture was held for 5 h at 80° C. The obtained product was cooled to RT and was set to pH 6.0 by adding 22.5 g of a 37% by weight hydrochloric acid and 7.0 g water.

A slightly cloudy, yellowish and viscous polymer solution with a polymer content of 7.7% was obtained. The degree of hydrolysis HA was 98 mol % and the degree of conversion HE was 100 mol %.

Final Polymer AE5: Alkaline-Hydrolysed Terpolymer VE5 (VFA/MA/Na Acrylate=70 mol %/25 mol %/5 mol %)

173.6 g of the polymer solution obtained with the starting polymer VE5 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 62.0 g water and then heated to 80° C. 58.5 g of a 25% by weight aqueous sodium hydroxide solution (120 mol % on VFA) were then added. The mixture was held for 5 h at 80° C. The obtained product was cooled to RT and was set to pH 6.0 by adding 23.8 g of a 37% by weight hydrochloric acid.

A slightly cloudy, yellowish and viscous polymer solution with a polymer content of 7.6% was obtained. The degree of hydrolysis HA was 99 mol % and the degree of conversion HE was 100 mol %.

Final Polymer AE6: Alkaline-Hydrolysed Terpolymer VE6 (VFA/MA/Na Acrylate=70 mol %/25 mol %/5 mol %)

149.9 g of the polymer solution obtained with the starting polymer VE6 were mixed in a 500 mL four-neck flask with stirring paddle, internal thermometer, dropping funnel and reflux condenser at a stirrer speed of 80 rpm with 1.0 g of a 40% by weight aqueous sodium bisulfite solution and 136.0 g water and then heated to 80° C. 36.2 g of a 25% by weight aqueous sodium hydroxide solution (120 mol % on VFA) were then added. The mixture was held for 5 h at 80° C. The obtained product was cooled to RT and was set to pH 6.0 by adding 13.7 g of a 37% by weight hydrochloric acid and 7.5 g water.

A slightly cloudy, yellowish and viscous polymer solution with a polymer content of 4.5% was obtained. The degree of hydrolysis HA was 93 mol % and the degree of conversion HE was 100 mol %.

Final Polymer AE7: Alkaline-Hydrolysed Terpolymer VE7 (VFA/MA/Na Acrylate=70 mol %/20 mol %/10 mol %)

170.4 g of the polymer solution obtained with the starting polymer VE7 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 57.0 g water and then heated to 80° C. 58.90 g of a 25% by weight aqueous sodium hydroxide solution (120 mol % on VFA) were then added. The mixture was held for 5 h at 80° C. The obtained product was cooled to RT and was set to pH 6.0 by adding 25.1 g of a 37% by weight hydrochloric acid and 4.5 g water.

A slightly cloudy, yellowish and viscous polymer solution with a polymer content of 7.5% was obtained. The degree of hydrolysis HA was 99 mol % and the degree of conversion HE was 100 mol %.

Final Polymer AE8: Alkaline-Hydrolysed Terpolymer VE8 (VFA/MA/Na Acrylate=70 mol %/15 mol %/15 mol %)

171.0 g of the polymer solution obtained with the starting polymer VE8 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 63.0 g water and then heated to 80° C. 57.8 g of a 25% by weight aqueous sodium hydroxide solution (120 mol % on VFA) were then added. The mixture was held for 5 h at 80° C. The obtained product was cooled to RT and was set to pH 6.0 by adding 27.5 g of a 37% by weight hydrochloric acid.

A slightly cloudy, yellowish and viscous polymer solution with a polymer content of 7.5% was obtained. The degree of hydrolysis HA was 94 mol % and the degree of conversion HE was 100 mol %.

Final Polymer AE9: Alkaline-Hydrolysed Terpolymer VE9 (VFA/MA/Na Acrylate=70 mol %/10 mol %/20 mol %)

177.9 g of the polymer solution obtained with the starting polymer VE9 were mixed in a 500 mL four-neck flask with stirring paddle, internal thermometer, dropping funnel and reflux condenser at a stirrer speed of 80 rpm with 1.7 g of a 40% by weight aqueous sodium bisulfite solution and 65.0 g water and then heated to 80° C. 61.5 g of a 25% by weight aqueous sodium hydroxide solution (120 mol % on VFA) were then added. The mixture was held for 5 h at 80° C. The obtained product was cooled to RT and was set to pH 6.0 by adding 31.3 g of a 37% by weight hydrochloric acid and 1.8 g water.

A slightly cloudy, yellowish and viscous polymer solution with a polymer content of 7.2% was obtained. The degree of hydrolysis HA was 99 mol % and the degree of conversion HE was 100 mol %.

Final Polymer AE10: Alkaline-Hydrolysed Terpolymer VE10 (VFA/MA/Na Acrylate=70 mol %/25 mol %/5 mol %)

170.2 g of the polymer solution VE10 obtained above were mixed in a 500 mL four-neck flask with stirring paddle, internal thermometer, dropping funnel and reflux condenser at a stirrer speed of 80 rpm with 1.5 g of a 40% by weight aqueous sodium bisulfite solution and 50.0 g water and then heated to 80° C. 56.3 g of a 25% by weight aqueous sodium hydroxide solution (120 mol % on VFA) were then added. The mixture was held for 5 h at 80° C. The obtained product was cooled to RT and was set to pH 6.0 by adding 22.2 g of a 37% by weight hydrochloric acid and 8.4 g water.

A slightly cloudy, yellowish and viscous polymer solution with a polymer content of 7.2% was obtained. The degree of hydrolysis HA was 97 mol % and the degree of conversion HE was 100 mol %.

Final Polymer AE11: Alkaline-Hydrolysed Terpolymer VE11 (VFA/MA/Na A<PS=70 mol %/25 mol %/5 mol %)

172.1 g of the polymer solution obtained with the starting polymer VE11 were mixed in a 500 mL four-neck flask with stirring paddle, internal thermometer, dropping funnel and reflux condenser at a stirrer speed of 80 rpm with 1.5 g of a 40% by weight aqueous sodium bisulfite solution and 65.5 g water and then heated to 80° C. 55.9 g of a 25% by weight aqueous sodium hydroxide solution (120 mol % on VFA) were then added. The mixture was held for 5 h at 80° C. The obtained product was cooled to RT and was set to pH 6.0 by adding 22.7 g of a 37% by weight hydrochloric acid and 7.8 g water.

A slightly cloudy, yellowish and viscous polymer solution with a polymer content of 7.5% was obtained. The degree of hydrolysis HA was 94 mol % and the degree of conversion HE was 100 mol %.

Final Polymer AE12: Alkaline-Hydrolysed Terpolymer VE12 (VFA/MA/Na vinyl sulfonate=70 mol %/25 mol %/5 mol %)

178.5 g of the polymer solution obtained with the starting polymer VE12 were mixed in a 500 mL four-neck flask with stirring paddle, internal thermometer, dropping funnel and reflux condenser at a stirrer speed of 80 rpm with 1.7 g of a 40% by weight aqueous sodium bisulfite solution and 75.0 g water and then heated to 80° C. 62.8 g of a 25% by weight aqueous sodium hydroxide solution (120 mol % on VFA) were then added. The mixture was held for 5 h at 80° C. The obtained product was cooled to RT and was set to pH 6.0 by adding 25.4 g of a 37% by weight hydrochloric acid and 5.6 g water.

A slightly cloudy, yellowish and viscous polymer solution with a polymer content of 7.7% was obtained. The degree of hydrolysis HA was 98 mol % and the degree of conversion HE was 100 mol %.

Final Polymer AE13: Alkaline-Hydrolysed Terpolymer VE13 (VFA/MA/DADMAC=65 mol %/30 mol %/5 mol %)

177.6 g of the polymer solution obtained with the starting polymer VE13 were mixed in a 500 mL four-neck flask with stirring paddle, internal thermometer, dropping funnel and reflux condenser at a stirrer speed of 80 rpm with 1.5 g of a 40% by weight aqueous sodium bisulfite solution and 70.0 g water and then heated to 80° C. 53.8 g of a 25% by weight aqueous sodium hydroxide solution (120 mol % on VFA) were then added. The mixture was held for 1 h at 80° C. The obtained product was no longer stirrable. The test was terminated.

Final Polymer AE14: Alkaline-Hydrolysed Terpolymer VE14 (VFA/MA/APTAC=65 mol %/30 mol %/5 mol %)

178.0 g of the polymer solution obtained with the starting polymer VE14 were mixed in a 500 mL four-neck flask with stirring paddle, internal thermometer, dropping funnel and reflux condenser at a stirrer speed of 80 rpm with 1.4 g of a 40% by weight aqueous sodium bisulfite solution and 60.0 g water and then heated to 80° C. 51.8 g of a 25% by weight aqueous sodium hydroxide solution (120 mol % on VFA) were then added. The mixture was held for 5 h at 80° C. The obtained product was cooled to RT and was set to pH 6.0 by adding 18.1 g of a 37% by weight hydrochloric acid and 19.1 g water.

A slightly cloudy, yellowish and viscous polymer solution with a polymer content of 7.5% was obtained. The degree of hydrolysis HA was 95 mol % and the degree of conversion HE was 100 mol %.

Final Polymer AE15: Alkaline-Hydrolysed Terpolymer VE15 (VFA/EA/Na Acrylate=70 mol %/15 mol %/15 mol %)

222.5 g of the polymer solution obtained with the starting polymer VE15 were mixed in a 500 mL four-neck flask with stirring paddle, internal thermometer, dropping funnel and reflux condenser at a stirrer speed of 80 rpm with 1.5 g of a 40% by weight aqueous sodium bisulfite solution and 10.0 g water and then heated to 80° C. 56.3 g of a 25% by weight aqueous sodium hydroxide solution (120 mol % on VFA) were then added. The mixture was held for 5 h at 80° C. The obtained product was cooled to RT and was set to pH 6.0 by adding 25.6 g of a 37% by weight hydrochloric acid and 1.1 g water.

A slightly cloudy, yellowish and viscous polymer solution was obtained.
Polymer content: 7.5%
Formate content FA: 91.4 mmol/100 g
Degree of hydrolysis HA: 98 mol %
Degree of conversion HE: 100 mol %
Charge density LD: 64.0 mmol/100 g
Viscosity (20 1/min, RV, spindle 3): 185 mPas
FAD ($^{13}$C-NMR, 152.3 ppm): 1.11
FFA ($^{13}$C-NMR, 164-167 ppm): 0.82
VFA$^0$: 93.7 mmol/100 g
EA$^0$: 20.0 mmol/100 g
Na-AS$^0$: 20.0 mmol/100 g.

Final Polymer AE16: Alkaline-Hydrolysed Terpolymer VE16 (VFA/MA/Na Acrylate=70 mol %/20 mol %/10 mol %)

652.7 g of the polymer solution obtained with the starting polymer VE16 were mixed in a 500 mL four-neck flask with stirring paddle, internal thermometer, dropping funnel and reflux condenser at a stirrer speed of 80 rpm with 4.5 g of a 40% by weight aqueous sodium bisulfite solution and 185.3 g water and then heated to 80° C. 165.3 g of a 25% by weight aqueous sodium hydroxide solution (120 mol % on VFA) were then added. The mixture was held for 6 h at 80° C. The obtained product was cooled to RT and was set to pH 6.0 by adding 70.2 g of a 37% by weight hydrochloric acid and 12.7 g water.

A slightly cloudy, yellowish and viscous polymer solution was obtained.
Polymer content: 6.6%
Formate content FA: 74.0 mmol/100 g
Degree of hydrolysis HA: 94 mol %
Degree of conversion HE: 100 mol %
Charge density LD: 51.3 mmol/100 g
Viscosity (20 1/min, RV, spindle 3) 268 mPas
FAD ($^{13}$C-NMR, 152.3 ppm): 1.86
FFA ($^{13}$C-NMR, 164-167 ppm): 2.78
VFA$^0$: 79.5 mmol/100 g
EA$^0$: 22.7 mmol/100 g
Na-AS$^0$: 11.4 mmol/100 g.

Final Polymer AE17: Alkaline-Hydrolysed Terpolymer VE17 (VFA/MA/Na Acrylate=70 mol %/20 mol %/10 mol %)

249.5 g of the polymer solution obtained with the starting polymer VE17 were mixed in a 500 mL four-neck flask with stirring paddle, internal thermometer, dropping funnel and reflux condenser at a stirrer speed of 80 rpm with 1.8 g of a 40% by weight aqueous sodium bisulfite solution and 20.0 g water and then heated to 80° C. 53.9 g of a 25% by weight aqueous sodium hydroxide solution (100 mol % on VFA) were then added. The mixture was held for 6 h at 80° C. The obtained product was cooled to RT and was set to pH 6.0 by adding 20.7 g of a 37% by weight hydrochloric acid.

A slightly cloudy, yellowish and viscous polymer solution was obtained.
Polymer content: 8.4%
Formate content FA: 83.4 mmol/100 g
Degree of hydrolysis HA: 85 mol %
Degree of conversion HE: 100 mol %
Charge density LD: 56.7 mmol/100 g
Viscosity (50 1/min, RV, spindle 3) 1172 mPas
FAD ($^{13}$C-NMR, 152.3 ppm): 0.90
FFA ($^{13}$C-NMR, 164-167 ppm) 3.82
VFA$^0$: 98.3 mmol/100 g
EA$^0$: 28.1 mmol/100 g
Na-AS$^0$: 14.0 mmol/100 g.

Final Polymer AE18: Alkaline-Hydrolysed Terpolymer VE18 (VFA/MA/Na Acrylate=70 mol %/20 mol %/10 mol %)

248.8 g of the polymer solution obtained with the starting polymer VE18 were mixed in a 500 mL four-neck flask with stirring paddle, internal thermometer, dropping funnel and reflux condenser at a stirrer speed of 80 rpm with 1.7 g of a 40% by weight aqueous sodium bisulfite solution and 20.0 g water and then heated to 50° C. 63.7 g of a 25% by weight aqueous sodium hydroxide solution (120 mol % on VFA) were then added. The mixture was held for 24 h at 50° C. The obtained product was cooled to RT and was set to pH 6.0 by adding 27.9 g of a 37% by weight hydrochloric acid.

A slightly cloudy, yellowish and viscous polymer solution was obtained.
Polymer content: 8.2%
Formate content FA: 88.2 mmol/100 g
Degree of hydrolysis HA: 91 mol %
Degree of conversion HE: 100 mol %
Charge density LD: 67.7 mmol/100 g
Viscosity (50 1/min, RV, spindle 3) 866 mPas
FAD ($^{13}$C-NMR, 152.3 ppm): 0.77
FFA ($^{13}$C-NMR, 164-167 ppm): 3.14
VFA$^0$: 97.7 mmol/100 g
EA$^0$: 27.9 mmol/100 g
Na-AS$^0$: 14.0 mmol/100 g.

Final Polymer AE19: Alkaline-Hydrolysed Copolymer VE19 (VFA/MA=70 mol %/30 mol %)

121.3 g of the polymer solution obtained with the starting polymer VE19 were mixed in a 500 mL four-neck flask with stirring paddle, internal thermometer, dropping funnel and reflux condenser at a stirrer speed of 80 rpm with 1.1 g of a 40% by weight aqueous sodium bisulfite solution and then heated to 80° C. 39.5 g of a 25% by weight aqueous sodium hydroxide solution (120 mol % on VFA) were then added. The mixture was held for 5 h at 80° C. The obtained product was cooled to RT and was set to pH 6.0 by adding 14.5 g of a 37% by weight hydrochloric acid.

A slightly cloudy, yellowish and viscous polymer solution was obtained.
Polymer content: 7.9%
Formate content FA: 97.5 mmol/100 g
Degree of hydrolysis HA: 99 mol %
Degree of conversion HE: 100 mol %
Charge density LD: 64.3 mmol/100 g
Viscosity (20 1/min, RV, spindle 3) 794 mPas
FAD ($^{13}$C-NMR, 152.3 ppm): 10.0
FFA ($^{13}$C-NMR, 164-167 ppm): <0.01
VFA$^0$: 98.8 mmol/100 g
MA$^0$: 42.3 mmol/100 g.

Final Polymer AE20: Alkaline-Hydrolysed Copolymer VE20 (VFA/MA=60 mol %/40 mol %)

180.0 g of the polymer solution obtained with the starting polymer VE20 were mixed in a 500 mL four-neck flask with stirring paddle, internal thermometer, dropping funnel and reflux condenser at a stirrer speed of 80 rpm with 1.3 g of a 40% by weight aqueous sodium bisulfite solution and then heated to 80° C. 51.4 g of a 25% by weight aqueous sodium hydroxide solution (125 mol % on VFA) were then added. The mixture was held for 5 h at 80° C. The obtained product was cooled to RT and was set to pH 6.0 by adding 14.2 g of a 37% by weight hydrochloric acid and 10.4 g water.

A slightly cloudy, yellowish and viscous polymer solution was obtained.
Polymer content: 8.3%
Formate content FA: 76.5 mmol/100 g
Degree of hydrolysis HA: 94 mol %
Degree of conversion HE: 100 mol %
Charge density LD: 34.0 mmol/100 g
Viscosity (20 1/min, RV, spindle 3) 2320 mPas
FAD ($^{13}$C-NMR, 152.3 ppm): 5.1
FFA ($^{13}$C-NMR, 164-167 ppm): 0.9
VFA$^0$: 98.8 mmol/100 g
MA$^0$: 42.3 mmol/100 g.

Final polymer AE21: Alkaline-Hydrolysed copolymer VE21 (VFA/MA=80 mol %/20 mol %) 197.6 g of the polymer solution obtained with the starting polymer VE21 were mixed in a 500 mL four-neck flask with stirring paddle, internal thermometer, dropping funnel and reflux condenser at a stirrer speed of 80 rpm with 2.1 g of a 40% by weight aqueous sodium bisulfite solution and then heated to 80° C. 73.8 g of a 25% by weight aqueous sodium hydroxide solution (116 mol % on VFA) were then added. The mixture was held for 5 h at 80° C. The obtained product was cooled to RT and was set to pH 6.0 by adding 32.5 g of a 37% by weight hydrochloric acid and 130.2 g water.

A slightly cloudy, yellowish and viscous polymer solution was obtained.
Polymer content: 7.0%
Formate content FA: 105.8 mmol/100 g
Degree of hydrolysis HA: 98 mol %
Degree of conversion HE: 100 mol %
Charge density LD: 79.5 mmol/100 g
Viscosity (20 1/min, RV, spindle 3) 755 mPas
FAD ($^{13}$C-NMR, 152.3 ppm): 10.0
FFA ($^{13}$C-NMR, 164-167 ppm): 2.9
VFA$^0$: 108 mmol/100 g
MA$^0$: 42.3 mmol/100 g.

Final Polymer AE22: Alkaline-Hydrolysed Terpolymer VE22 (VFA/MA/Na Acrylate=70 mol %/25 mol %/5 mol %)

265.8 g of the polymer solution obtained with the starting polymer VE22 were mixed in a 500 mL four-neck flask with stirring paddle, internal thermometer, dropping funnel and reflux condenser at a stirrer speed of 80 rpm with 1.8 g of a 40% by weight aqueous sodium bisulfite solution and then heated to 80° C. 67.1 g of a 25% by weight aqueous sodium hydroxide solution (120 mol % on VFA) were then added. The mixture was held for 5 h at 80° C. The obtained product was cooled to RT and was set to pH 6.0 by adding 26.0 g of a 37% by weight hydrochloric acid and 3.3 g water.

A slightly cloudy, yellowish and viscous polymer solution was obtained.
Polymer content: 7.7%
Formate content FA: 94.8 mmol/100 g
Degree of hydrolysis HA: 98 mol %
Degree of conversion HE: 100 mol %
Charge density LD: 66.0 mmol/100 g
Viscosity (20 1/min, RV, spindle 3) 325 mPas
FAD ($^{13}$C-NMR, 152.3 ppm): 1.90
FFA ($^{13}$C-NMR, 164-167 ppm): 2.80
VFA$^0$: 96.7 mmol/100 g
MA$^0$: 34.6 mmol/100 g
Na-AS$^0$: 6.9 mmol/100 g.

Final Polymer AE23: Alkaline-Hydrolysed Terpolymer VE23 (VFA/EA/Na Acrylate=70 mol %/25 mol %/5 mol %)

174.4 g of the polymer solution obtained with the starting polymer VE23 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 64.0 g water and then heated to 50° C. 57.5 g of a 25% by weight aqueous sodium hydroxide solution (120 mol % on VFA) were then added. The mixture was held for 24 h at 50° C. The obtained product was cooled to RT and was set to pH 6.0 by adding 22.7 g of a 37% by weight hydrochloric acid and 6.5 g water.

A slightly cloudy, yellowish and viscous polymer solution was obtained.
Polymer content: 7.8%
Formate content FA: 89.0 mmol/100 g
Degree of hydrolysis HA: 97 mol %
Degree of conversion HE: 100 mol %
Charge density LD: 66.9 mmol/100 g
Viscosity (50 1/min, RV, spindle 3) 715 mPas
FAD ($^{13}$C-NMR, 152.3 ppm): 2.0
FFA ($^{13}$C-NMR, 164-167 ppm): 2.8
VFA$^0$: 92.5 mmol/100 g
EA$^0$: 33.0 mmol/100 g
Na-AS$^0$: 6.6 mmol/100 g.

Final Polymer AE24: Alkaline-Hydrolysed Terpolymer VE24 (VFA/EA/Na Acrylate=70 mol %/20 mol %/10 mol %)

173.1 g of the polymer solution obtained with the starting polymer VE24 were mixed in a 500 mL four-neck flask with stirring paddle, internal thermometer, dropping funnel and reflux condenser at a stirrer speed of 80 rpm with 2.6 g of a 40% by weight aqueous sodium bisulfite solution and 65.0 g water and then heated to 80° C. 58.1 g of a 25% by weight aqueous sodium hydroxide solution (120 mol % on VFA) were then added. The mixture was held for 6 h at 80° C. The obtained product was cooled to RT and was set to pH 6.0 by adding 24.6 g of a 37% by weight hydrochloric acid and 6.0 g water.

A slightly cloudy, yellowish and viscous polymer solution was obtained.
Polymer content: 7.7%
Formate content FA: 87.9 mmol/100 g
Degree of hydrolysis HA: 96 mol %
Degree of conversion HE: 100 mol %
Charge density LD: 55.0 mmol/100 g
Viscosity (20 1/min, RV, spindle 3) 735 mPas
FAD ($^{13}$C-NMR, 152.3 ppm): 1.93
FFA ($^{13}$C-NMR, 164-167 ppm): 2.65
VFA$^0$: 92.85 mmol/100 g
Na-AS$^0$: 13.3 mmol/100 g
EA$^0$: 26.5 mmol/100 g.

Final Polymer AE25: Alkaline-Hydrolysed Terpolymer VE25 (VFA/EA/Na Acrylate=70 mol %/10 mol %/20 mol %)

185.3 g of the polymer solution obtained with the starting polymer VE25 were mixed in a 500 mL four-neck flask with stirring paddle, internal thermometer, dropping funnel and reflux condenser at a stirrer speed of 80 rpm with 1.7 g of a 40% by weight aqueous sodium bisulfite solution and 65.0 g water and then heated to 80° C. 63.2 g of a 25% by weight aqueous sodium hydroxide solution (120 mol % on VFA) were then added. The mixture was held for 6 h at 80° C. The obtained product was cooled to RT and was set to pH 6.0 by adding 31.2 g of a 37% by weight hydrochloric acid and 1.3 g water.

A slightly cloudy, yellowish and viscous polymer solution was obtained.
Polymer content: 7.3%
Formate content FA: 92.0 mmol/100 g
Degree of hydrolysis HA: 99 mol %
Degree of conversion HE: 100 mol %
Charge density LD: 70.1 mmol/100 g
Viscosity (20 1/min, RV, spindle 3) 535 mPas
FAD ($^{13}$C-NMR, 152.3 ppm): 2.18
FFA ($^{13}$C-NMR, 164-167 ppm): 2.20
VFA$^0$: 92.85 mmol/100 g
EA$^0$: 26.5 mmol/100 g
Na-AS$^0$: 13.3 mmol/100 g.

Final Polymer AE26: Alkaline-Hydrolysed Terpolymer VE26 (VFA/EA/Na Acrylate=70 mol %/20 mol %/10 mol %)

169.1 g of the polymer solution obtained with the starting polymer VE26 were mixed in a 500 mL four-neck flask with stirring paddle, internal thermometer, dropping funnel and reflux condenser at a stirrer speed of 80 rpm with 1.2 g of a 40% by weight aqueous sodium bisulfite solution and 20.0 g water and then heated to 50° C. 29.0 g of a 25% by weight aqueous sodium hydroxide solution (82 mol % on VFA) were then added. The mixture was held for 24 h at 50° C. The obtained product was cooled to RT and was set to pH 6.0 by adding 10.7 g of a 37% by weight hydrochloric acid and 5.3 g water.

A slightly cloudy, yellowish and viscous polymer solution was obtained.
Polymer content: 7.9%
Formate content FA: 63.2 mmol/100 g
Degree of hydrolysis HA: 72 mol %
Degree of conversion HE: 100 mol %
Charge density LD: 39.8 mmol/100 g
Viscosity (50 1/min, RV, spindle 3) 594 mPas
FAD ($^{13}$C-NMR, 152.3 ppm): 4.1
FFA ($^{13}$C-NMR, 164-167 ppm): 4.0
VFA$^0$: 88.4 mmol/100 g
EA$^0$: 25.3 mmol/100 g
Na-AS$^0$: 12.6 mmol/100 g.

Final Polymer AE27: Alkaline-Hydrolysed Terpolymer VE18 (VFA/EA/Na Acrylate=70 mol %/20 mol %/10 mol %)

1006.2 g of the polymer solution obtained with the starting polymer VE18 were mixed, under stirring, with 126.4 g water in a pressure-tight, 2 L steel reactor with stirrer, internal thermometer, a heating/cooling jacket, pressure gauge, pressure relief valve, reflux condenser and a pressure-tight feed vessel and were heated to 107° C. A pressure of 2.8 bar formed. 256.8 g of a 25% by weight aqueous sodium hydroxide solution (120 mol % on VFA) were provided in the feed vessel. The sodium hydroxide solution was pressed into the reactor at 5 bar pressure and mixed in. A temperature of 100° C. was achieved and was maintained for 60 min. The reactor was then cooled as quickly as possible to RT. 306.9 g of the obtained product were set to pH 6.0 by adding 26.4 g of a 37% by weight hydrochloric acid and 3.7 g water.

A slightly cloudy, yellowish and viscous polymer solution was obtained.
Polymer content: 7.3%
Formate content FA: 90.1 mmol/100 g
Degree of hydrolysis HA: 94 mol %
Degree of conversion HE: 100 mol %
Charge density LD: 66.5 mmol/100 g
Viscosity (20 1/min, RV, spindle 3) 1030 mPas
FAD ($^{13}$C-NMR, 152.3 ppm): 1.79
FFA ($^{13}$C-NMR, 164-167 ppm): 1.46
VFA$^0$: 97.2 mmol/100 g
EA$^0$: 27.8 mmol/100 g
Na-AS$^0$: 13.9 mmol/100 g.

Final Polymer AE28: Alkaline-Hydrolysed Terpolymer VE18 (VFA/EA/Na Acrylate=70 mol %/20 mol %/10 mol %)

990.2 g of the polymer solution obtained with the starting polymer VE18 were mixed, under stirring, with 126.4 g water in a pressure-tight, 2 L steel reactor with stirrer, internal thermometer, a heating/cooling jacket, pressure gauge, pressure relief valve, reflux condenser and a pressure-tight feed vessel and were heated to 125° C. A pressure of 4 bar formed. 126.4 g of a 50% by weight aqueous sodium hydroxide solution (120 mol % on VFA) were provided in the feed vessel. The sodium hydroxide solution was pressed into the reactor at 6 bar pressure and mixed in. A temperature of 120° C. was achieved and was maintained for 30 min. The reactor was then cooled as quickly as possible to RT. 295.8 g of the obtained product were set to pH 6.0 by adding 26.1 g of a 37% by weight hydrochloric acid and 2.9 g water.

A slightly cloudy, yellowish and viscous polymer solution was obtained.
Polymer content: 7.2%
Formate content FA: 94.7 mmol/100 g
Degree of hydrolysis HA: 97.4 mol %
Degree of conversion HE: 100 mol %
Charge density LD: 68.8 mmol/100 g
Viscosity (20 1/min, RV, spindle 3) 940 mPas
FAD ($^{13}$C-NMR, 152.3 ppm): 1.31
FFA ($^{13}$C-NMR, 164-167 ppm): 1.01
VFA$^0$: 97.2 mmol/100 g
EA$^0$: 27.8 mmol/100 g
Na-AS$^0$: 13.9 mmol/100 g.

Final Polymer AE29: Alkaline-Hydrolysed Terpolymer VE27 (VFA/MA/AM=70 mol %/25 mol %/5 mol %)

156.0 g of the polymer solution obtained with the starting polymer VE27 were mixed in a 500 mL four-neck flask with stirring paddle, internal thermometer, dropping funnel and reflux condenser at a stirrer speed of 80 rpm with 1.6 g of a 40% by weight aqueous sodium bisulfite solution and 72.9 g water and then heated to 80° C. 60.3 g of a 25% by weight aqueous sodium hydroxide solution (120 mol % on VFA) were then added. The mixture was held for 5 h at 80° C. The obtained product was cooled to RT and was set to pH 6.0 by adding 24.1 g of a 37% by weight hydrochloric acid and 7.5 g water.

A slightly cloudy, yellowish and viscous polymer solution with a polymer content of 7.9% was obtained. The degree of hydrolysis HA was 93 mol % and the degree of conversion HE was 100 mol %.

Final Polymer AV1: Alkaline-Hydrolysed Copolymer W1 (VFA/Na Acrylate=70 mol %/30 mol 206.1 g of the polymer solution obtained with the starting polymer VV1 were mixed in a 500 mL four-neck flask with stirring paddle, internal thermometer, dropping funnel and reflux condenser at a stirrer speed of 80 rpm with 2.3 g of a 40% by weight aqueous sodium bisulfite solution and then heated to 80° C. 77.0 g of a 25% by weight aqueous sodium hydroxide solution (110 mol % on VFA) were then added. The mixture was held for 5 h at 80° C. The obtained product was cooled to RT and was set to pH 8.5 by adding 32.3 g of a 37% by weight hydrochloric acid and 9.6 g water.

A slightly cloudy, yellowish and viscous polymer solution with a polymer content of 9.9% was obtained. The degree of hydrolysis HA was 100 mol %.

A-4) Overview of Details of the Produced Polymers

Overviews of details of the produced polymers are summarised in Tables A-4-1 and A-4-2.

TABLE A-4-1

Observations regarding viscosity during the hydrolysis to final polymers starting from the corresponding starting polymer

| Final polymer | Monomers for starting polymer [mol %] | K-value starting polymer | Hydrolysis | Degree of hydrolysis HA [mol %] | Degree of conversion HE [mol %] | Polymer content [%] | Viscosity peak |
|---|---|---|---|---|---|---|---|
| AE1 | VFA/MA = 70/30 | 84 | HCl, 120 mol % | 98 | 100 | 8.3 | none |
| AE2 | VFA/MA = 70/30 | 84 | NaOH, 120 mol % | 96 | 100 | 7.9 | extreme |
| AE20 | VFA/MA = 60/40 | 84 | NaOH, 125 mol % | 94 | 100 | 8.3 | extreme |
| AE21 | VFA/MA = 80/20 | 84 | NaOH, 116 mol % | 99 | 100 | 7 | extreme |
| AE3 | VFA/MA/Na acrylate = 70/29/1 | 90 | NaOH, 120 mol % | 99 | 100 | 7.7 | moderate |
| AE4 | VFA/MA/Na acrylate = 70/28/2 | 90 | NaOH, 120 mol % | 98 | 100 | 7.7 | minimal |
| AE5 | VFA/MA/Na acrylate = 70/25/5 | 93 | NaOH, 120 mol % | 99 | 100 | 7.6 | none |
| AE6 | VFA/MA/Na acrylate = 70/25/5 | 138 | NaOH, 120 mol % | 93 | 100 | 4.5 | low |
| AE7 | VFA/MA/Na acrylate = 70/20/10 | 94 | NaOH, 120 mol % | 99 | 100 | 7.5 | none |
| AE8 | VFA/MA/Na acrylate = 70/15/15 | 99 | NaOH, 120 mol % | 94 | 100 | 7.4 | none |
| AE9 | VFA/MA/Na acrylate = 70/10/20 | 102 | NaOH, 120 mol % | 99 | 100 | 7.2 | none |
| AE22 | VFA/EA/Na acrylate = 70/25/5 | 81 | NaOH, 120 mol % | 98 | 100 | 7.7 | minimal |
| AE23 | VFA/EA/Na acrylate = 70/25/5 | 90 | NaOH, 120 mol % | 97 | 100 | 7.8 | none |
| AE24 | VFA/EA/Na acrylate = 70/20/10 | 99 | NaOH, 120 mol % | 96 | 100 | 7.7 | minimal |
| AE17 | VFA/EA/Na acrylate = 70/20/10 | 103 | NaOH, 120 mol % | 85 | 100 | 8.4 | none |
| AE15 | VFA/EA/Na acrylate = 70/20/10 | 91 | NaOH, 120 mol % | 98 | 100 | 7.5 | none |
| AE10 | VFA/MA/Na methacrylate = 70/25/5 | 94 | NaOH, 120 mol % | 97 | 100 | 7.2 | none |
| AE11 | VFA/MA/Na AMPS = 70/25/5 | 89 | NaOH, 120 mol % | 94 | 100 | 7.5 | none |
| AE12 | VFA/MA/Na vinylsulfonate = 70/25/5 | 87 | NaOH, 120 mol % | 98 | 100 | 7.7 | low |
| AE13 | VFA/MA/DADMAC = 65/30/5 | 82 | NaOH, 120 mol % | n.d. | n.d. | n.d. | very extreme |
| AE14 | VFA/MA/APTAC = 75/30/5 | 87 | NaOH, 120 mol % | 94 | 100 | 7.5 | strong |
| AE29 | VFA/MA/AM = 70/25/5 | 89 | NaOH, 120 mol % | 93 | 100 | 7.9 | very strong |

Notes:
The starting polymer VE1 for the final polymer AE1 is produced practically identically to the starting polymer VE2 for the final polymer AE2. No viscosity peak occurs in the acid hydrolysis of the starting polymer VE1 to give the final polymer AE1, whereas an extreme viscosity peak occurs in the alkaline hydrolysis of the starting polymer VE2 to give the final polymer AE2. The presence of a polymerised-in, anionic monomer in the starting polymer V reduces or prevents the occurrence of a viscosity peak in alkaline hydrolysis to give the final polymers AE3, AE4, AE5, AE6, AE7, AE8, AE9, AE10, AE11, AE12, AE15, AE 17, AE22, AE23 and AE24. The presence of a polymerised-in diallyldimethylammonium chloride (DADMAC), (3-acrylamidopropyl)trimethylammonium chloride (APTAC) or acrylamide (AM) in the starting polymer V to give the final polymers AE13, AE14 and AE29 does not have this effect.

TABLE A-4-2

Calculated composition for final polymers with structural formula III

| Final polymer | Monomers for starting polymer [mol %] | K-value starting polymer | Degree of hydrolysis HA [mol %] | Amidinium (a) [mol %] | VFA (b) [mol %] | Vinyl ammonium (c) [mol %] | Acrylate anion (d) [mol %] | Lactam (e) [mol %]) |
|---|---|---|---|---|---|---|---|---|
| AE15 [b] | VFA/EA/Na acrylate = 70/15/15 | 91 | 99 | 1.0 | 0.7 | 60.1 | 12.0 | 26.2 |
| AE16 [b] | VFA/EA/Na acrylate = 70/20/10 | 99 | 94 | 2.5 | 3.7 | 55.3 | 12.9 | 25.6 |
| AE17 [b] | VFA/EA/Na acrylate = 70/20/10 | 103 | 86 | 2.4 | 10.4 | 49.2 | 13.9 | 24.1 |
| AE18 [b] | VFA/EA/Na acrylate = 70/20/10 | 101 | 91 | 1.6 | 6.5 | 56.2 | 18.2 | 17.5 |
| AE19 [b] | VFA/MA = 70/30 | 82 | 99 | 1.3 | 0 | 59.1 | 8.5 | 31.1 |
| AE20 [b] | VFA/MA = 60/40 | 84 | 94 | 4.9 | 0.9 | 33.1 | 13.4 | 47.7 |
| AE21 [b] | VFA/MA = 80/20 | 84 | 99 | 1.6 | 0.5 | 72.7 | 0.7 | 24.5 |
| AE22 [b] | VFA/MA/Na acrylate = 70/25/5 | 81 | 99 | 0.7 | 1 | 60.1 | 11.7 | 26.5 |
| AE23 [b] | VFA/EA/Na acrylate = 70/25/5 | 90 | 97 | 1.4 | 1.8 | 60.3 | 16.1 | 20.4 |
| AE24 [b] | VFA/EA/Na acrylate = 70/20/10 | 99 | 96 | 2.2 | 2.8 | 54.4 | 6.9 | 33.7 |
| AE25 [b] | VFA/EA/Na acrylate = 70/10/20 | 101 | 99 | 0.6 | 0.7 | 62.6 | 16.4 | 19.7 |

TABLE A-4-2-continued

Calculated composition for final polymers with structural formula III

| Final polymer | Monomers for starting polymer [mol %] | K-value starting polymer | Degree of hydrolysis HA [mol %] | Amidinium (a) [mol %] | VFA (b) [mol %] | Vinyl ammonium (c) [mol %] | Acrylate anion (d) [mol %] | Lactam (e) [mol %]) |
|---|---|---|---|---|---|---|---|---|
| AE26 [b] | VFA/EA/Na acrylate = 70/20/10 | 102 | 72 | 14.2 | 13.8 | 30 | 16.1 | 25.9 |
| AE27 [b] | VFA/EA/Na acrylate = 70/20/10 | 101 | 94 | 3.5 | 2.9 | 56.2 | 16.2 | 21.2 |
| AE28 [b] | VFA/EA/Na acrylate = 70/20/10 | 101 | 98 | 1.3 | 1 | 60.3 | 14.2 | 23.2 |

Footnotes:
[a] comparative
[b] according to the invention

B) Paper

B-1) Production of the Paper Material

A pulp produced by impacting paper webs in a pulper was used as paper material for the paper production. The paper web was constituted by a raw packaging paper of specification "Testliner 2" with an areal density of 120 g/m$^2$, originating from Thurpapier in Weinfelden (Switzerland). The pulp was obtained by disintegrating paper webs in drinking water and by mechanically processing them in a pulper at approximately 3.5% solid content. The pulp then typically had a fineness around 50° SR (Schopper-Riegler).

B-2) Treating the Paper Material with Final Polymers

The treatment with final polymers was performed either in "thick matter" at a solid content around 3.5% of the pulp, or in "thin matter" at a solid content around 0.8% of the pulp. In the case of the "thick matter treatment", 500 g of pulp were placed in a large glass beaker. A 2% aqueous solution of final polymer was then added, with stirring. The stated percentage refers to the polymer content in the final polymer. The pulp was treated with 1.315 g 2% aqueous solution of final polymer or with 2.63 g 2% aqueous solution of final polymer, i.e. 1.315 g or 2.63 g to give 500 g pulp. This corresponds to a treatment with 0.15% or 0.3% final polymer in relation to dry paper material. 100 g of the treated pulp were then filled into a further glass container and then diluted with drinking water to a solid concentration of 0.8%.

In the case of the "thin matter treatment" 114.3 g of pulp were placed in a large glass beaker. The pulp was then diluted with drinking water to a solid concentration of 0.8%. The additives were added with stirring as 2% aqueous solution of final polymer. The stated percentage refers to the polymer content in the final polymer. The diluted pulp was treated with 0.3 g 2% aqueous solution of final polymer or with 0.6 g 2% aqueous solution of final polymer. This corresponds to a treatment with 0.15% or 0.3% final polymer in relation to dry paper material.

B-3) Production of the Paper Sheets

The objective was to produce paper sheets with an areal density of 120 g/m$^2$ starting from a paper material treated with final polymers with a solid content of 0.8%. The paper sheets were produced on a dynamic sheet former from TechPap (France). A paper material suspension, i.e. of the paper material treated with a final polymer as appropriate, was sprayed onto a sieve. The sieve was clamped in an upright, rapidly rotating drum. The dewatering and sheet formation in this system were determined, besides the sheet structure, in particular by the centrifugal forces within the rotating drum. By varying the rotary speed of the drum, the centrifugal force acting on the formed sheet structure can be varied. The result is a variation of the sheet dewatering, which leads to a variation of the dry content in the formed wet paper structure. What is meant here is the dry content of the wet paper structure directly after the removal from the sieve clamped in the drum of the dynamic sheet former. The rotation speed of the drum can be varied in 5 stages between 600 and 1100 rpm, whereby dry contents can be set in a range between 15% by weight and 21% by weight. A small part of the sheet structure, still wet, was used to directly determine the dry content after removal of the wet paper structure from the sieve of the dynamic sheet former.

After removal from the drum of the dynamic sheet former, the wet paper structures were covered from both sides with blotting paper and dewatered in a static press at 6 bar for 30 seconds, whereby a wet paper sheet was formed from the paper structure. The dry content of the wet paper sheet was then typically between 41% by weight and 43% by weight. If the lower value is undershot significantly, the thickness of the blotting paper or the number of the positioned sheets can be increased in order to reach the above-mentioned range.

The wet paper sheet was then covered again from both sides with fresh blotting papers and was then clamped for 10 minutes in a drying roll. The surface temperature of the drying roll was approximately 100° C. A dry paper sheet was formed. After drying, the dried paper sheets were introduced into an air-conditioned room for conditioning.

B-4) Dry Content of a Paper Sample and Internal Strength of the Dried Paper Sheets In order to determine the dry content (TG) of a paper sample, the mass of a moist sample (MF) was determined from the moist paper sample on a calibrated top-loaded steelyard balance, with which it was possible to measure to 0.01 g. The moist paper sample preferably had an area of at least 10 cm×10 cm. The moist paper sample was then placed in a calibrated drying cabinet, which could observe a set temperature to ±2° C., and was dried at a set temperature of 105° C. to constant mass. This was typically the case after 90 minutes. The dried paper sample, still warm, was then transferred into a desiccator, which contained a suitable drying agent such as silica gel. After cooling to room temperature the mass of the dried paper sample (MT) was determined on the aforementioned balance. The dry content of the paper sample, calculated according to TG=100·MT/MF, was then specified in % by weight. The percentage value was often specified to one decimal point. If this percentage value no longer changes to the rounded first decimal point, this is indicative that constant mass has been reached in the case of dry contents of from 1 to 100% by weight. At dry contents of 0 to less than 1% by weight the rounded second decimal point of the percentage value is the relevant indicator. The drying was performed at ambient pressure, optionally 101.32 KPa, without correcting any deviation resulting from weather and sea level. During the drying the air pressure normally prevailing was maintained, that is to say potentially 101.32 kPa. No correction was made if the air pressure were slightly different, caused by weather and sea level. In the case of a moist sample which does not yet have sheet consistency, for example a fibrous material suspension or a pulp, the moist sample was dried in an appropriate tray of large surface.

In order to determine the internal strength of a dried paper sheet, this sheet was stored in an air-conditioned room under constant conditions of 23° C. and 50% relative humidity for 12 h. The internal strength was measured by an approach corresponding to TAPPI standard T833 pm-94. In this case 10 paper strips 2.5 cm wide and 12.7 cm long were cut from two paper sheets which had been produced and then dried as described above. Each individual paper sample was fastened to a separate baseplate and a metal bracket using double-sided adhesive tape.

The metal bracket was impacted using a pendulum, wherein the paper sample to be examined was cleaved in a plane parallel to the paper surface. The energy required for this process was measured. The apparatus used for the measurement was an Internal-Bond-Test-Station from TMI (Testing Machines Inc. Islandia, N.Y., USA). The double-sided adhesive tape was a product from the company 3M (width 25.4 mm, Scotch type no. 140). The measurement apparatus delivered the energy required for the cleavage in $J/m^2$ in relation to a standardised area. The internal strength is the mean value formed from 10 individual measurements.

B-5) Produced Dried Paper Sheets and Results

Three wet paper structures with dry contents of 15.7% by weight, 17.4% by weight and 20.4% by weight were produced from untreated paper material as reference examples (RB) for dried paper sheets. The wet paper structures were then pressed and dried. Wet paper structures each with two different dry contents between 16.5 and 21% by weight per final polymer were produced from paper materials treated with final polymer, wherein one dry content was below 18.5% by weight and one dry content was above 18.5% by weight. Table B-5-1 specifies the used final polymers and obtained results.

TABLE B-5-1

Used final polymers and results obtained

| Example | Final polymer | Dose [c] | Dry content [d] [% by weight] | Internal strength [e] [J/m²] Thick matter addition | Internal strength [e] [J/m²] Thin matter addition |
|---|---|---|---|---|---|
| RB1 [a] | — | — | 15.7 | 118 | — |
| RB2 [a] | — | — | 17.4 | 125 | — |
| RB3 [a] | — | — | 20.4 | 129 | — |
| VB1 [a] | AV1 | 0.15 | 16.9 | 140 | — |
| VB2 [a] | AV1 | 0.30 | 17.1 | 147 | — |
| VB3 [a] | AV1 | 0.15 | 17.3 | — | 141 |
| VB4 [a] | AV1 | 0.30 | 17.5 | — | 155 |
| EB1 [b] | AE 19 | 0.15 | 17.7 | 166 | — |
| EB2 [b] | AE 19 | 0.30 | 17.4 | 178 | — |
| EB3 [b] | AE 19 | 0.15 | 17.2 | — | 169 |
| EB4 [b] | AE 19 | 0.30 | 18.0 | — | 179 |
| EB5 [b] | AE 20 | 0.15 | 17.4 | 164 | — |
| EB6 [b] | AE 20 | 0.30 | 18.1 | 177 | — |
| EB7 [b] | AE 20 | 0.15 | 17.8 | — | 167 |
| EB8 [b] | AE 20 | 0.30 | 18.2 | — | 184 |
| EB9 [b] | AE 21 | 0.15 | 17.1 | 166 | — |
| EB10 [b] | AE 21 | 0.30 | 17.4 | 189 | — |
| EB11 [b] | AE 21 | 0.15 | 17.6 | — | 171 |
| EB12 [b] | AE 21 | 0.30 | 17.7 | — | 183 |
| EB13 [b] | AE 22 | 0.15 | 17.0 | 167 | — |
| EB14 [b] | AE 22 | 0.30 | 17.5 | 179 | — |
| EB15 [b] | AE 22 | 0.15 | 17.4 | — | 169 |
| EB16 [b] | AE 22 | 0.30 | 17.3 | — | 182 |
| EB17 [b] | AE 23 | 0.15 | 17.9 | 172 | — |
| EB18 [b] | AE 23 | 0.30 | 18.0 | 191 | — |
| EB19 [b] | AE 23 | 0.15 | 17.3 | — | 169 |
| EB20 [b] | AE 23 | 0.30 | 17.6 | — | 185 |
| EB21 [b] | AE 24 | 0.15 | 16.8 | 172 | — |
| EB22 [b] | AE 24 | 0.30 | 17.4 | 188 | — |
| EB23 [b] | AE 24 | 0.15 | 17.2 | — | 173 |
| EB24 [b] | AE 24 | 0.30 | 17.7 | — | 189 |
| EB25 [b] | AE 15 | 0.15 | 17.2 | 167 | — |
| EB26 [b] | AE 15 | 0.30 | 17.5 | 183 | — |
| EB27 [b] | AE 15 | 0.15 | 17.6 | — | 173 |
| EB28 [b] | AE 15 | 0.30 | 17.8 | — | 188 |
| VB5 [a] | AV1 | 0.15 | 19.7 | 143 | — |
| VB6 [a] | AV1 | 0.30 | 18.9 | 154 | — |
| VB7 [a] | AV1 | 0.15 | 19.5 | — | 149 |
| VB8 [a] | AV1 | 0.30 | 19.1 | — | 161 |
| EB 33 [b] | AE 19 | 0.15 | 19.7 | 221 | — |
| EB 34 [b] | AE 19 | 0.30 | 19.6 | 272 | — |
| EB 35 [b] | AE 19 | 0.15 | 19.9 | — | 229 |
| EB 36 [b] | AE 19 | 0.30 | 19.3 | — | 266 |
| EB 37 [b] | AE 20 | 0.15 | 19.8 | 195 | — |
| EB 38 [b] | AE 20 | 0.30 | 19.6 | 236 | — |
| EB 39 [b] | AE 20 | 0.15 | 19.8 | — | 203 |
| EB 40 [b] | AE 20 | 0.30 | 19.3 | — | 249 |
| EB 41 [b] | AE 21 | 0.15 | 19.2 | 194 | — |
| EB 42 [b] | AE 21 | 0.30 | 19.4 | 239 | — |
| EB 43 [b] | AE 21 | 0.15 | 20.1 | — | 197 |
| EB 44 [b] | AE 21 | 0.30 | 19.6 | — | 243 |
| EB45 [b] | AE 22 | 0.15 | 19.6 | 229 | — |
| EB46 [b] | AE 22 | 0.30 | 20.1 | 271 | — |
| EB47 [b] | AE 22 | 0.15 | 20.5 | — | 223 |
| EB48 [b] | AE 22 | 0.30 | 19.5 | — | 269 |
| EB49 [b] | AE 23 | 0.15 | 19.3 | 219 | — |
| EB50 [b] | AE 23 | 0.30 | 19.7 | 267 | — |
| EB51 [b] | AE 23 | 0.15 | 19.6 | — | 231 |
| EB52 [b] | AE 23 | 0.30 | 20.3 | — | 272 |
| EB53 [b] | AE 24 | 0.15 | 19.4 | 207 | — |
| EB54 [b] | AE 24 | 0.30 | 19.5 | 249 | — |
| EB55 [b] | AE 24 | 0.15 | 20.2 | — | 209 |
| EB56 [b] | AE 24 | 0.30 | 19.3 | — | 256 |
| EB57 [b] | AE 15 | 0.15 | 19.6 | 193 | — |
| EB58 [b] | AE 15 | 0.30 | 19.2 | 228 | — |
| EB59 [b] | AE 15 | 0.15 | 19.5 | — | 204 |
| EB60 [b] | AE 15 | 0.30 | 19.8 | — | 235 |

Footnotes:
[a] comparative
[b] according to the invention
[c] g final polymer based on polymer content added to 100 g paper material
[d] dry content of the wet paper structure
[e] internal strength of the dried paper sheet B-6) Summary of the Obtained Data The reference values of the internal strength (RB1-RB3, without added final polymer) are approximately 125 $J/m^2$. The deviations of the internal strength between dried paper sheets, the wet paper structures of which have a dry content between 15.3% by weight and 20.2% by weight, are small deviations.

At a dosing amount of 0.15 g/100 g of the comparative examples (VB1, VB3, VB5, VB7) the increase in the internal strength as compared to the reference examples was approximately 20 $J/m^2$ independently of the dosing in the thick matter or in the thin matter and independently of the dry content. At a dosing amount of 0.3 g/100 g of the comparative examples (VB2, VB4, VB6, VB8) the increase in the internal strength was approximately 30 $J/m^2$ independently of the dosing in the thick matter or in the thin matter and independently of the dry content.

At a dosing amount of 0.15 g/100 g of the examples according to the invention and a dry content <18.5% by weight (in each case odd numbers from EB1 to EB28) the increase in the internal strength as compared to the reference examples was approximately 40 J/m² independently of the dosing in the thick matter or in the thin matter. At a dosing amount of 0.30 g/100 g of the examples according to the invention and a dry content <18.5% by weight (in each case odd numbers from EB1 to EB28) the increase in the internal strength as compared to the reference examples was approximately 55 J/m² independently of the dosing in the thick matter or in the thin matter.

At a dosing amount of 0.15 g/100 g of the examples according to the invention and a dry content >18.5% by weight (in each case odd numbers from EB33 to EB60) the increase in the internal strength as compared to the reference examples was at least 70 J/m² in the case of the dosing in the thick matter and at least 50 J/m² in the case of the dosing in the thin matter. At a dosing amount of 0.30 g/100 g of the examples according to the invention and a dry content >18.5% by weight (in each case odd numbers from EB33 to EB60) the increase in the internal strength as compared to the reference examples was at least 90 J/m² in the thick matter and at least 70 J/m2 in the thin matter.

When comparing the examples according to the invention with a dry content of the wet paper structure of <18.5% by weight (EB1 to EB28) with the examples according to the invention with a dry content of the wet paper structure >18.5% by weight (EB33 to EB60), the internal strengths with comparable final polymer, dosing amount and dosing are at least 20 J/m² higher with the higher dry content of the wet paper structure.

The final polymer AV1 of the comparative examples was composed formally of 70 mol % amino-group-carrying ethylene units and 30 mol % carboxylic-acid-group-carrying ethylene units. The final polymers AE15, AE19, AE22, AE23 and AE24 of the examples according to the invention were also composed formally approximately of 70 mol % amino-group-carrying ethylene units and 30 mol % carboxylic-acid-group-carrying ethylene units. Approximately, the degree of hydrolysis HA was 98 mol % in AE15, 99 mol % in AE19, 98 mol % in AE22, 97 mol % in AE23 and 96 mol % in AE24. With regard to the attained paper strengths for the applied final polymers, a distinction was made as to whether, for the carboxylic-acid-group-containing ethylene units, only sodium acrylate was polymerised into the final polymers beforehand in the starting polymer, or whether at least also or exclusively a methyl or ethyl ester of the acrylic acid was polymerised beforehand in the starting polymer. It was assumed that this leads to a different incorporation behaviour of the monomers and thus to an altered alternation of the monomer units that have been polymerised in. With an increased alternation, changes to the number of the possible five-membered lactam structural units were to be expected. N-vinylformamide is an electron-rich monomer, whereas an ester of acrylic acid by contrast is a monomer with a low electron count. Buffered acrylic acid at a pH value of from 6 to 7 is, by contrast, a monomer with a higher electron count. Another difference between an ester of acrylic acid and an acrylate salt is the solubility.

The invention claimed is:

1. A method for producing paper or cardboard, comprising the steps of,
(A) adding a final polymer A to a first aqueous fibrous material suspension, whereby a second aqueous fibrous material suspension comprising final polymer A is created,
wherein the final polymer A is obtained by
radical polymerisation of the monomers
(i) 30 to 90 mol % of a monomer of formula I

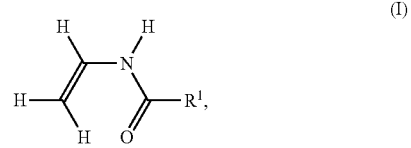

in which $R^1$=H or means $C_1$-$C_6$ alkyl,
(ii) 3 to 60 mol % of a $C_1$-$C_4$ alkyl ester of acrylic acid or of a $C_1$-$C_4$ alkyl ester of methacrylic acid,
(iii) 0 to 45 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 35 mol % of one or more ethylenically unsaturated monomers which are different from a monomer (i), (ii), (iii) and (iv),
wherein the total amount of all monomers (i), (ii), (iii), (iv) and (v) is 100 mol %, in order to obtain a starting polymer V, and
hydrolysing the starting polymer V in order to obtain the final polymer A,
wherein the N—C(=O)R' groups of formula (I) of the monomers (i) polymerised into the starting polymer V hydrolyse at least in part and in so doing form primary amino groups,
wherein the ester groups of the monomers (ii) polymerised into the starting polymer V are converted at least in part and at least part of the conversion is the formation of five-membered lactam structural units with the obtained primary amino groups or the formation of carboxylic acid groups or salt forms thereof,
(B) dewatering the second aqueous fibrous material suspension comprising final polymer A on a water-permeable substrate to form a wet paper structure,
(C) dewatering the wet paper structure, whereby the paper or the cardboard is formed.

2. The method according to claim 1, wherein
(i) 50 to 89 mol % of a monomer of formula I
(ii) 5 to 45 mol % of a $C_1$-$C_4$ alkyl ester of acrylic acid or of a $C_1$-$C_4$ alkyl ester of methacrylic acid,
(iii) 0 to 30 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
are used for the radical polymerisation.

3. The method according to claim 1, wherein
(i) 58 to 83 mol % of a monomer of formula I
(ii) 8 to 39 mol % of a $C_1$-$C_4$ alkyl ester of acrylic acid or of a $C_1$-$C_4$ alkyl ester of methacrylic acid,
(iii) 0 to 25 mol % of a monoethylenically unsaturated carboxylic acid, a monoethylenically unsaturated sulfonic acid, or a monoethylenically unsaturated phosphonic acid, or salt forms thereof,
(iv) 0 to 9 mol % acrylonitrile or methacrylonitrile,
(v) 0 to 25 mol % of one or more ethylenically unsaturated monomers which are different from a monomer (i), (ii), (iii) and (iv),
are used for the radical polymerisation.

4. The method according to claim 1, wherein the monomer (iii) is used in an amount of from 1 to 25 mol %.

5. The method according to claim 1, wherein at least 70 to 100% of the monomers (i) polymerised into the starting polymer V are hydrolysed in relation to the number of all monomers (i) polymerised into the starting polymer V, and at least 90 to 100% of the monomers (ii) polymerised into the starting polymer V are converted in relation to the number of all monomers (ii) polymerised into the starting polymer V.

6. The method according to claim 5, wherein at least 70 and at most 99.5% of the monomers (i) polymerised in are hydrolysed in relation to the number of all monomers (i) polymerised into the starting polymer V.

7. The method according to claim 1, wherein the starting polymer V is subjected to alkaline hydrolysis to form the final polymer A.

8. The method according to claim 1, wherein the monomer (i) is N-vinylformamide with $R^1$=H in formula I.

9. The method according to claim 1, wherein the monomer (ii) is a $C_1$-$C_3$ alkyl ester of acrylic acid or $C_1$ alkyl ester of methacrylic acid.

10. The method according to claim 9, wherein the monomer (ii) is a $C_1$-$C_3$ alkyl ester of acrylic acid.

11. The method according to claim 1, wherein the monomer (ii) is ethyl acrylate.

12. The method according to claim 1, wherein the monomer (iii) is a monoethylenically unsaturated carboxylic acid or a monoethylenically unsaturated sulfonic acid, or salt forms thereof.

13. The method according to claim 1, wherein the monomer (iii) is acrylic acid, methacrylic acid, vinylsulfonic acid or 2-acrylamido-2-methylpropanesulfonic acid, or salt forms thereof.

14. The method according to claim 1, wherein the monomers
(i) 60 to 83 mol % N-vinylformamide,
(ii) 8 to 21 mol % ethyl acrylate,
(iii) 2 to 21 mol % acrylic acid or methacrylic acid or salt forms thereof,
(iv) 0 to 9 mol % acrylonitrile or methacrylonitrile,
(v) 0 to 24 mol % of one or more ethylenically unsaturated monomers which are different from a monomer (i), (ii), (iii) and (iv),
are used for the radical polymerisation.

15. The method according to claim 1, wherein the monomers (v) comprise an amount of from 0 to 6 mol % acrylamide, the mole percentage relates to the total number of all monomers (i), (ii), (iii), (iv) and (v), and the total number of all monomers is 100 mol %.

16. The method according to claim 1, wherein the ester groups of the monomers (ii) polymerised into the starting polymer V are converted at least in part and at least part of the conversion is the formation of five-membered lactam structural units with the obtained primary amino groups.

17. The method according to claim 1, wherein in step (A) the first aqueous fibrous material suspension has a dry content between 0.1% by weight and 6% by weight.

18. The method according to claim 17, wherein in step (B) the wet paper structure has a dry content between 18.5 and 25% by weight.

19. The method according to claim 1, wherein in step (A) the final polymer A is added to the first aqueous fibrous material suspension, which has a dry content of more than 1.5% by weight and up to 6% by weight at the time of the addition.

20. The method according to claim 1, wherein in step (A) the final polymer A is added as an aqueous dispersion or aqueous solution with a pH value of from 6 to 9.

* * * * *